A. PENTECOST AND W. W. FISHER.
CALCULATING MACHINE.
APPLICATION FILED JULY 17, 1918.
1,355,258.  Patented Oct. 12, 1920.
25 SHEETS—SHEET 3.
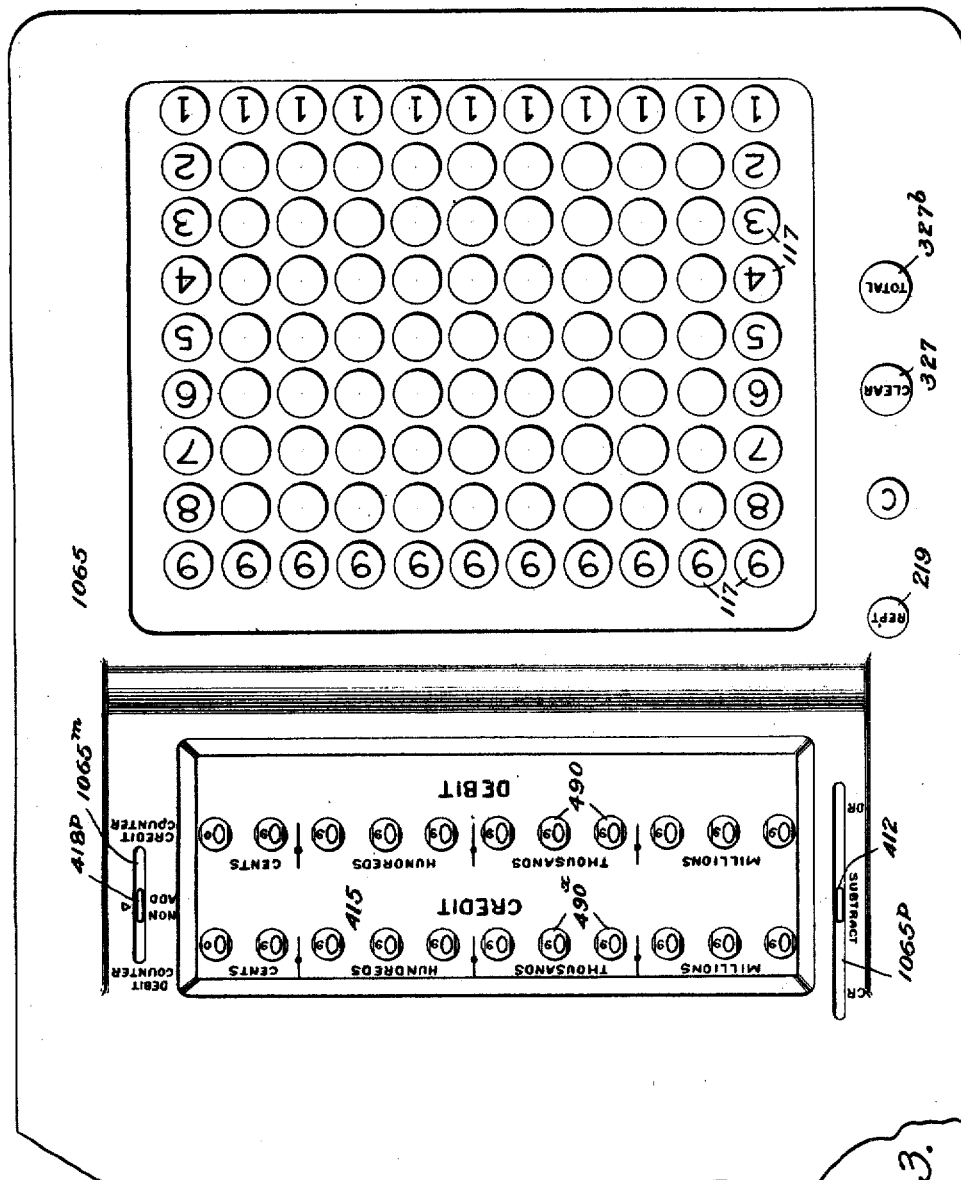
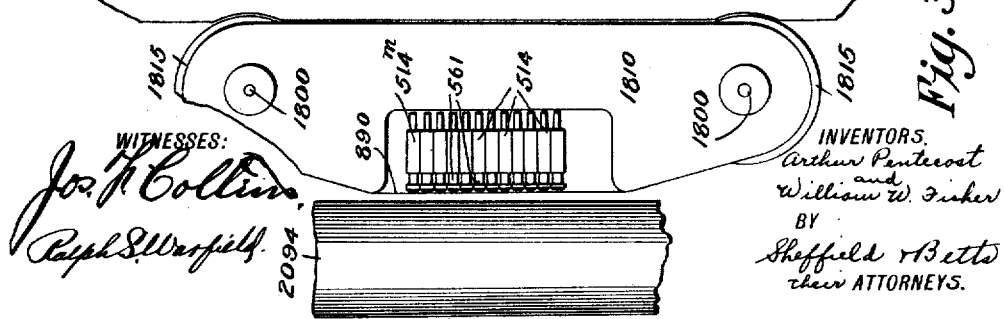
Fig. 3.
WITNESSES:
Jos. H. Collins
Ralph S. Warfield
INVENTORS.
Arthur Pentecost
and
William W. Fisher
BY
Sheffield & Betts
their ATTORNEYS.

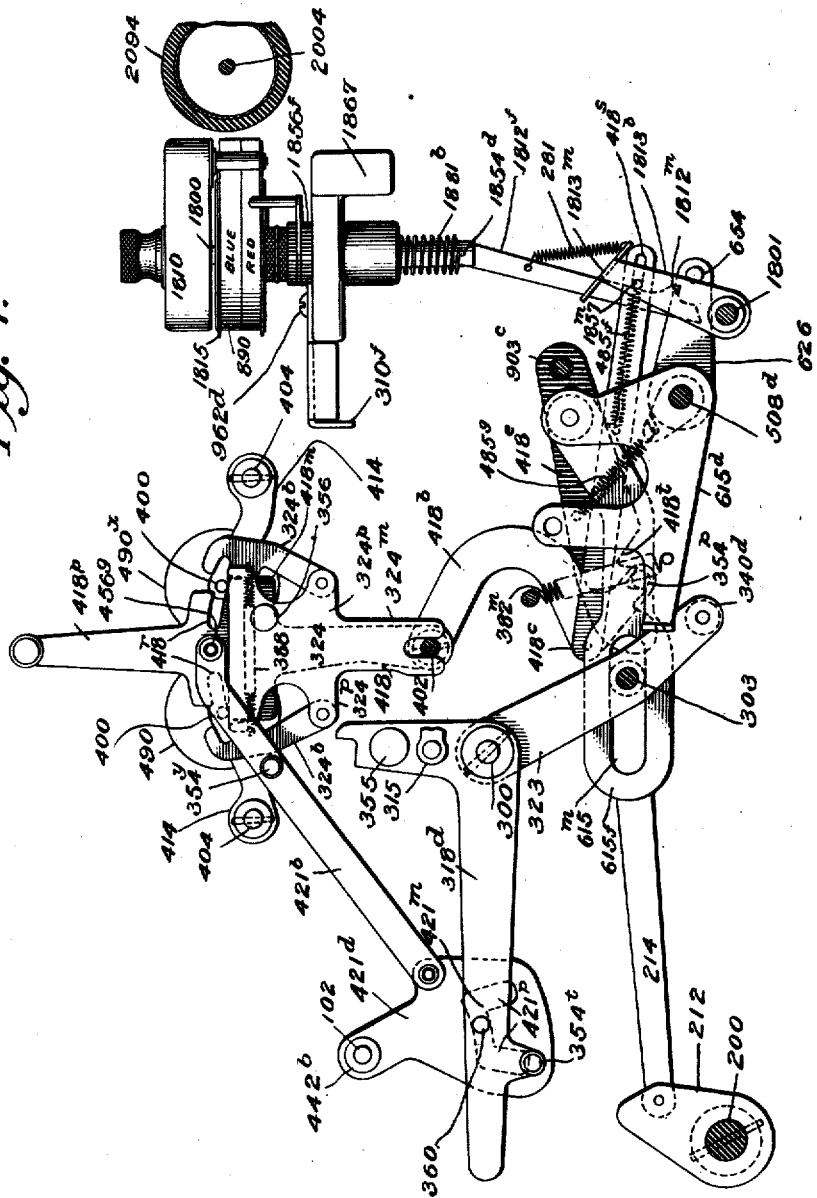

A. PENTECOST AND W. W. FISHER.
CALCULATING MACHINE.
APPLICATION FILED JULY 17, 1918.

1,355,258.

Patented Oct. 12, 1920.
25 SHEETS—SHEET 5.

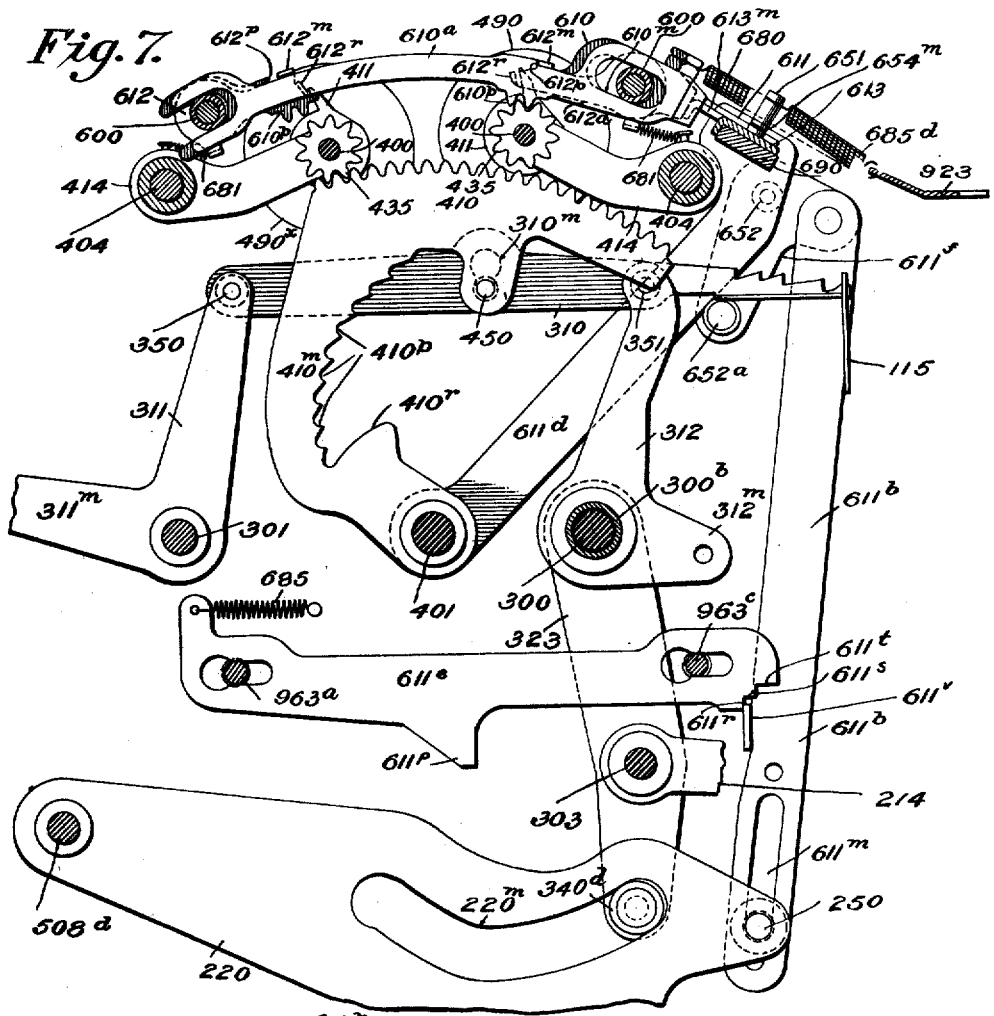

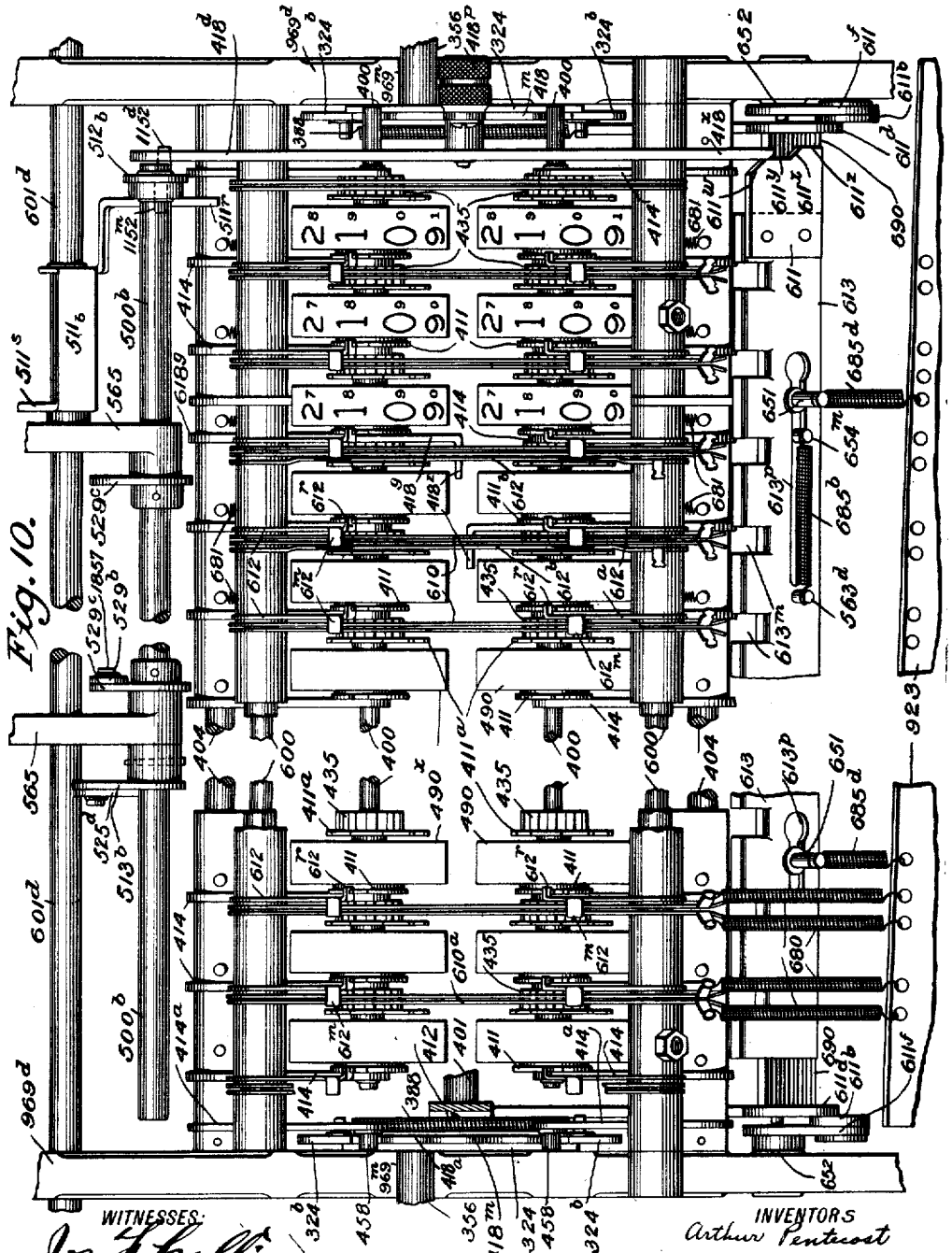

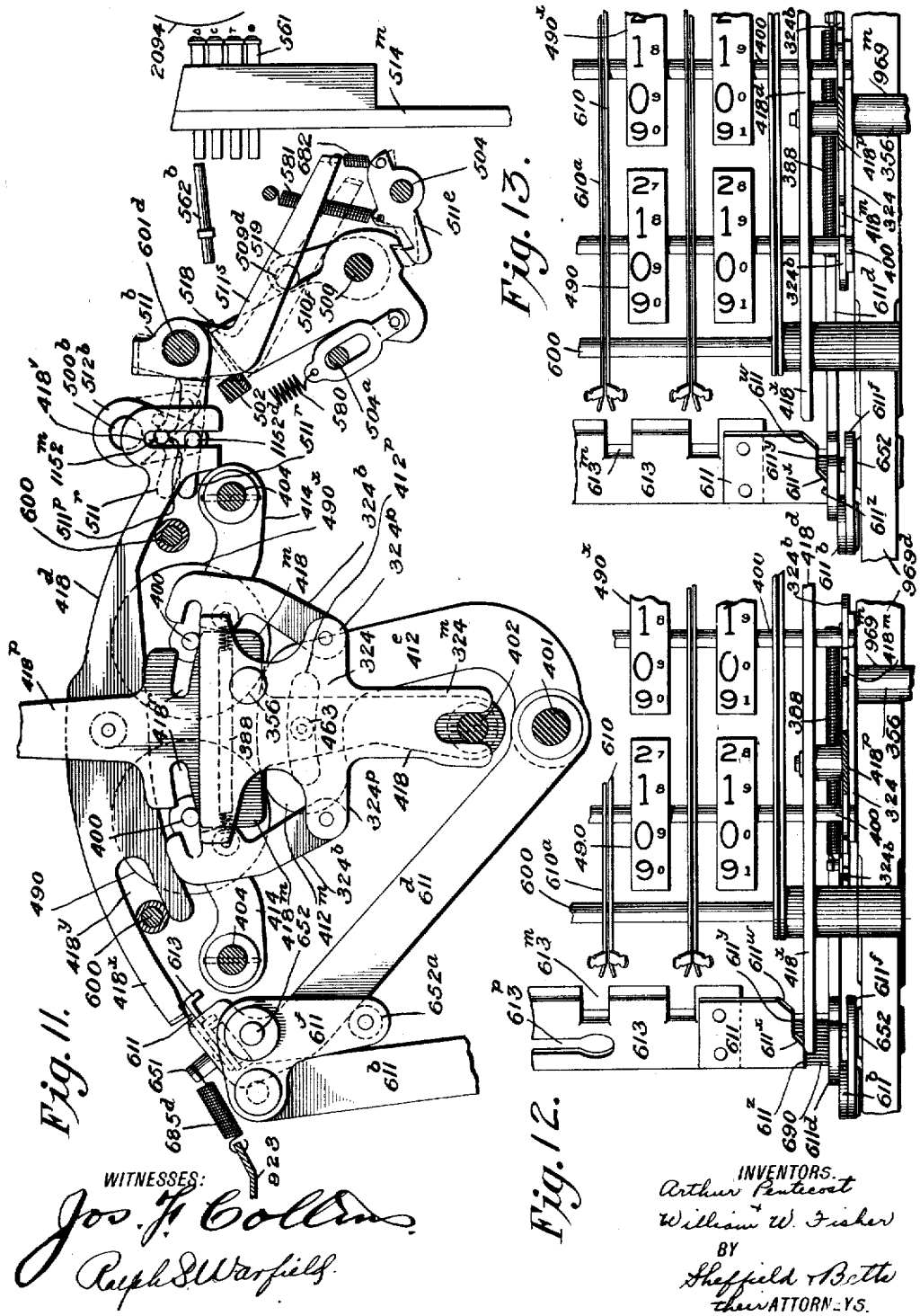

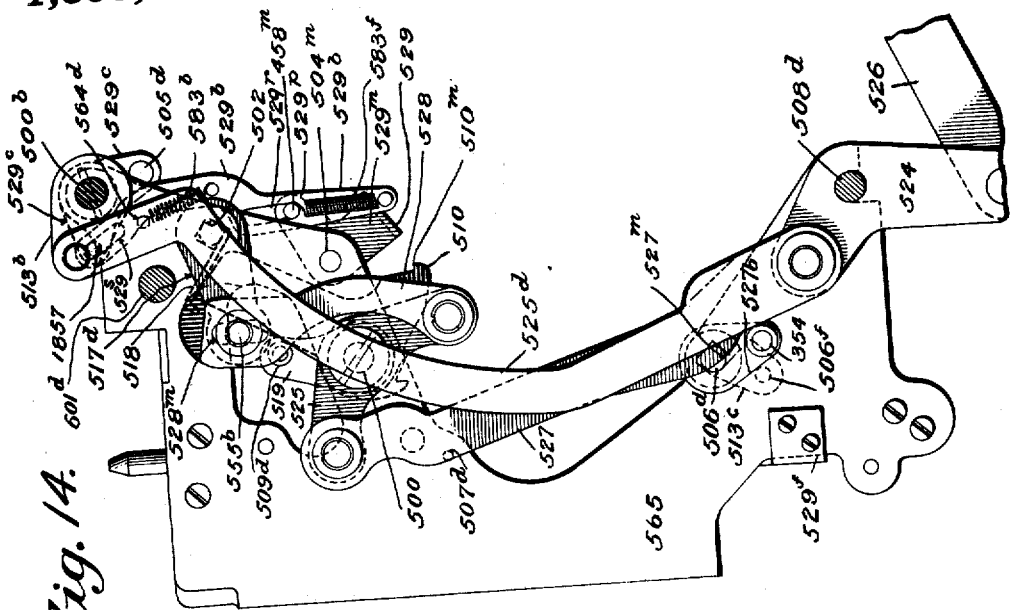

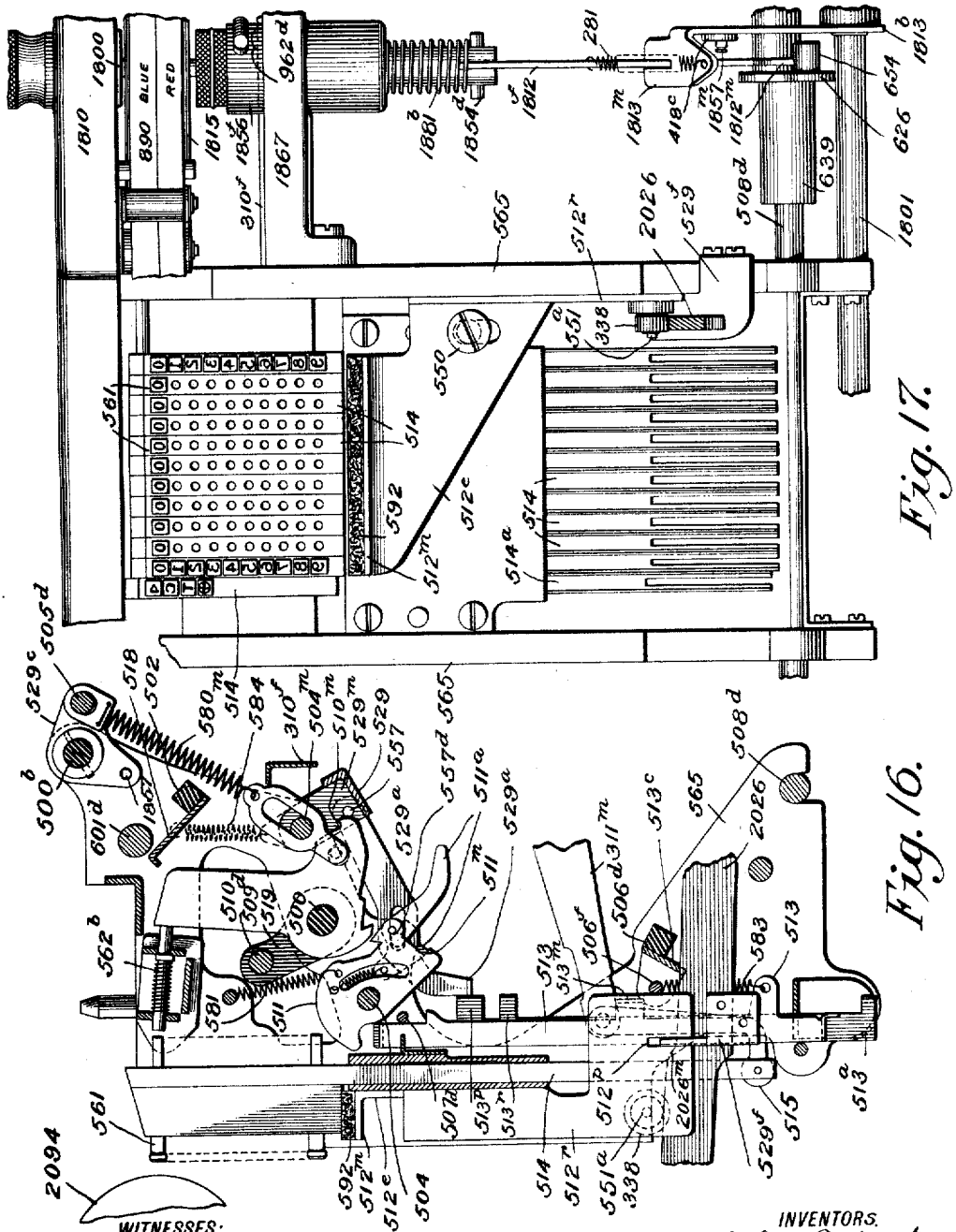

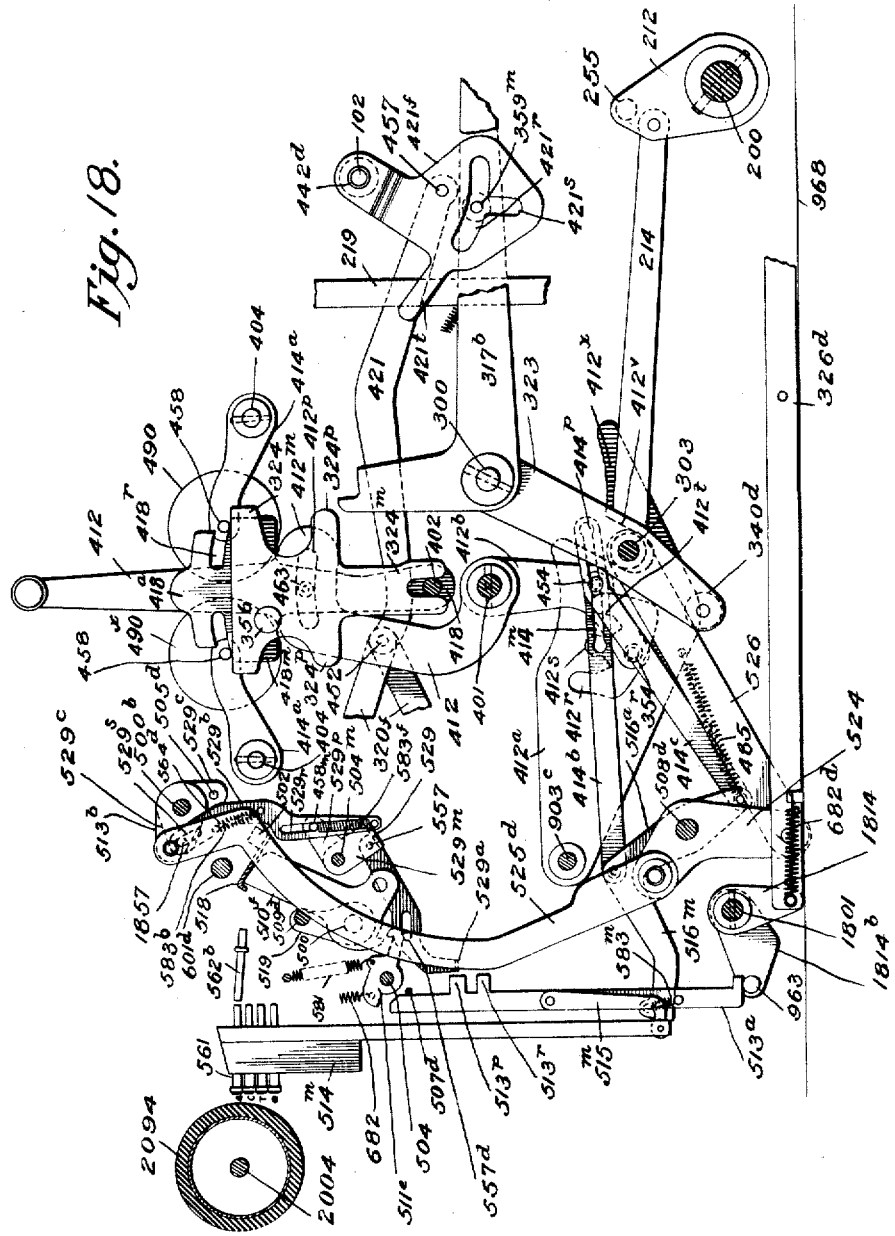

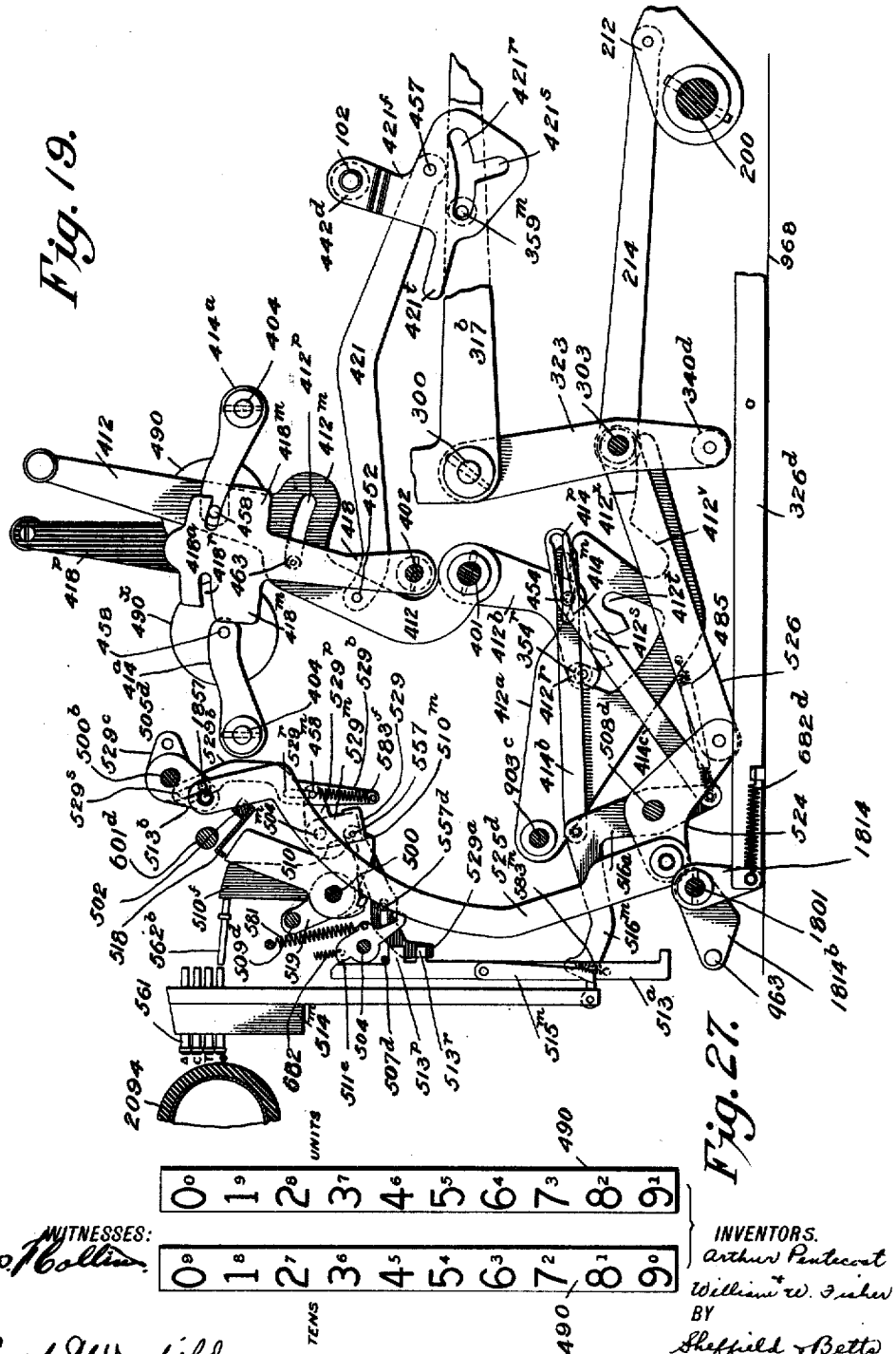

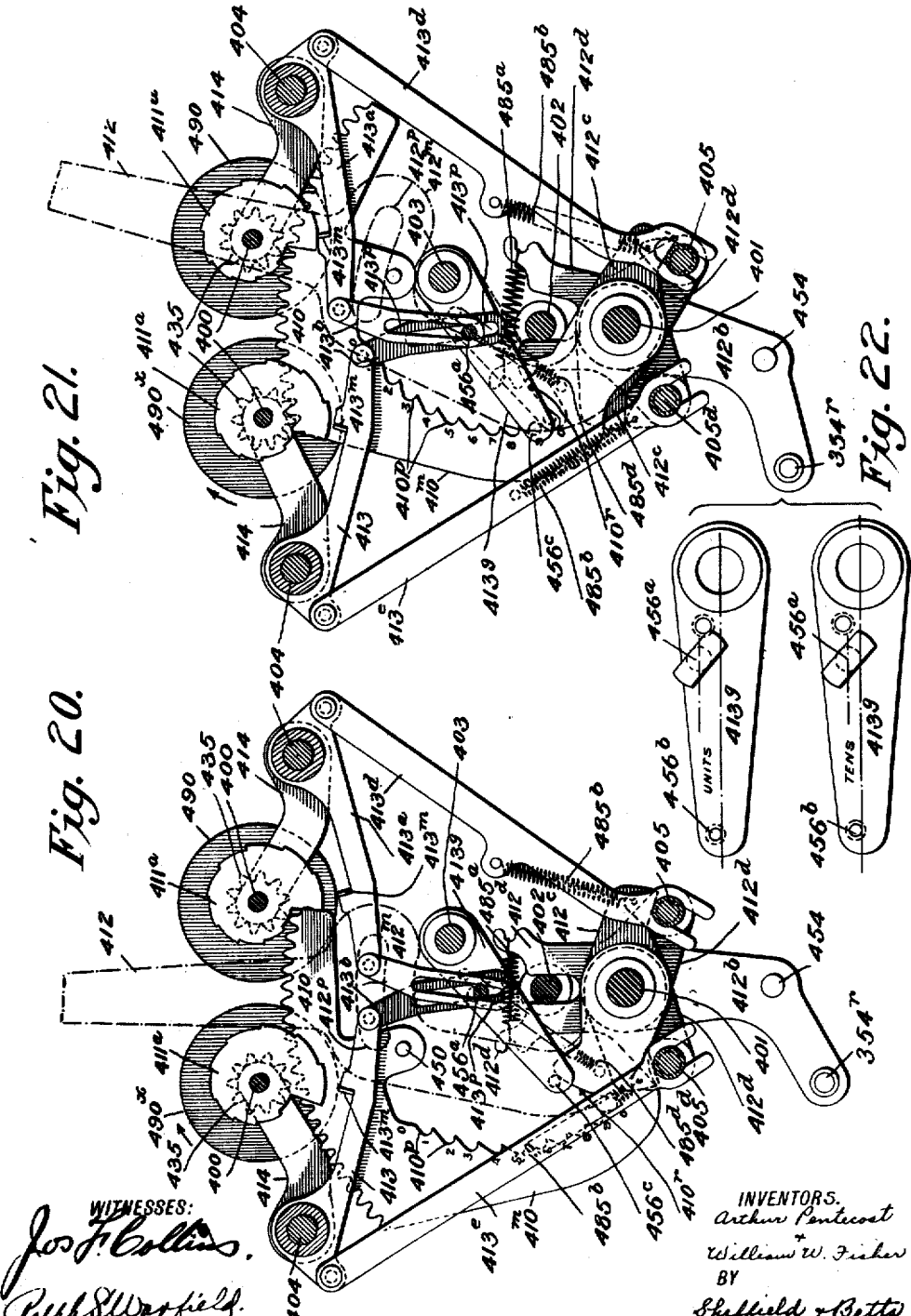

A. PENTECOST AND W. W. FISHER.
CALCULATING MACHINE.
APPLICATION FILED JULY 17, 1918.

1,355,258.

Patented Oct. 12, 1920.
25 SHEETS—SHEET 15.

WITNESSES:
Jos. F. Collins
Ralph S. Warfield

INVENTORS.
Arthur Pentecost
William W. Fisher
BY
Sheffield & Betts
their ATTORNEYS.

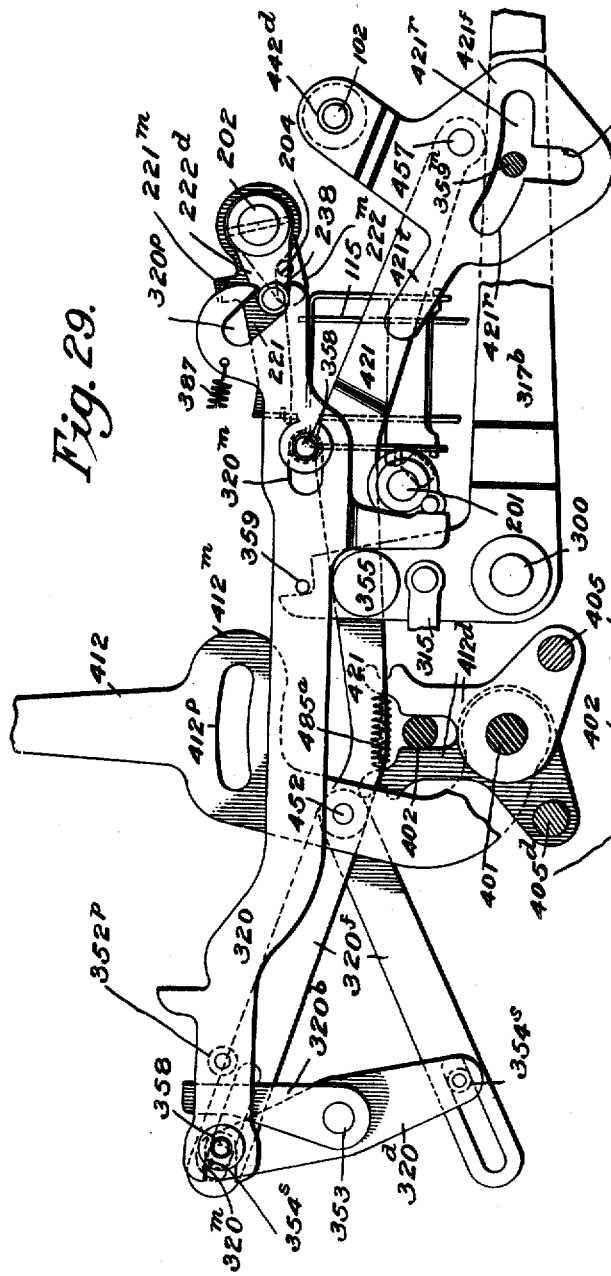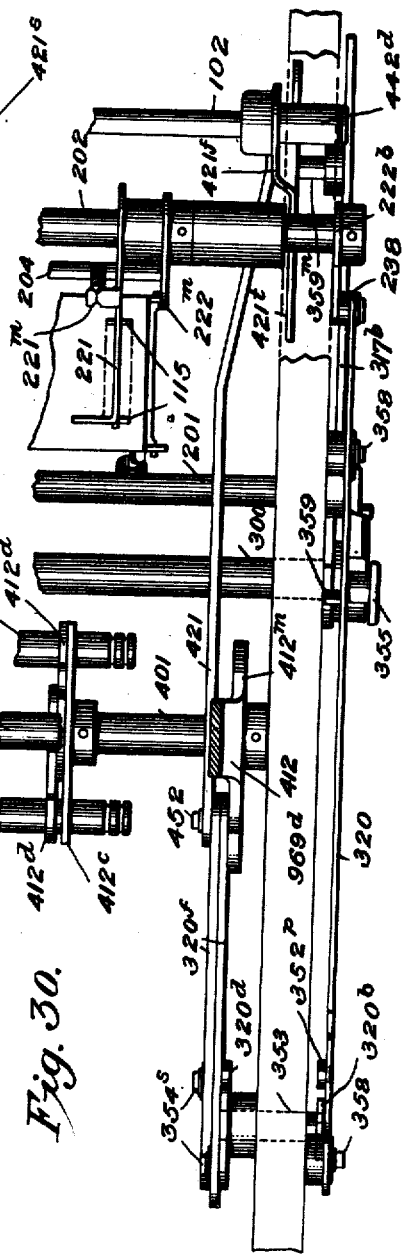

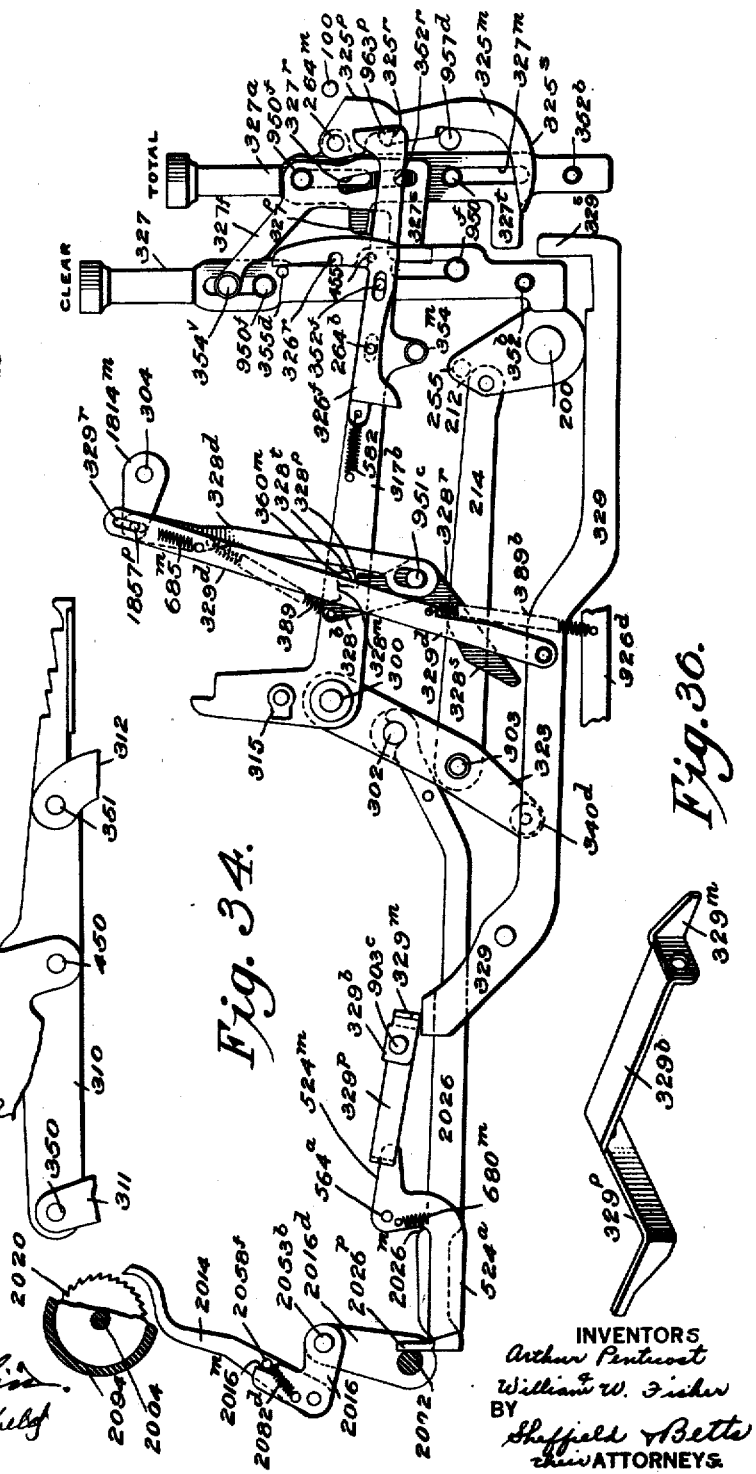

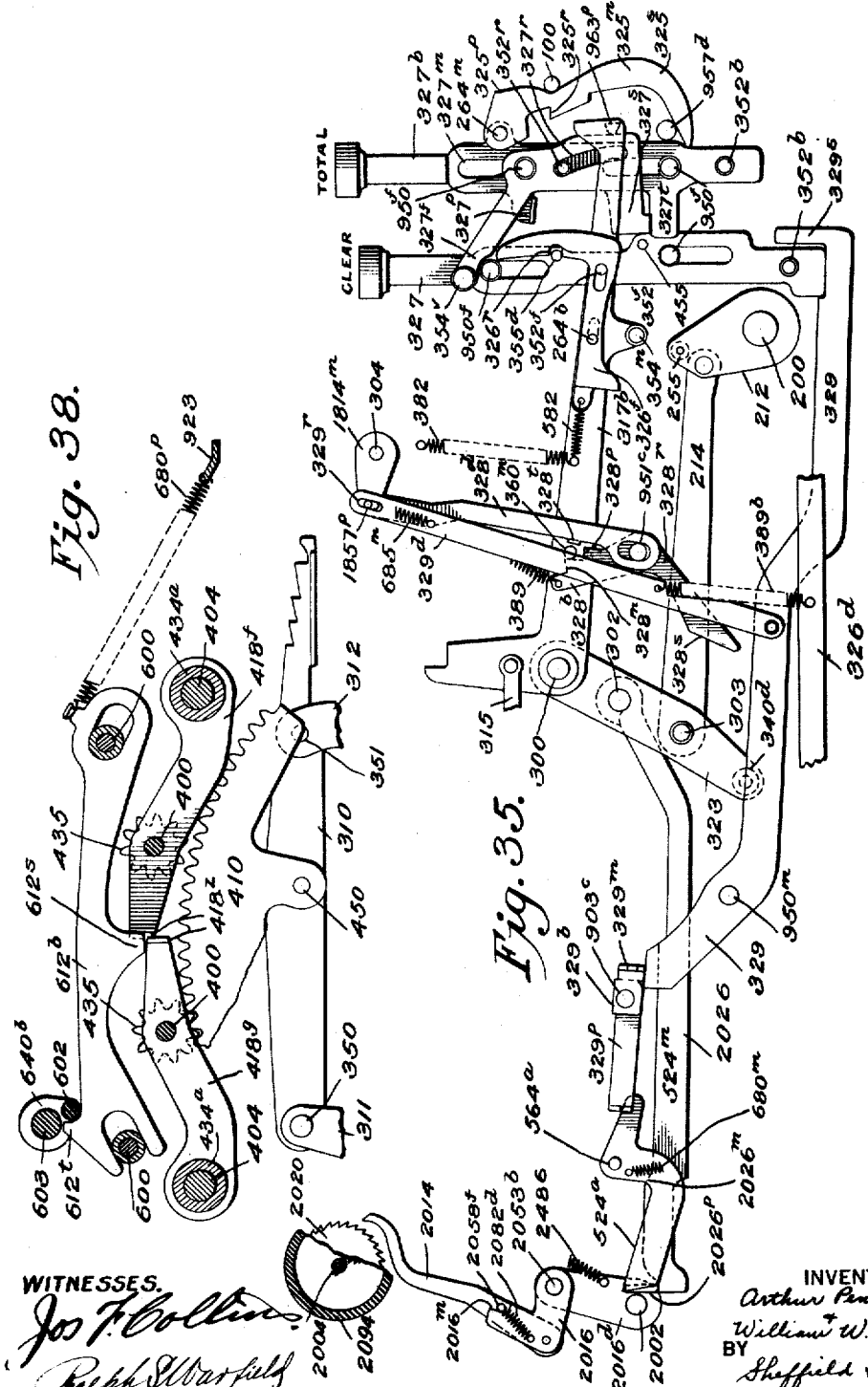

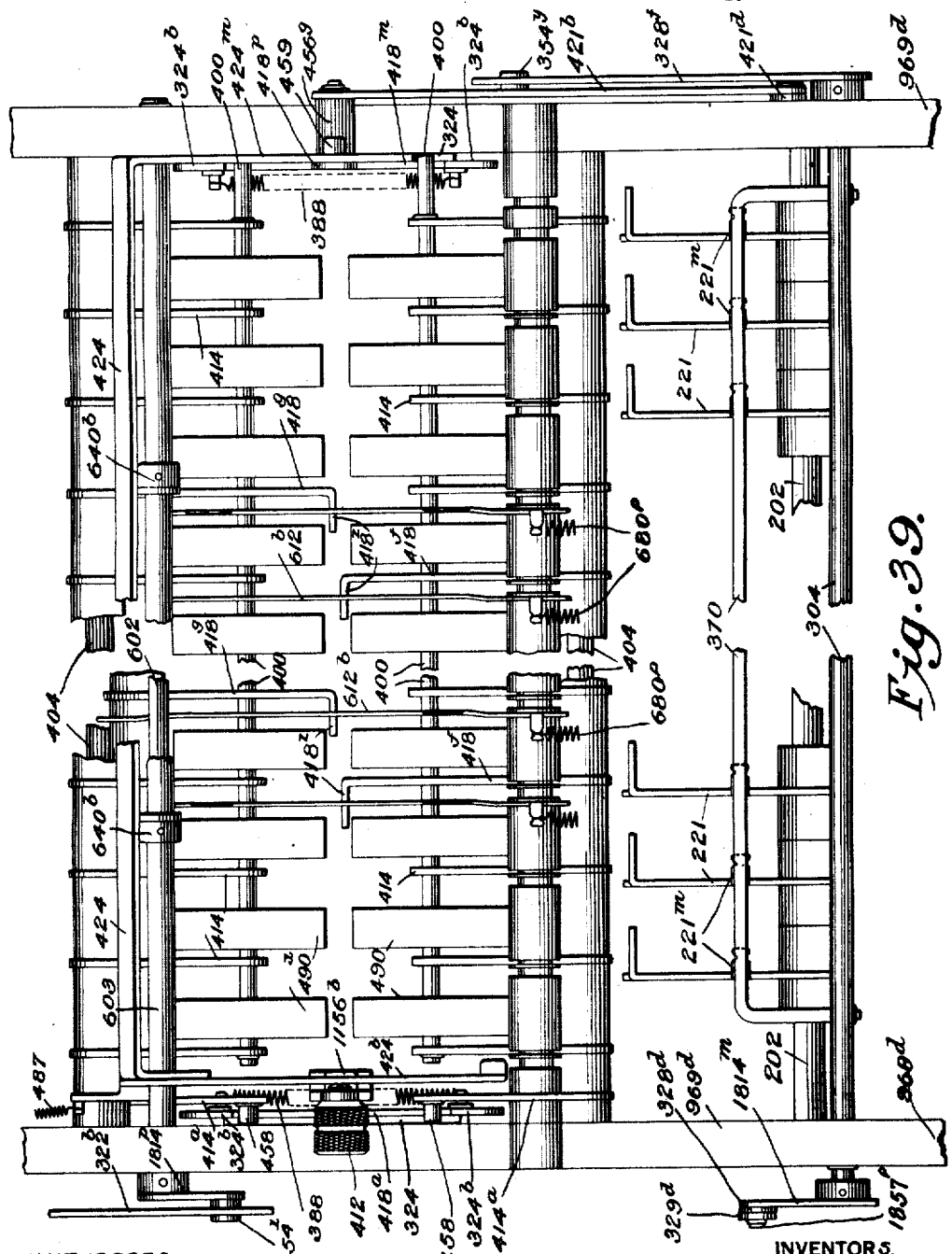

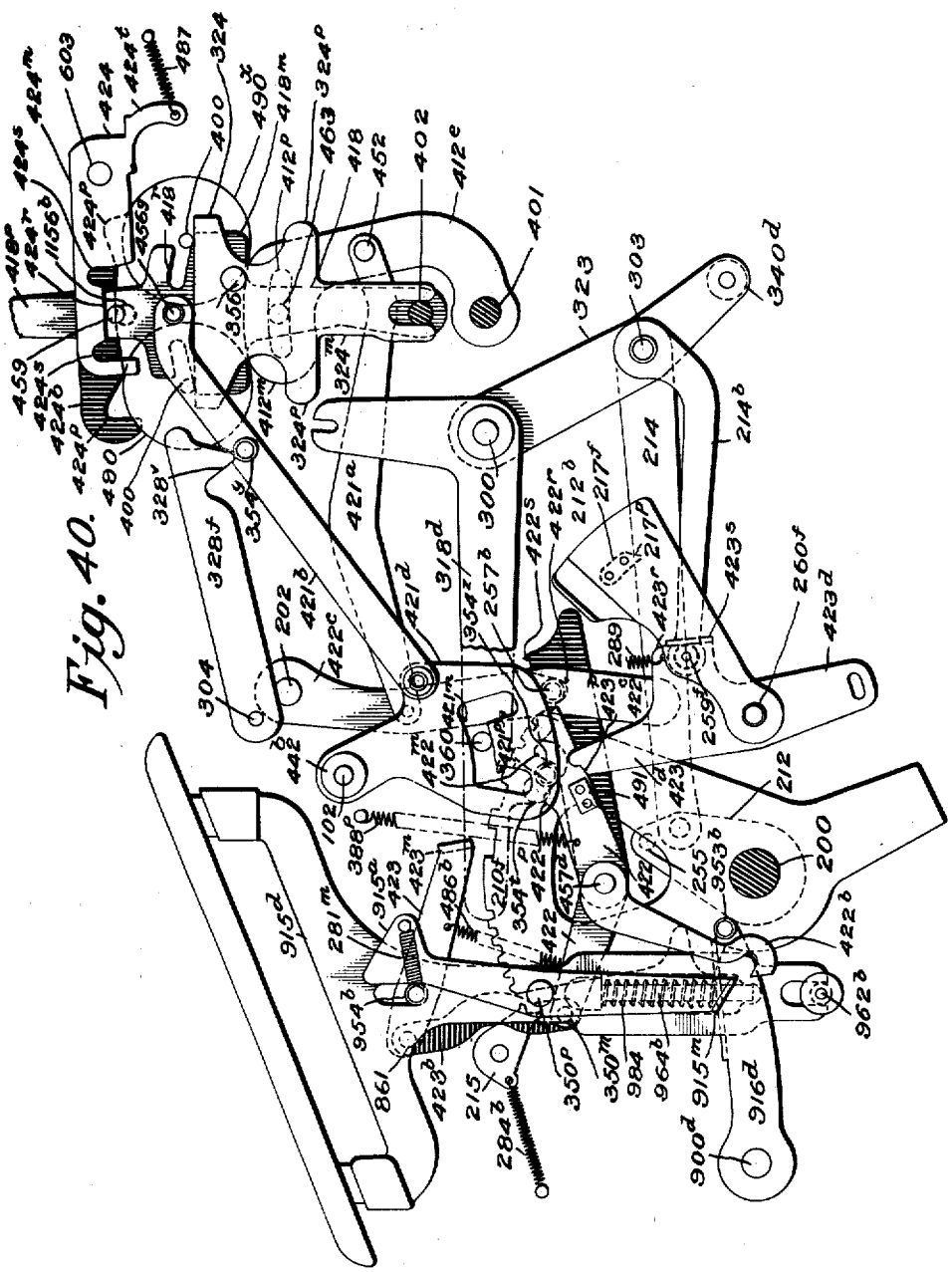

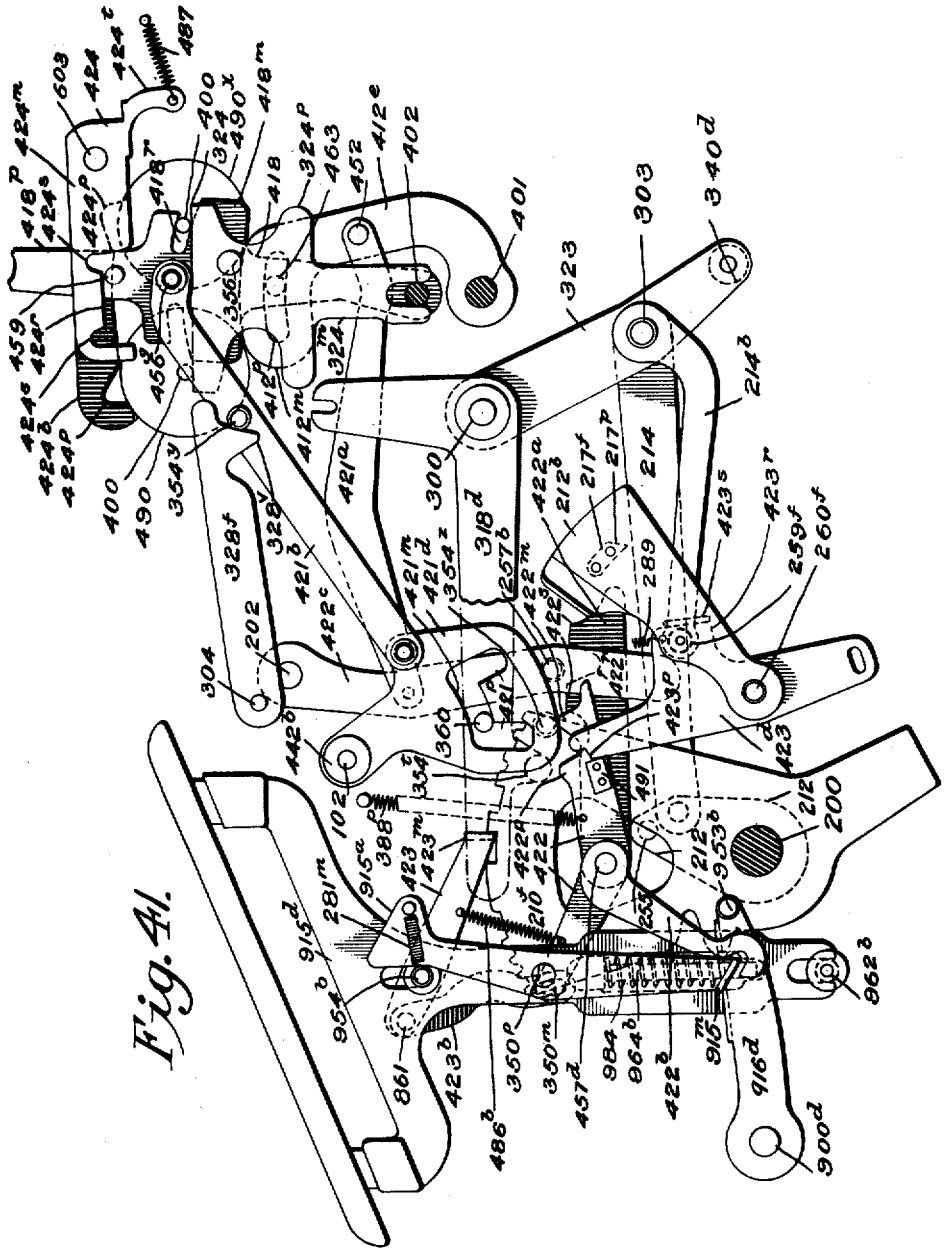

A. PENTECOST AND W. W. FISHER.
CALCULATING MACHINE.
APPLICATION FILED JULY 17, 1918.
1,355,258.
Patented Oct. 12, 1920.
25 SHEETS—SHEET 23.
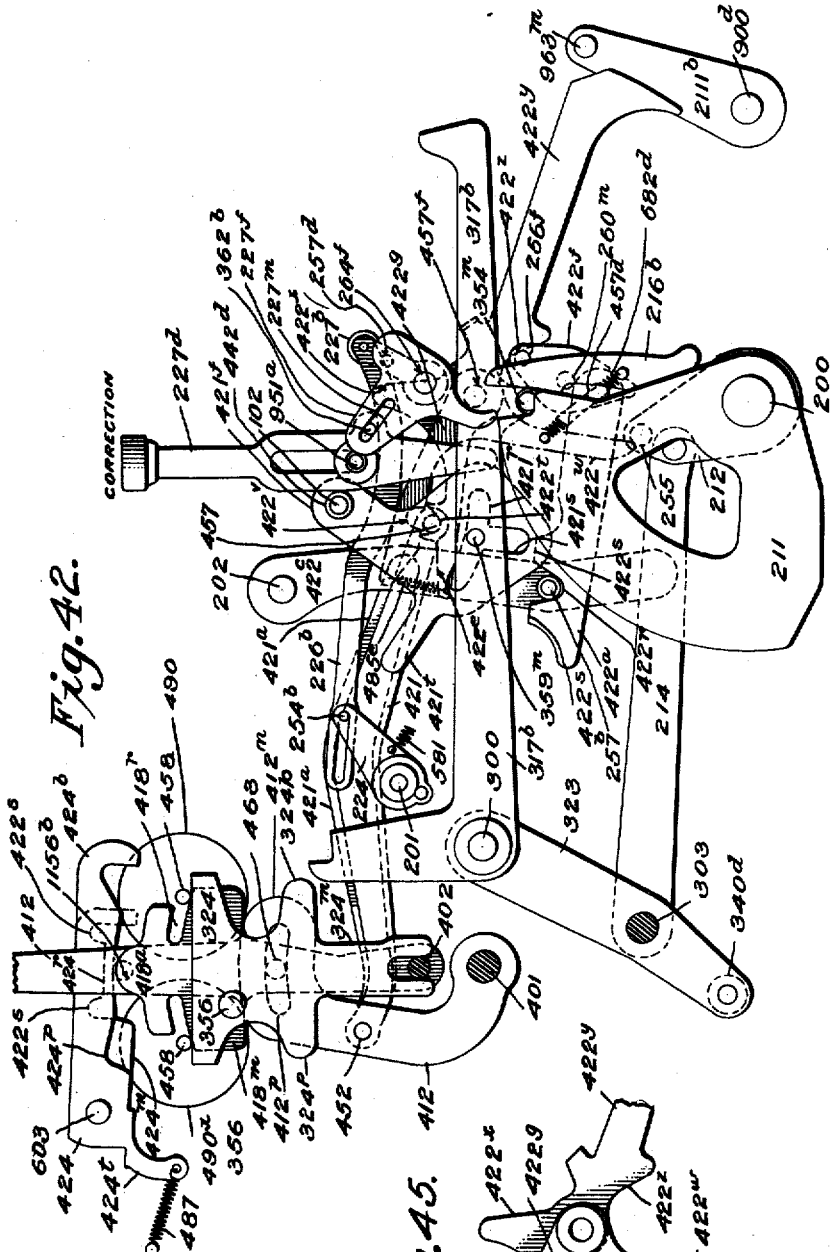

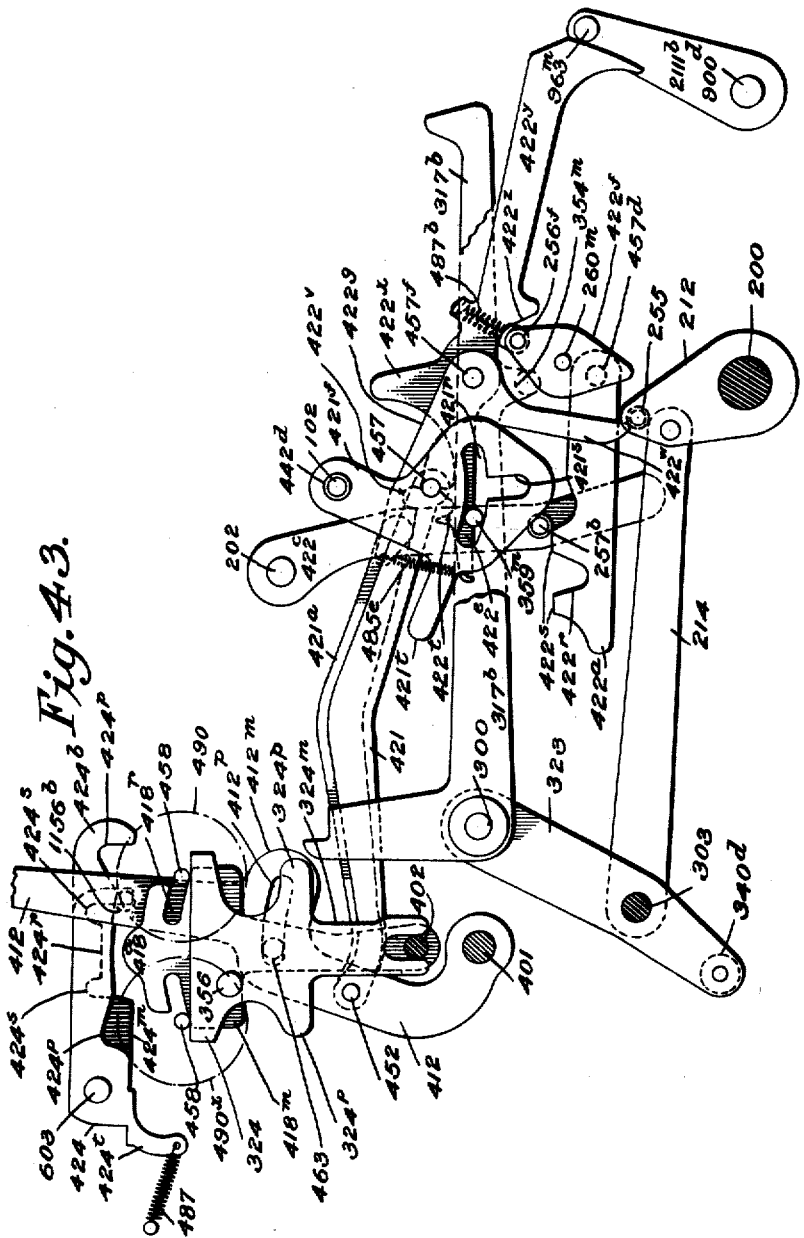

A. PENTECOST AND W. W. FISHER.
CALCULATING MACHINE.
APPLICATION FILED JULY 17, 1918.

1,355,258.

Patented Oct. 12, 1920.
25 SHEETS—SHEET 25.

WITNESSES.
Jos. F. Collin
Ralph S. Warfield

INVENTORS.
Arthur Pentecost
William W. Fisher
BY
Sheffield Betts
their ATTORNEYS.

UNITED STATES PATENT OFFICE.

ARTHUR PENTECOST, OF NEW YORK, N. Y., AND WILLIAM W. FISHER, OF FORTYFORT, PENNSYLVANIA, ASSIGNORS TO WALES ADDING MACHINE COMPANY, OF WILKES-BARRE, PENNSYLVANIA, A CORPORATION OF PENNSYLVANIA.

CALCULATING-MACHINE.

1,355,258.　　　　Specification of Letters Patent.　　Patented Oct. 12, 1920.

Application filed July 17, 1918. Serial No. 245,273.

*To all whom it may concern:*

Be it known that we, ARTHUR PENTECOST, a subject of the King of England, residing at New York, New York county, New York, and WILLIAM W. FISHER, a citizen of the United States, and a resident of Fortyfort, Luzerne county, Pennsylvania, have jointly invented certain new and useful Improvements in Calculating-Machines, of which the following is a specification.

Our invention relates more particularly to improvements in multiple counter calculating machines, wherein registrations of amounts set up on a single keyboard may be effected on any of two or more sets of counters.

In the particular mechanism set forth, such registrations take place on either of two sets of counters, but our improvements are not restricted in their application to this class of machine, and may be applied to machines adapted for accumulation on two or more sets of counters simultaneously or successively during a single operation of the machine.

Furthermore, many of the devices herein shown are applicable to single as well as multiple counter machines.

One of the objects of the present invention is the equipment of the well known Wales calculating machine with a plurality of sets of counters and their coöperating mechanism, the idea being to effect such additions to the Wales mechanism with the least possible alteration of the devices heretofore employed therein; and to mutually adapt the improvements and the prior Wales construction so as to utilize the advantages and objects of former mechanisms in obtaining the new results when operating in conjunction with the novel elements.

For example, the provision of a plurality of sets of counters renders advisable a change in the counter drive members from those employed in former Wales machines, but we have so arranged the new mechanism that the excursions of the drive members are controlled by the usual Wales selective or keyboard mechanism, illustrated in U. S. patent to Wales, No. 797,032, August 15, 1905.

Also, it is desirable to retain the advantages of the counter-locking mechanism shown in U. S. patent to White, No. 940,766, November 23, 1909, which device we have utilized in connection with novel means, to enable it to lock any of the plurality of sets of counters against the possibility of rebounding when engaged with the drive members.

Additional means for adapting other devices, old in the Wales machine, for coöperation with the improvements now introduced, will be referred to hereinafter.

By following this idea, we have been able to convert the single accumulator Wales machine of the prior art, into a machine equipped with a plurality of sets of counters, with the least possible expenditure of time and labor, and at a minimum cost for new parts, the former mechanisms being retained wherever possible.

The accumulation of amounts on one or another of the several sets of counters is determined by a counter-selecting lever, which releases one set of counters for operation, and locks another set against operation.

The counter-selecting lever is adjustable to various positions, in one of which it operates, in the present instance, to prevent accumulations on all sets of counters, and a further object of our invention is to provide novel non-add sign printing means which is rendered effective or ineffective, depending upon the position to which the counter-control lever is shifted.

Still another object of our invention is the provision of an improved and novel means to enable the control by the counter-selecting lever, of the ribbon mechanism, whereby amounts entered upon or printed from the respective sets of counters, are printed in contrasting colors.

Another object of our invention is the provision of novel and simplified carrying mechanisms for the respective sets of counters, with a single carry-resetting member for the several carrying mechanisms.

The carrying or transfer mechanisms are of that type operable to effect the carry during the period of disengagement of the counters and drive members, and still another object is to provide an improved combined carrying and counter control mechanism of simple and efficient character.

In carrying mechanisms of this general type, the carry occurs near the end of the return stroke of the main drive shaft, after the counters have disengaged from their drive members, and, in some instances, the discharged carrying members have been reset at the beginning of the succeeding forward stroke.

Thus, the actual carry from a counter of lower order to one of the next higher order will take place after the disengagement of the drive members and counters near the end of the return stroke of the main drive shaft, and must be completed prior to the operation of the carry-resetting mechanism. In cross carrying operations when the main drive shaft is rapidly operated, the carrying wave tends to continue during a part of the succeeding forward stroke of the shaft, and where the carry-resetting mechanism operates at the beginning of the forward stroke, such carrying wave is liable to be interrupted, and an erroneous registration results. The time within which such carrying may be effected need be limited only by the necessity for disengaging the counters from their carrying members and engaging the counters with their drive members in time to enable the drive members to register on the counters the amounts set up on the keyboard, and provision made for resetting the carrying members during the engagement of the counters and their drive members.

In order, therefore, to permit as much time as possible during which transfers may be effected, the operation of the carry-resetting mechanism in this invention, is delayed until the end of the forward stroke, at which point the counters are disengaged from the carrying members in adding operations.

In a machine employing a plurality of accumulators with selective means to determine which set of accumulators shall be operative and which shall remain idle, it will often occur that one set of counters will be held idle after accumulating an amount thereon, during which accumulation, transfers have taken place in one or more orders. In such event, the counters will remain engaged with their respective combined carrying and counter control members, while one or more of the members is in discharged position. The idle set of counters will register the correct accumulation, but certain of the carrying members may be left in discharged position at this time. If the discharged carrying members associated with the idle set of counters were reset, their counters would be reversely rotated to effect an incorrect registration, and possibly result in injury to the machine.

Another object of our invention, therefore, is to provide, in combination with a single carry-resetting mechanism for the carrying members of the respective sets of counters, means whereby, when the operator shifts from one accumulator or set of counters to another, the discharged carrying members, if any, coacting with the idle set of counters will not be reset until the operator again selects such set of counters for operation, and operates the machine. To this end, we have arranged a neat, compact and accurate carrying mechanism which is effective in operation, and comprises a minimum of parts.

Another related object is the provision of means to prevent the possibility of over-additions due to the excess retirement of the drive members at the end of the return stroke of the machine, and with this means is associated, a device to cushion the type-bars and thus relieve them of strain due to the sudden arrest of the counter-drive members in their home positions. The last named means is also adapted to aline the cipher types at the printing line.

Another important object is the provision of improved means to perform substraction by the complementary addition method, whereby the complement of an amount registered on either set of counters may be communicated to an amount registered on another set of counters to obtain the difference between the registered amounts, in accordance with the idea disclosed in U. S. patents to Peters, 1,255,568 and 1,255,821, issued February 5, 1918. And we contrive to control the several sets of complementary addition stops which determine the excursions of the counter-drive members, from a single means, as a subtraction lever, normally occupying a neutral position and adapted to be shifted in one direction or the other to render effective, one or another of the sets of addition-controlling stops.

A correlated object is to enable the subtraction lever to control the counter-selecting lever and its associated parts, whereby the proper set of counters is held out of active engagement with the drive members, and the ribbon is positioned to print a communication sign, controlled by the subtraction lever, in the proper color to designate the set of counters to which the complement of the amount registered on the inactive set of counters, has been communicated.

In attaining the foregoing results, we have devised a novel mechanism whereby the selection of the complement of the amount registered on the inactive counters is automatically effected in a more simple and efficient manner than heretofore; which materially reduces the number of parts and renders the mechanism stronger, more durable, and more accurate.

A further object of our invention is the provision of improved and novel means to prevent the printing of such complementary amounts, when communicating complements and which also prevents printing when clearing the machine.

Various safety devices are provided, such as the locking means to prevent accidental or intentional shifting of the counter-selection, and the subtraction or communication levers, during machine operations; the locking means to prevent the taking of totals or clearing the machine when the subtraction lever is in effective position, or the counter-selecting lever is in its non-add position, and an interlocking means common to and controlled by both the counter-selection and the subtraction levers, to prevent the actuation of the drive mechanism, either by a handle or by touching the starting key, unless the levers are in their proper operating positions.

In addition, we have provided novel idle stroke-enforcing mechanism to prevent the taking of totals or clearing the machine prior to the resetting of any of the carrying mechanisms which may have been tripped as a result of the preceding operation. The carrying mechanism is employed, as usual, to arrest the counters in their zero positions, to which they return when a total is taken, and when the machine is cleared. By enforcing the idle stroke preliminary to either of these operations, the resetting of any tripped carrying member is effected, and the arrest of the counters at zero in totaling and clearing operations, rendered absolute and uniform. Also the idle stroke-enforcing mechanism is controlled by the counter-selecting lever, whereby accidental or intentional tricking of the machine, by taking an idle stroke when one set of counters is active, and then endeavoring to take a total on, or clear another set of counters, is prevented.

The foregoing and other objects and advantages will be more fully set forth hereinafter and particularly pointed out in the claims.

In the accompanying drawings—

Fig. 3 is a plan view of the machine, partly broken away;

Figure 6:
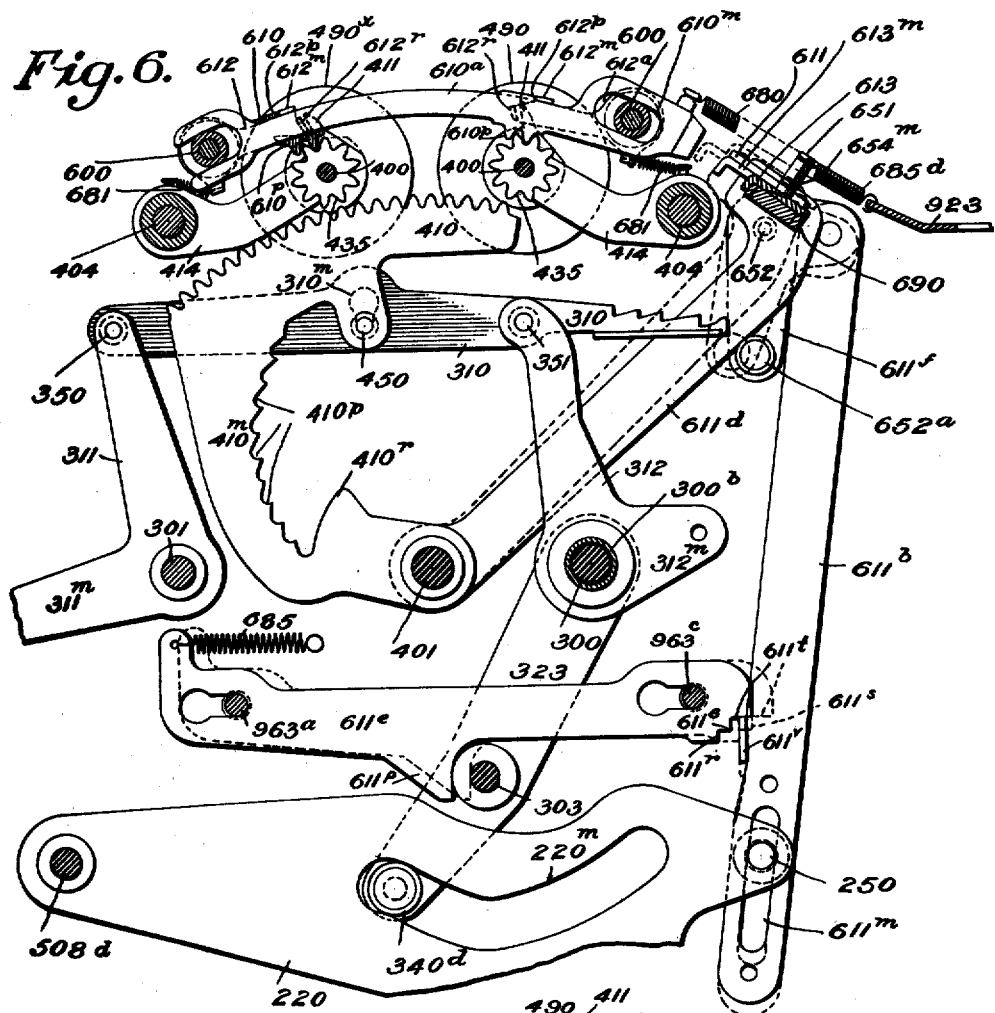
Figure 8:
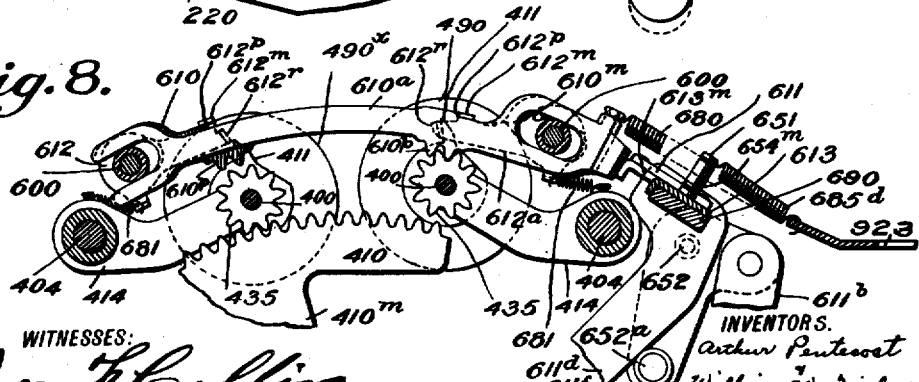
Figure 24:
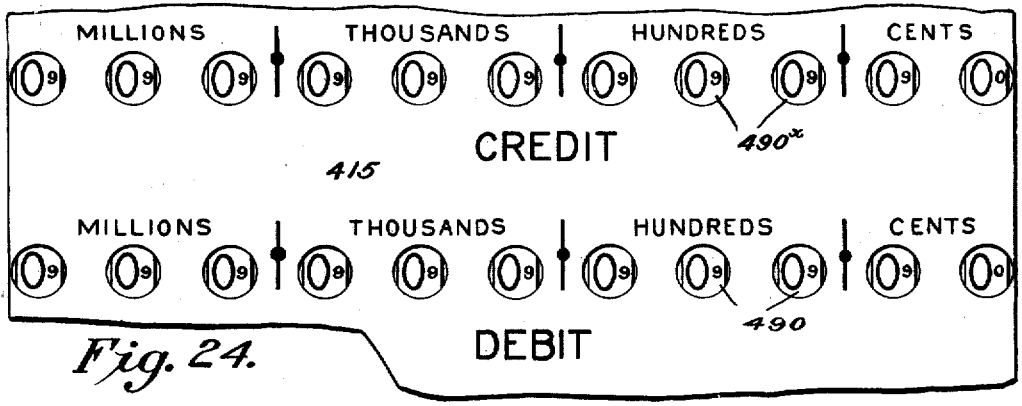
Figure 25:
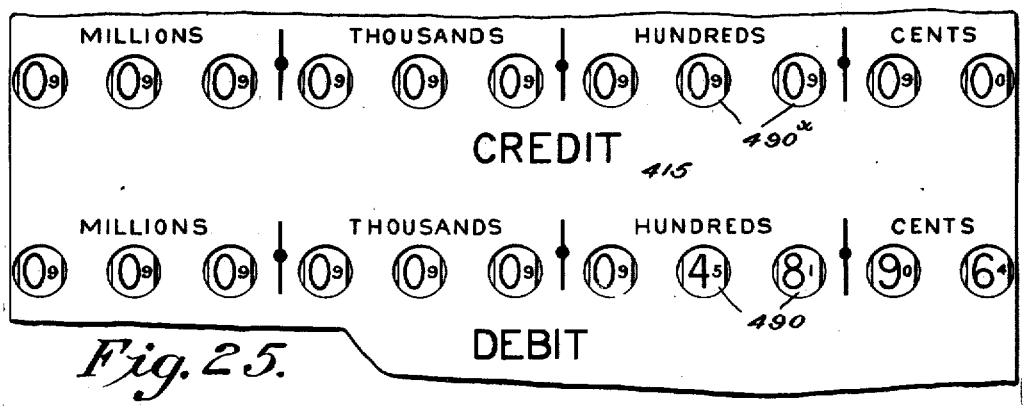
Figure 26:
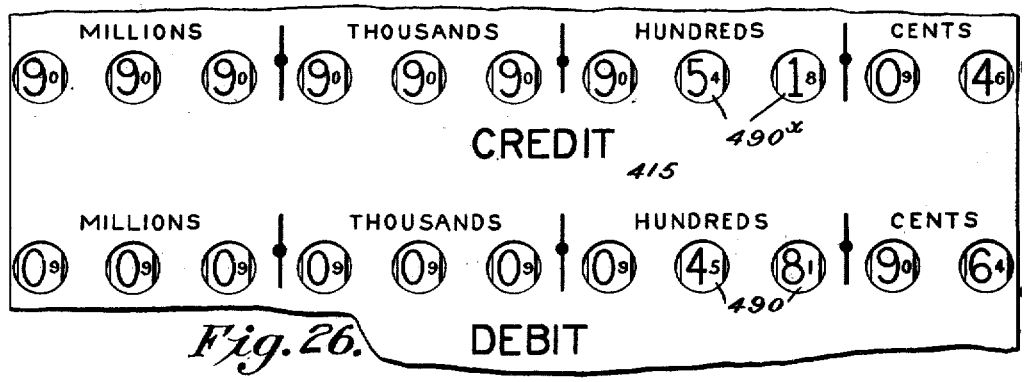
Figure 33:
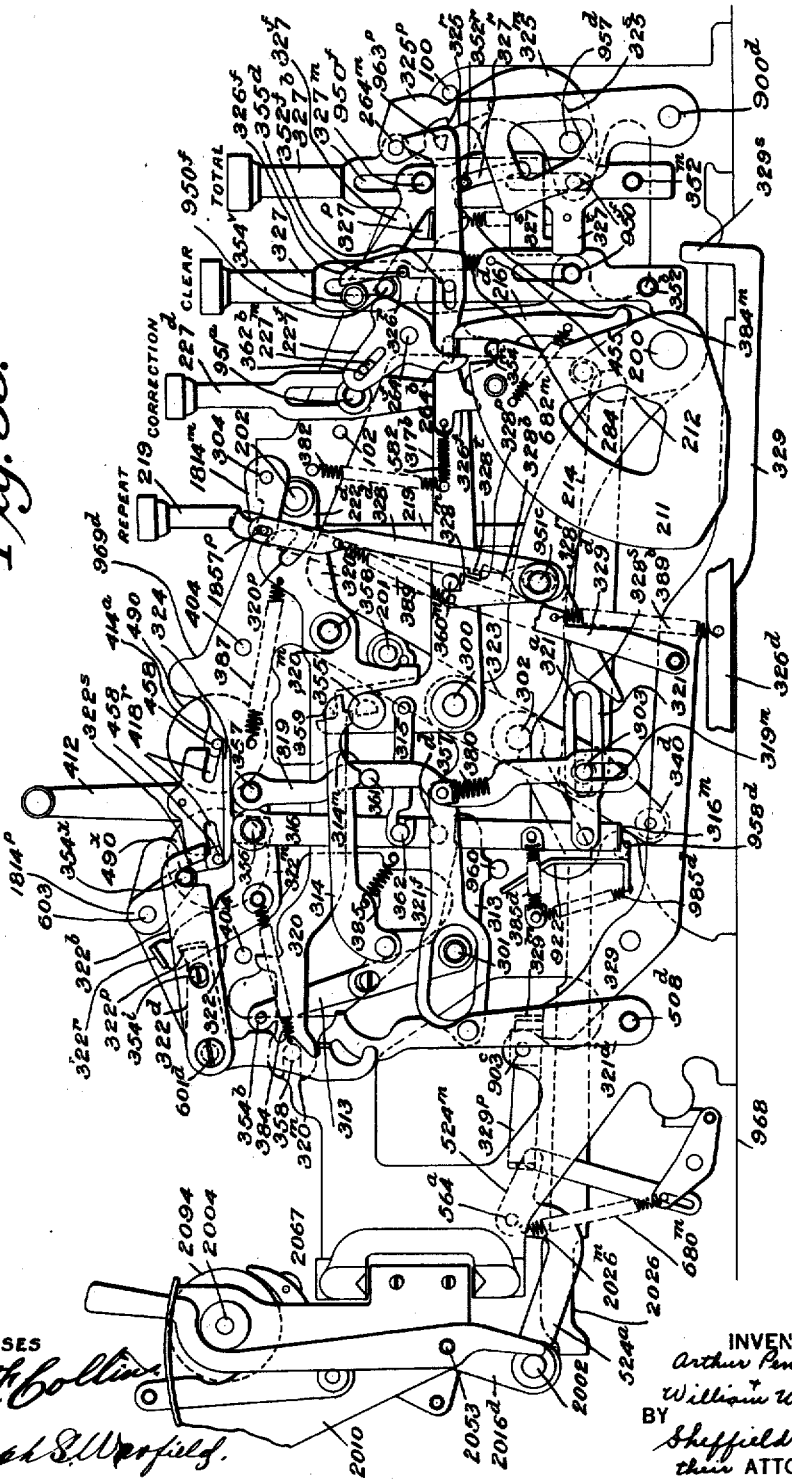

Fig. 4 is a detail side view, taken from the right hand side, and showing the counter-selecting-selecting mechanism, its control of the ribbon mechanism, the interlock between the counter-selecting mechanism and the total and clearing keys, and, in dotted lines, the indicating feeler for the counter-selecting mechanism to enable the operator to determine when he has correctly adjusted the counter-selecting lever, the parts being shown at rest, with the counter-selecting mechanism in its intermediate position, wherein it locks both sets of counters against operation;

Fig. 5 is a similar view, showing the positions assumed by the parts at the end of the forward stroke, the counter-selecting mechanism having been adjusted from the non-add position shown in Fig. 4, to one of its extreme positions, wherein it has located the ribbon-shifting mechanism for operation, and freed one set of counters;

Fig. 6 is an enlarged detail side view of the accumulating mechanism and coöperating parts, showing in full lines the carry or transfer mechanism in its normal set position, the parts being at rest, and in dotted lines, the position assumed by the carry-resetting bar during the return stroke to delay the operation complete of the carrying members until the counters are engaged with said carrying members;

Fig. 7 is a similar view, showing the positions assumed at the end of the forward stroke, the carry-resetting bar being in one of its extreme positions in which it has reset the discharged carrying members of the active set of counters, both sets of counters being clear;

Fig. 8 is a detail view, showing in full lines, the intermediate or arresting position of the carry-resetting bar, assumed at the outset of the return stroke, a carrying member being restrained by the resetting bar against effective operation. This is the dotted line position of Fig. 6;

Fig. 9 is a similar view, showing the carry effected, the resetting bar having retired to its normal idle position;

Fig. 10 is a plan view, partly broken away, and parts omitted, to show the carrying members and the resetting bar; also the control of the resetting bar by the counter-selecting mechanism, the resetting bar being shown in its ineffective lateral position which it occupies when the counter-selecting mechanism is in its non-add position;

Fig. 11 is a detail side view of the counter-selecting mechanism, showing its control of the carry-resetting bar and the non-add sign, the counter-selecting means being in its non-add position. Dotted lines show the relaxed position assumed by the non-add sign tripping device when the counter-selecting means is in any of its extreme positions;

Figs. 12 and 13 are detail plan views, showing the positions assumed by the carry-resetting bar relatively to the sets of carrying bars, when the counter-selecting means is in either of its extreme positions;

Fig. 14 is a detail side view of the printer section, showing the mechanism controlled by the clearing key and by the subtraction device, to lock the hammers against effective operation, the non-print mechanism being in idle position;

Fig. 15 is a sectional view thereof, also showing the cushioning means for the type-carriers in idle position;

Fig. 16 is a similar view, showing the printing mechanism discharged and the cushioning means in effective position, during an operation of the machine;

Fig. 17 is a rear end view of the printer and ribbon mechanisms, parts being omitted, showing the type bar cushioning mechanism in idle position;

Fig. 18 is a detail side view, partly in section, showing the subtraction or communication device, the interlock between such device and the total and clearing keys; the non-print mechanism controlled by the subtraction device, and the sign printing mechanism, the parts being in their normal positions;

Fig. 19 is a similar view, showing the subtraction or communicating device in one of its adjusted positions, and the parts in the positions assumed at the end of the forward stroke;

Fig. 20 is a detail sectional view of the subtraction or communicating device, showing the rack-arresting stops in normal idle position;

Fig. 21 is a similar view, showing the parts in operative position when the subtraction lever is in its adjusted position shown in Fig. 19;

Fig. 22 is a detail, showing the rack-arresting stops for the units and tens denominations contrasted to illustrate the means, whereby the units rack is permitted an excess travel of one step;

Fig. 23 is a detail, showing the means for mounting the tube 300$^b$ and cross shaft 300 in the frame;

Figs. 24, 25 and 26 are detail views of the plural sets of counters to show the use of the complementary numerals thereon;

Fig. 27 is a diagrammatic view, showing the association of the principal and codigital numerals on the units and tens counters;

Fig. 28 is a fragmentary detail front view of the spring-anchoring and guide plate 220$^b$;

Fig. 29 is an enlarged detail side view, showing the subtraction or communication lever control of the rack detents and coacting parts, the lever being in neutral position;

Fig. 30 is a detail plan view of the same;

Fig. 31 is a detail perspective of one of the latches 612 which retains the carrying bar 610 in set position, and also arrests its counter 490 in zero position;

Fig. 32 is a sample of recapitulation work which this machine is adapted to perform;

Fig. 33 is a left side view of the machine, parts being omitted, showing the idle stroke-enforcing means, and the outer connections which control the means for bracing the counter axle, the machine being in normal idle position;

Fig. 34 is a detail side view, of the train of idle stroke mechanism, the total key being depressed, and the clearing key disconnected from the totaling mechanism, the machine being at rest;

Fig. 35 is a similar view of the same mechanism, showing the clearing key depressed, the machine being at rest;

Fig. 36 is a detail perspective view of the bail interposed between the transmitting lever and the line space disabling member;

Fig. 37 is a fragmentary detail side view, showing the bracing mechanism for the counter axle in idle position;

Fig. 38 is a similar view, showing the bracing mechanism effective at the end of the forward stroke;

Fig. 39 is a top plan view, similar to Fig. 10, showing the bracing means for the counter axles, and the keyboard control of the idle stroke mechanism;

Fig. 40 is a detail right side view of the interlocking mechanism between the counter-selecting lever and the main drive shaft, to prevent operation of the machine by either the touch bar or handle, unless the lever is stationed in one of its adjusted positions. In this figure, the counter-selecting lever is in its intermediate position, as in Fig. 4, the machine being at rest. This view also shows the counter-selecting lever control of the idle stroke mechanism, whereby to prevent depression of the total or clearing keys, notwithstanding a preceding idle stroke;

Fig. 41 is a similar view, showing the counter-selecting lever in a partially adjusted position, at which time, the several locking means become effective to prevent operation of the machine;

Fig. 42 is a detail left side view, showing the communication or subtraction lever-controlled locking means to prevent actuation of the machine unless the subtraction lever is in its neutral or its extreme positions, the lever being shown in its neutral position and the machine at rest. Also, is shown in dotted lines, the latching means for retaining the communication lever in either of its extreme adjusted positions, and the correction key control of such latch.

Figure 44:
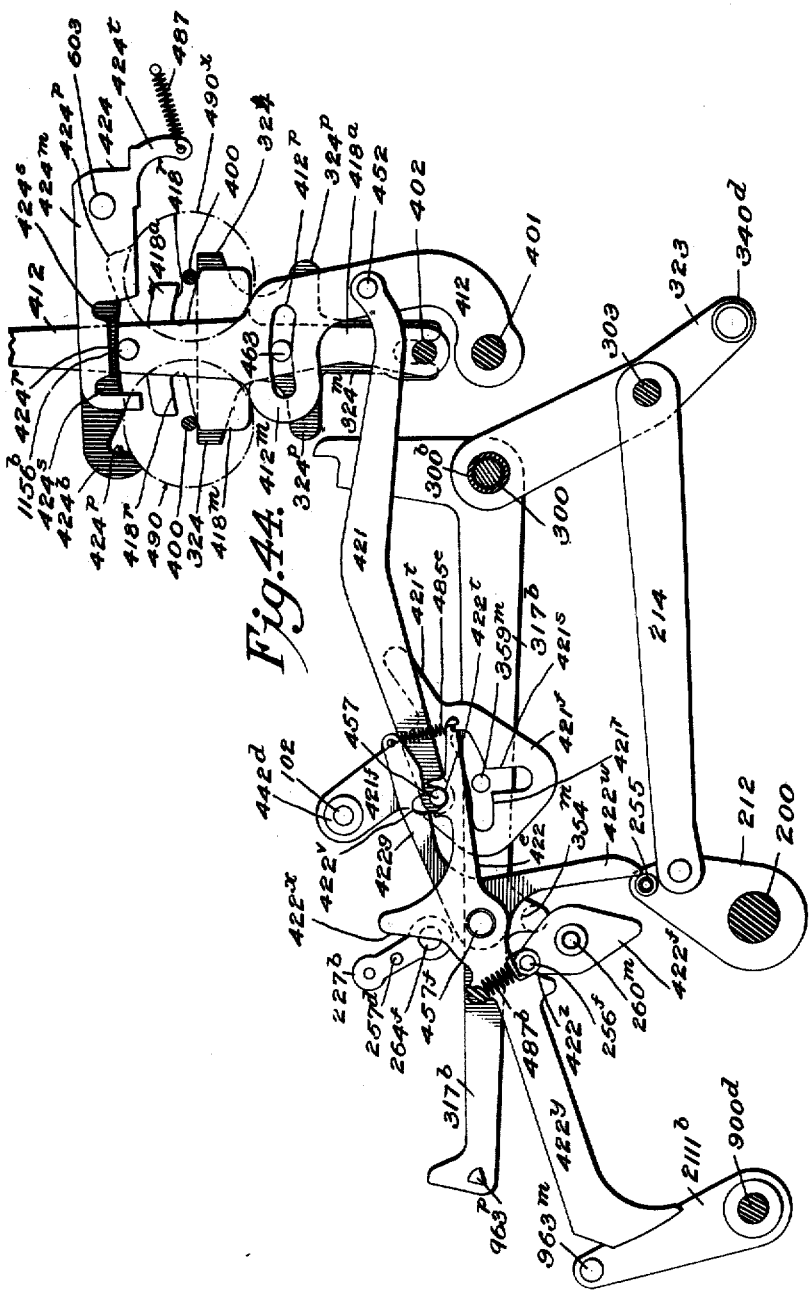

Fig. 43 is a similar view, showing the communicating or subtraction lever in a partially adjusted position, at which time, the machine locks are effective;

Fig. 44 is a detail side view of the subtraction lever latching members; and

Fig. 45 is a sectional view looking to the left, showing the subtraction lever-controlled machine locking means more clearly.

Our improvements are herein illustrated as applied to calculating machines of that type shown in U. S. Letters Patent to Wales, No. 797,032, August 15, 1905; McFarland, No. 842,232, January 29, 1907; White, No. 940,766, November 23, 1909; Bickford, No. 1,086,580, February 10, 1914, and No. 1,112,516, October 6, 1914, to which reference is made for a more complete understanding of the various constructions and the functions thereof, herein set forth, and our invention also embodies an improvement in the method of communication between the multiple counters disclosed, for instance, in U. S. Patents to Peters No. 1,255,568 and 1,255,821, February 5, 1918.

Figure 1:
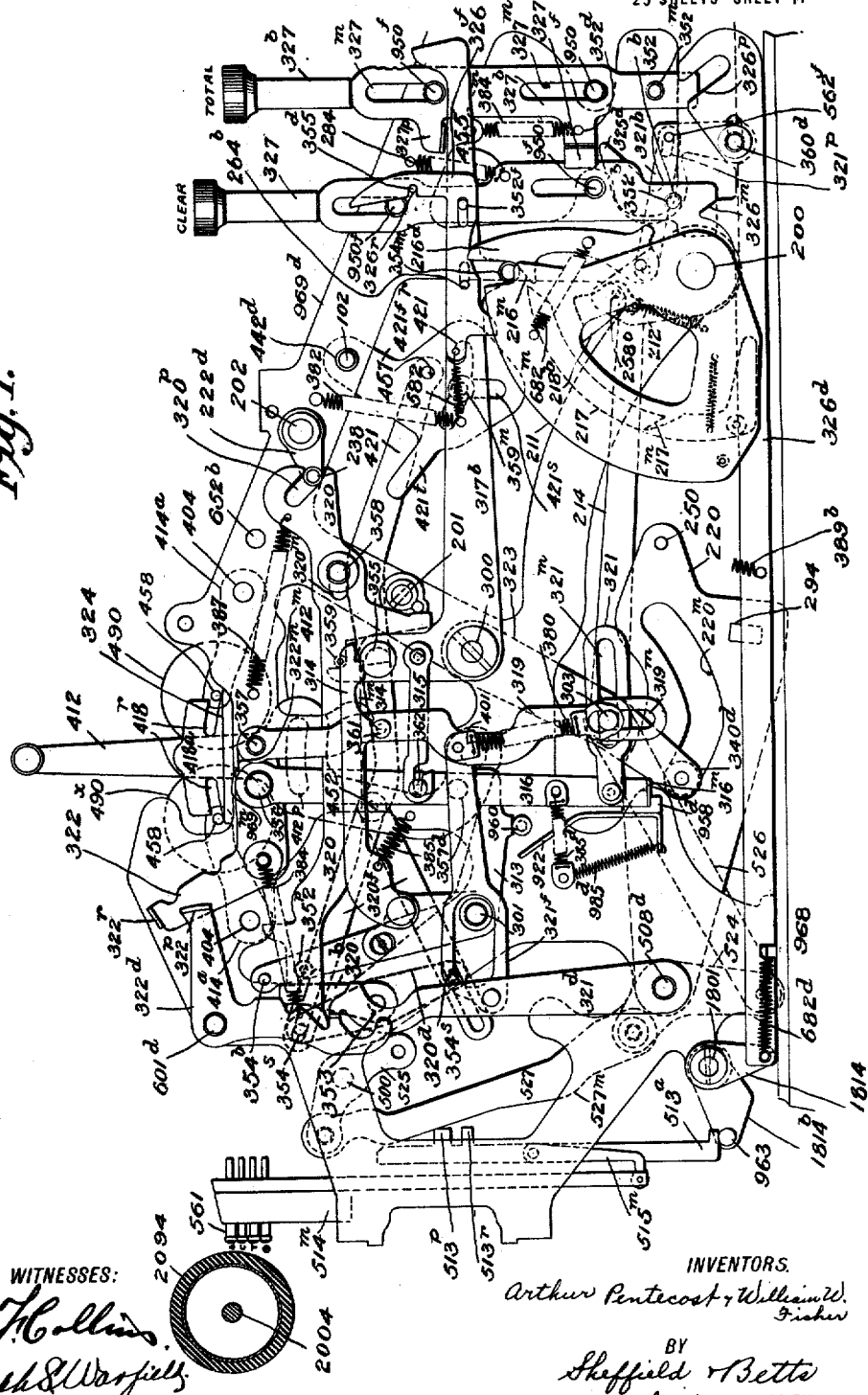
Figure 1 is a view in side elevation of one embodiment of our invention, applied to the well known Wales machine, looking at the left hand side, parts being omitted to avoid undue complexity, the machine being idle.
Figure 2:
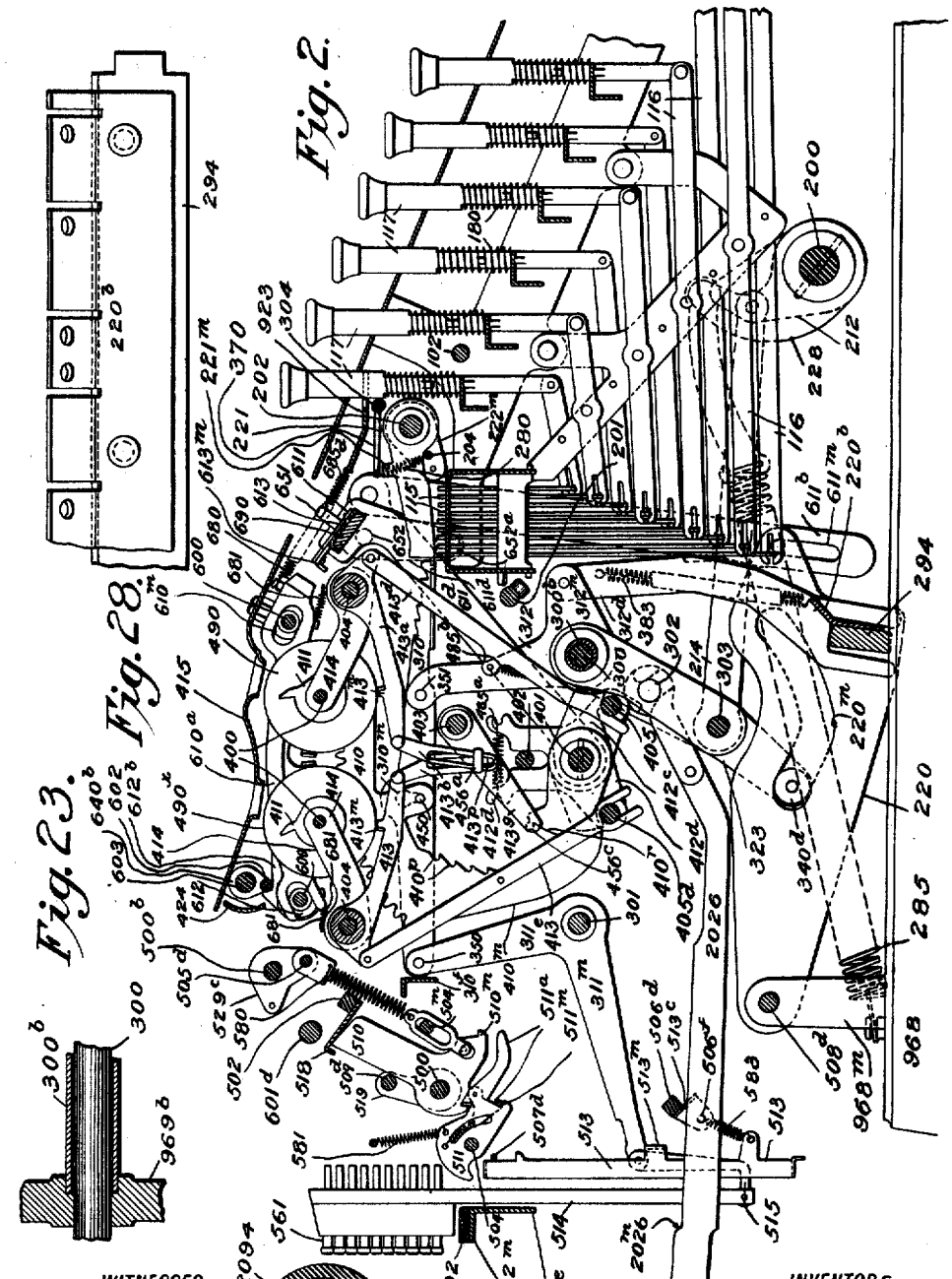
Fig. 2 is a sectional view taken from the left side of the machine, some of the less important parts being omitted.

Referring to Figs. 1 and 2, a base 968 supports side frames 969$^d$, between which are arranged from front to back, a keyboard, or selective mechanism, an accumulating mechanism, and printer and ribbon mechanisms, respectively.

Keyboard.

The similar keys 117 (Fig. 2) of the keyboard, are arranged in denominational rows, (Fig. 3) preferably according to the decimal system, and operate individual levers 116 to control corresponding stops 115 (Fig. 2) arranged in similar denominational rows along the paths of positioning bars 310, (Figs. 2, 6 and 7).

Depressing any of the keys 117 against the tension of its restoring spring 180, rocks its lever 116 to set its respective stop 115, in the corresponding denominational row of stops. The stops 115 of the denominational rows, when set, project into the paths of the series of positioning bars 310 which correspond denominationally with the rows of keys and stops, to determine the digits to be accumulated on the respective denominational counters 490 or 490$^x$.

Accumulating mechanism.

Front arms 312 journaled on a tube 300$^b$ (Figs. 2 and 23) extending across the machine and seated at its ends in the side frames 969$^d$, pivotally support the front ends of the longitudinally extending positioning bars 310 at points 351. Rear arms 311 journaled on the cross rod 301 pivotally support the positioning bars at points 350.

Segmental racks or drive members 410, (Figs. 2, 6 and 7) whose stocks 410$^m$ are journaled on a cross shaft 401 located intermediate the cross rod 301 and tube 300$^b$, are pivotally connected by the headed studs 450 to their corresponding positioning bars 310.

It will be noted that the positioning bars are adapted to have a general forward and backward travel, whereas, the drive members 410, which are pivotally supported substantially on a plane with the pivotal supports of the arms 312 and 311, travel in an arc, and to enable the drive members and positioning bars to coact in spite of this difference in their paths, the distance between the centers of the tube 300$^b$ and cross rod 301, and the pivot points 351, 350, respectively, is conveniently made to correspond to the distance between the center of the rack-supporting cross shaft 401 and the fulcrum studs 450 connecting the racks 410 and positioning bars 310. The distance between the intermediate shaft 401 and either the cross tube 300$^b$ or cross rod 301 corresponds to the distance between the fulcrum stud 450 and either of the pivot points 350 and 351. Consequently, there is no vertical motion of the studs 450 relatively to the positioning bars 310.

For convenience in assembling and disassembling, the fulcrum studs 450 are shown seated in keyhole slots 310$^m$ (Figs. 2, 6 and 7) in the positioning bars 310, but such slots are not necessary to the proper coöperation of the racks and positioning bars.

Depending restoring links 312$^d$ (Fig. 2) pivotally connected to short forward extensions 312$^m$ of the several front arms 312, are forked at their lower ends to embrace a transversely extending restraining and restoring bar 294 mounted in and connecting the forward ends of a pair of levers 220 journaled at their rear ends on the fulcrum shaft 508$^d$ extending between the side frames 969$^d$. Posts 968$^m$ projecting upwardly from the base 968 support the fulcrum shaft intermediate its ends.

The forked ends of the links 312$^d$ are guided by slots in a guide plate 220$^b$ (Figs. 2 and 28) fastened to and projecting above the restraining and restoring bar 294, and springs 383 (Fig. 2) connected to the links 312$^d$ and to the guide plate, tend to advance the positioning bars 310 against the stops 115.

Suspension bars 323 journaled on the cross tube 300$^b$ carry rolls 340$^d$ entered in cam slots 220$^m$ (Figs. 2, 6 and 7) formed in the levers 220.

Draft links 214 connect the suspension bars 323 with cranks 212 fixed on the main drive shaft 200 journaled near the base in the forward ends of the side frames 969$^d$.

The usual main spring 285 (Fig. 2) connected to the main drive shaft, restores the latter and its connected parts to, and retains them in, home position.

Normally the rolls 340$^d$ lie at the rear ends of the cam slots 220$^m$, as shown in Fig. 6, to retain the restraining and restoring bar 294 at one end of its travel, and hold the positioning bars 310 and the drive members 410 in their retired positions.

The cross tube 300$^b$ surrounds a cross shaft 300, (Figs. 2 and 23) journaled in the side frames 969$^d$. The tube strengthens the frame and imparts added rigidity thereto. Furthermore, by mounting the front supporting arms 312 and the suspension bars 323 on the tube, the cross shaft 300, is relieved of the strain caused by the tension of the drive springs 383 acting upon the short arms 312$^m$, to advance the positioning bars 310 and racks 410, as well as the tension of the main spring 285 operating through the main drive shaft 200, and draft links 214 on the suspension bars 323.

*Multiple counters and supporting devices.*

The denominational counters 490, 490$^x$ (Fig. 2) of which there may be two or more sets, coact with the drive members 410.

In the present instance, we have shown two sets of counters or accumulators, the forward set 490 of which may be called, for convenience, the "debit" set, and the rearward set of counters 490$^x$ the "credit" set. As both sets are substantially similar, a description of one will suffice for both, and reference will be made to any differences. Each accumulator includes several counters loosely mounted for independent rotation on an axle 400 carried by several arms 414 fast on a cross bar 404 extending between the side frames. The respective series of arms 414 project toward each other from the respective parallel cross bars 404, to locate the respective debit and credit accumulators parallel with and adjacent each other. Pinions 435 (Figs. 6-10) fast with the respective counters, mesh with the corresponding racks or drive members 410.

Normally, the counters 490, 490$^x$ of both accumulators occupy the elevated positions shown in Figs. 1, 2, 6, 9 and 37, and it will be noted from the following explanation and the drawings, that we have contrived to combine the multiple accumulator mechanism with the Wales single accumulator control mechanism in a simple, novel and efficient manner, so as to retain all the advantages of the former Wales mechanism and enlarge its scope of usefulness.

Much of the description of parts immediately following, will be found in the well known Wales machine, and is disclosed in U. S. patents to Wales, No. 797,032, August 15, 1905, and to McFarland, No. 842,232, January 29, 1907.

In the present construction, the right hand ends of the axles 400 project beyond the end counters 490, 490$^x$ (see Figs. 10 and 39) of the respective accumulators and rest loosely upon the vertically shiftable head 324 (Figs. 1, 4, 5, 10 and 11) of a counter-disengaging and supporting plate arranged adjacent the right hand side frame 969$^d$ of the machine. The left hand ends of the axles 400 (see Figs. 10 and 39) terminate short of the left hand side frame, to afford room for the throw of the subtraction lever 412 hereinafter set forth. Therefore, to provide supporting means for the left hand ends of the respective sets of counters, the left hand ends of the parallel cross bars 404 carry arms 414$^a$ secured thereto and lying parallel with the associated axle-bearing arms 414. The arms 414$^a$ extend toward each other, and have outwardly projecting lateral studs 458 which lie in alinement with the respective front and rear axles 400, and rest upon a vertically shiftable counter-disengaging and supporting head 324 adjacent the left hand side frame 969$^d$, similar in all respects to the right hand head 324, thus providing similar controlling means for both ends of the sets of counters. The heads of the respective plates 324 are of sufficient extent to lie beneath and support all of the axles 400 and the studs 458 on the opposite sides of the machine. The depending stems 324$^m$ (Figs. 4, 5 and 11) of these plates are forked to embrace and be guided by a shaft 402 journaled in the side frames 969$^d$. The counter-disengaging and supporting mechanism is the same on both sides of the machine.

Oppositely located ears 324$^p$ on the stems 324$^m$ of the respective sustaining and counter-disengaging plates 324, pivotally support pairs of upwardly-extending hooks or latches 324$^b$. Corresponding hooks on each plate are adapted to engage the projecting stud 458 and the axle 400, respectively of the particular set of counters selected for operation, to thereby connect the counters and sustaining plates, as shown in Fig. 5.

These latches will be hereinafter referred to, in connection with the counter-selecting mechanism.

Studs 356 (Figs. 1 and 33) project outwardly from the respective supporting plates 324, and through vertical guide slots 969$^m$ in the side frames 969$^d$. These studs pass through arms 322$^m$ of bell crank levers 322 pivoted to the outer faces of the respective side frames. Props 319 pivoted to the arms at 357, normally support the arms 322$^m$ in their elevated positions.

The props 319 are slotted at their lower ends, at 319$^n$ to embrace and rest upon a trip rod 303 mounted in the suspension bars 323. The trip rod and suspension bars form a swinging frame, the draft links 214 being connected to the trip rod to oscillate the frame forwardly and backwardly.

After the proper keys 117 (Fig. 2) have been depressed to set up the desired stops 115 corresponding to the amount to be registered, the main drive shaft 200 is turned forwardly against the tension of the main spring 285 to swing the suspension bars 323 forwardly (Fig. 7) and cause the rolls 340$^d$ thereon to traverse the cam slots 220$^m$, and rock the levers 220 downwardly. The levers 220, in turn, withdraw the restraining and restoring bar 294 (Fig. 2), which tensions the drive springs 383 and causes the actuating links 312ᵈ to swing the arms 312 forwardly, the links 312ᵈ following and being guided by the bar 294 and plate 220ᵇ. The arms 312 advance the positioning bars 310, together with the drive members 410 thereto connected, until the positioning bars are arrested by the projected stops 115, or by denominational rack detents 221 (Figs. 2, 29 and 30) journaled on a cross shaft 202, which detents normally lie in the paths of their denominational positioning bars, and are respectively displaced by the corresponding denominational stops 115 as the latter are set.

The arrest of the positioning bars occurs prior to the completion of the downward throw of the restraining and restoring bar 294, the additional travel of which operates to further tension the drive springs 383. The forked ends of the links 312ᵈ are sufficiently long to maintain contact with the bar or with the guide plate 220ᵇ throughout the full travel thereof.

The suspension bars 323 (Fig. 1), on such forward stroke, advance the trip rod 303, which first travels in a descending arc. This travel, by relieving the props 319 of support, would permit the engagement of the counters 490 and racks 410 at the beginning of the forward stroke, before the racks have advanced, to prevent which, in adding operations, the studs 356 carry depending legs 316, (Figs. 1 and 33) the feet 316ᵐ of which contact angular seats 958ᵈ to maintain the supporting plates 324 elevated and the counters 490 disengaged from their racks 410.

The ends of the trip rod 303 enter slots 321ᵐ in links 321 pivoted to the legs 316, and as the rod 303 advances, it idly traverses the slots 321ᵐ in the links 321 and shifts along the slots 319ᵐ in the props 319 (which are held suspended by the legs 316 and seats 958ᵈ) to afford time for the positioning bars 310 to advance against the key-set stops 115, or against the rack detents 221.

By the time the trip rod 303 has reached the outer ends of the slots 321ᵐ, the bars 310 have reached their advanced positions, and the rod now draws the links 321 forwardly to disengage the legs 316 (against the tension of restoring springs 385ᵈ) from the seats 958ᵈ, and thereby release the arms 322ᵐ, which thus deprived of support, swing downwardly to enable the supporting plates 324, together with the counters 490 and pinions 435, to drop, meshing the pinions with the racks 410, (as shown in Fig. 7) preparatory to registering the amounts represented by the advanced racks, on the counters.

Springs 380 (Fig. 1) connecting the props 319 and the trip rod 303, and tensioned by the latter on its advance, operate to snap the counters into mesh with their racks.

The seats 958ᵈ are swiveled in their respective side frames 969ᵈ and as the feet 316ᵐ are withdrawn therefrom, they trip the seats forwardly, aided by springs 985ᵈ connected to the seats, in position to accommodate the feet upon the restoration of the latter, and take up clearance between the feet and seats, which would otherwise permit a partial descent of the counters at the beginning of the forward stroke.

Stop arms 922 projecting from the seats 958ᵈ strike abutments 960 on the respective side frames 969ᵈ to arrest the seats in tilted position.

Counter lock.

To prevent any possibility of the counters rebounding after having dropped into engagement with their racks, we utilize the locking mechanism shown in U. S. patent to White, No. 940,766, November 23, 1909.

Thus, bell crank latches 322ᵈ (Figs. 1 and 33) pivoted on the opposite ends of the brace rod 601ᵈ, carry keepers in the form of ears 322ᵖ on their forward arms, which lie adjacent to lugs 322ʳ on the upper arms of the lifting bell cranks 322. Disabling bars 321ᵈ journaled on the opposite ends of the cross shaft 508ᵈ, normally contact the lower arms of the bell crank latches 322ᵈ, to hold the latches in idle position against the influence of springs 384 connected thereto. Links 321ᵗ connect the disabling bars 321ᵈ and the props 319 to maintain the disabling bars effective, so long as the props remain in their normal retired positions, shown in Figs. 1 and 33.

During the forward stroke of the main drive shaft 200, the trip rod 303, as it traverses the slots 319ᵐ in the props 319, swings the props forwardly. The props draw the links 321ᵗ forwardly and rock the disabling bars 321ᵈ to free the latches 322ᵈ to the action of their springs 384, which shift the latches 322ᵈ to bring the ears 322ᵖ into contact with the lugs 322ʳ on the lifting bell cranks 322. As the counters 490 drop into mesh with the drive members 410, at the end of the forward stroke, the upper arms of the lifting bell cranks 322 rock forwardly and clear the ears 322ᵖ, whereupon the ears 322ᵖ, which have been in contact with and restrained by the lugs 322ʳ, snap immediately behind the lugs 322ʳ to hold the counters and racks in engagement.

The main drive shaft 200 on its return stroke, restores the trip rod 303 and the suspension bars 323, (Fig. 2), the rolls 340ᵈ of which retrace their paths in the slots 220ᵐ of levers 220, to return the levers and press the restraining and restoring bar 294 against the actuating links 312ᵈ, which followed the restoring bar on its downward stroke. The actuating links are thus forced upwardly to return the positioning bars 310 and toothed members 410 to their home positions. During such retirement, the advanced racks 410 turn the counters 490, or 490ˣ to register thereon the amount represented by the depressed keys 117.

The trip rod 303, during the first part of its return stroke, traverses the slots 319ᵐ in the props 319, and 321ᵐ in the links 321, to afford time for the racks 410, as they retire, to register amounts on the counters. In so doing, the trip rod swings the props 319 rearwardly to cause the links 321ᶠ to press the disabling bars 321ᵈ against the lower arms of the bell crank latches 322ᵈ and swing the latter to idle position against the tension of their springs 384, whereby to displace the ears 322ᵖ relatively to the lugs 322ʳ on the counter-supporting arms 322.

As the trip rod begins its upward swing, at which time the racks have been restored, it contacts the upper ends of the slots 319ᵐ (Fig. 1) of the props 319 to force them upwardly and rock the arms 322ᵐ, which raise the supporting plates 324 to disengage the counters 490 or 490ˣ from the racks or drive members 410.

The arms 322ᵐ, as they rise during the return stroke of the main drive shaft, lift the legs 316 until the feet 316ᵐ clear the seats 958ᵈ, whereupon, the superior springs 385ᵈ tensioned by the advance of the legs when the links 321 were pulled forwardly by the trip rod 303 at the end of the forward stroke, snap the feet against the backs of their seats, to restore the latter to upright position against the tension of the inferior tilting springs 985ᵈ, to take up the clearance between the seats and feet. By this means, the counters are supported against any material descent during the advance of the positioning bars 310 and racks 410, until the legs 316 are tripped. This permits a reduction of the distance through which the counters drop to mesh with the racks, and renders the mechanism even more accurate than heretofore.

The depressed keys 117 are released on the return stroke to the action of their restoring springs 180 which also return the projected stops 115, by means substantially like that disclosed in U. S. patent to Wales, No. 797,032, August 15, 1905, and McFarland, No. 842,232, January 29, 1907, to which reference is made for a more complete understanding of the mechanism, and the rack detents 221 return to normal effective position, shown in Fig. 2.

*Carrying or transfer mechanism.*

Turning of any of the counters 490 of lower denomination from its "9" position, to its "0" position in adding by the decimal system, necessitates the transfer of "1" to the counter of next higher order, to accomplish which we have devised a simple yet highly efficient counter-controlled carrying mechanism independent of the racks, and effective also to prevent accidental rotation of the counters during their disengagement from the racks.

The corresponding denominational counters of the respective sets of accumulators mounted on their separate axles 400, lie in alinement (Fig. 10). Carrying bars or members 610, 610ᵃ (Figs. 6 to 10, 12 and 13) are arranged in pairs longitudinally of the machine, and slidably supported for endwise travel on parallel cross rods 600, extending between the side frames and located, respectively, in front of the forward set of counters 490, and behind the rear set of counters 490ˣ. The rear ends of the carrying members 610, 610ᵃ are bifurcated to embrace the rear rod 600 for guidance, the front ends of the carrying members being slotted, as at 610ᵐ, through which slots, the front cross rod 600 extends. The carrying members 610ᵃ coact with the corresponding denominational counters 490 of the front set, short toothed racks 610ᵖ being formed on the lower edges of the carrying members and near their forward ends, with which the pinions 435 of the front set of counters normally engage. The pinions, and consequently their counters, are thus held against accidental rotation, when disengaged from their drive members 410, (Figs. 6 to 9), the short racks 610ᵖ serving as counter control means for this purpose.

Carrying members 610 coact with the corresponding denominational wheels 490ˣ of the rear set of counters, and are provided with similar short racks 610ᵖ located near their rear ends with which the pinions 435 of the rear set of counters normally engage.

The sets of carrying members operate in exactly the same manner to accomplish the same results, but are entirely independent of each other.

Detents 612 (Figs. 6–10 and 31) journaled on the rear cross rod 600 adjacent the carrying members 610, have lugs 612ᵐ extending over and resting upon the upper edges of the carrying members, in the paths of shoulders 612ᵖ on such members, to retain the members in normal position against the tension of springs 680 attached to the front ends of the bars 610, 610ᵃ and to an anchor plate 923 extending between the side frames. The springs 680 tend to advance the carrying members 610, 610ᵃ. Lateral ears 612ʳ on the detents extend oppositely to the lugs 612ᵐ, into the paths of cams 411 fixed to turn with the respective counters 490ˣ.

Detents 612ᵃ, similar to detents 612 and provided with lugs 612ᵐ and ears 612ʳ, are journaled on the front cross rod 600 to coöperate with the carrying bars 610ᵃ of the front series of counters and with cams 411 on the front counters 490, in like manner.

When any of the counters 490, 490ˣ (with the exception of the counter of highest denomination) turns from its "9" to its "0" position, its cam 411 wipes against the corresponding ear 612ʳ of its detent 612, or 612ᵃ to swing the detent upwardly against the tension of its retaining spring 681, thereby displacing the lug 612ᵐ from in front of the shoulder 612ᵖ to free the carrying bar which coöperates with the counter pinion 435 of next higher order, to the action of its spring 680.

Fig. 6 shows the front and rear sets of counters engaged with their respective combined carrying bars and counter control members 610, 610ᵃ which is the normal position of the parts prior to the forward stroke.

The full line positions of the tripping cams 411 indicate that both sets of counters are cleared or registering zeros.

The dotted line position of the cam 411 of the rear set of counters 490ˣ indicates the position assumed when the counter registers "9."

Fig. 7 shows the positions of the parts at the end of the forward stroke, during an adding operation, the rack 410 having advanced until arrested by the key-set stop 115, in position to accumulate "9" on the rear counter 490ˣ, which has just dropped into mesh with its rack, such counter being clear.

The carrying action from one counter to another is initiated only when the counters are in mesh with the adding racks 410 and out of mesh with their carrying racks 610ᵖ, and during the retirement of the racks to their home positions.

Obviously, if the carrying bar was permitted to complete its operation at this time (while the pinion is engaged with its drive member 410 and disengaged from the carrying bar and controlling member 610) such operation would be futile. On the other hand, if the carrying bar, when tripped, was held against any advance, the cam 411 which passes out of contact with the lug 612ʳ as the counter reaches its "0" position, would allow the detent to snap back into its former effective position, and again lock the carrying bar against operation. Therefore, we arrange means to permit a slight displacement of the carrying bar 610 when tripped, relatively to its detent, sufficiently to locate its shoulder 612ᵖ beneath the lug 612ᵐ of the detent (Fig. 8) to prevent the detent from resuming its effective position, and then arrest the released carrying bar before it has completed its effective throw, such means also operating to release the bar for complete operation, and to restore the bar to normal set position in readiness to perform another carrying operation.

In following the sequence of operations of the machine, it will be necessary to explain the method of resetting the carry, which operation occurs prior to the carry-delaying operation.

Arms 611ᵈ (Figs. 2, 6 and 7) journaled on the cross shaft 401 near its opposite ends, support a cross rail 690 on which is slidably mounted a carry-delaying and resetting bar 613, one edge of which projects rearwardly beyond the rail 690 in front of the forward ends of the carrying bars 610 and 610ᵃ, and is preferably flanged to afford a wide contact face to coöperate with the forward ends of the carrying bars.

Normally, the arms 611ᵈ rest against projecting studs 652ᵃ mounted in the free arms of bell cranks 611ᶠ pivoted to the respective side frames at 652, to support the carry-delaying and resetting bar 613 in its retracted position shown in full lines in Fig. 6, at which time it is farthest removed from the carrying bars 610 and 610ᵃ.

The levers 220, heretofore referred to, which control the advance and retirement of the drive members 410, and rock downwardly and then upwardly during the operation of the machine, carry pins 250 at their forward ends, entered in slots 611ᵐ formed in the lower ends of links 611ᵇ connected at their upper ends to the remaining arms of the bell cranks 611ᶠ.

During the major portion of the forward stroke, the pins 250 idly traverse the slots 611ᵐ to afford time for the trip rod 303 to trip the counter-supporting mechanism. Just prior to the end of the forward stroke, and immediately subsequent to the engagement of the counters 490 or 490ˣ with their drive racks 410, and their consequent disengagement from the carrying bars 610, or 610ᵃ, the pins 250 contact the lower end walls of the slots 611ᵐ to draw the links 611ᵇ downwardly and rock the bell cranks 611ᶠ, the free arms of which, carrying the studs 652ᵃ, thrust the latter against the arms 611ᵈ to swing the delaying and resetting bar 613 to the opposite end of its travel, as shown in Fig. 7, and tension the bar-restoring springs 685ᵈ secured at their forward ends to the anchor plate 923. The bar 613 during such operation, strikes the forward ends of such of the carrying bars 610 or 610ᵃ which have been advanced during the previous operation of the machine, to restore the carrying bars, against the tension of the carrying springs 680, while the active counters are disengaged therefrom.

The resetting bar 613 presses the carrying members 610, 610ᵃ rearwardly past their normal locked positions to insure that the shoulders 612ᵖ shall retreat past the lugs 612ᵐ on the detents 612 or 612ᵃ to permit the springs 681 to snap the detents back to effective position with their lugs 612ᵐ in front of the shoulders 612ᵖ. Thus, at the end of the forward stroke, all the carrying springs 680 of one set of carrying members, as well as the bar-restoring springs 685$^d$, tend to return the bar 613 to normal position.

At the end of the forward stroke, the counters 490 or 490$^x$ come under the control of the drive racks, and at the beginning of the return stroke, during which latter stroke, the racks 410 retire and turn the counters to add amounts thereon, the pins 250 withdraw from the lower ends of the slots 611$^m$, to enable the restoring springs 685$^d$, aided by the tensioned carrying springs 680, to return the resetting bar 613 toward its normal retracted position.

Immediate restoration of the carry-resetting bar 613 at this period in the operation of the machine, would enable the carrying bars 610 or 610$^a$ tripped by the cams 411 of the counters, to advance while the counters were disengaged therefrom, and consequently the "carry" would be lost.

Hence the carry-resetting bar is arrested on its return stroke in position to permit the slight advance of the carrying members 610, 610$^a$, when tripped, as follows:

The trip rod 303 (Fig. 6) normally lies in front of and in contact with projections 611$^p$ carried by locking members 611$^e$, slotted to accommodate, and travel back and forth transversely of, the supporting studs 963$^a$ and 963$^c$ extending inwardly from the opposite side frames 969$^d$. The trip rod thus restrains the locking members 611$^e$ against the action of springs 685 which tend to advance the members.

The forward ends of the locking members 611$^e$ are each formed with stepped shoulders 611$^r$, 611$^s$ and 611$^t$, and, as the trip rod 303 advances during the forward stroke, the springs 685 project the locking members 611$^e$ until at the end of the stroke, the lower innermost shoulders 611$^r$ strike lugs 611$^v$ on the links 611$^b$, (see Fig. 7) which lugs have entered the paths of the shoulders 611$^r$ as the links were drawn downwardly by the studs 250 and levers 220. At the end of the forward stroke, the lugs 611$^v$ lie below the overhanging shoulders 611$^s$.

On the return stroke, the studs 250 withdraw from the bottoms of the slots 611$^m$ of the links 611$^b$, to free the latter to the tension of the restoring springs 685$^d$, aided by the carrying springs 680, which retract the resetting bar 613, until the links 611$^b$, and consequently the bar 613, are arrested by the contact of the lugs 611$^v$ on the links, with the overhanging shoulders 611$^s$, as shown in dotted lines in Fig. 6, and indicated in Fig. 7.

This partial return of the links 611$^b$ occurs prior to the contact of the restraining and restoring bar 294 (Fig. 2) with the actuating links 312$^d$, and is sufficient to retire the resetting bar 613 from its active resetting position, shown in Fig. 7, to the intermediate position, shown in dotted lines in Fig. 6, and in full lines in Fig. 8, wherein it permits the slight advance of such of the carrying bars 610, 610$^a$ as may be subsequently released by the tripping cams 411 and detents 612 or 612$^a$, when the counters have completed a revolution under the influence of their drive members 410 during the retirement of the latter.

Fig. 8 shows the rack 410 retired after having added "1" on a counter 490$^x$ which previously registered "9." The counter, in rotating from its "9" to its "0" position, has caused its cam 411 to trip the corresponding detent 612 and thereby release the carrying member 610 which has advanced through its preliminary travel until arrested by the carry-delaying bar 613, which is in its intermediate position. The view is taken immediately after the rack has added "1" onto the counter and just prior to the disengagement of the rack and counter.

Such slight advance of the tripped carrying bars 610 or 610$^a$ takes place immediately upon the displacement of the detents 612 or 612$^a$ and is sufficient to bring the shoulders 612$^p$ of the bars 613 under the lugs 612$^m$ of the displaced detents, as shown in Fig. 8, to prevent the return of the latter, after their release by the cams 411.

The locking members 611$^e$ maintain the carry-delaying and resetting bar 613 in its intermediate position during the retirement of the drive members 410, which latter arrive at their home positions prior to the completion of the return stroke of the main drive shaft 200, farther movement of which then has no effect on the members 410, owing to the shape of the rear ends of the cam slots 220$^m$. The counters are disengaged from their drive members and engaged with the racks 610$^p$, on the carrying bars 610 or 610$^a$, during the final return travel of the main drive shaft, after which the trip rod 303, as it completes its return stroke, contacts the projections 611$^p$ to restore the locking members 611$^e$ to normal position, shown in full lines in Fig. 6, thereby freeing the links 611$^b$ to enable the restoring springs 685$^d$ to return the resetting bar 613 to normal retracted position (Figs. 6 and 9).

The springs 685$^d$ also operate through the bar 690 to rock the arms 611$^d$ against the depending arms of the bell cranks 611$^f$ to swing the latter forwardly and thereby lift the links 611$^b$ until the lugs 611$^v$ thereon, strike the over-hanging shoulders 611$^t$ to arrest the resetting bar in retracted position.

Such of the carrying members 610 or 610$^a$ as have been tripped by the numeral wheel cams 411, will follow the resetting bar on its withdrawal, due to the tension of carrying springs 680, as shown in Fig. 130

9, thereby turning their respective counters one step to effect the carry, the bars 610 or 610ª being prevented from turning the counters farther, by contact of the rear ends of the slots 610ᵐ with the front cross rod 600, which serves as an over-rotation preventer for the carrying mechanism.

Fig. 9 shows the position of the tripping cam 411 on the counter 490ˣ of higher order, after the carrying member 610 has added "1" to the counter which previously stood at zero, the parts being shown in their positions at the end of the return stroke.

The tripped carrying bars remain in discharged position until restored by the resetting bar 613 near the end of the succeeding stroke, as heretofore explained. It will be observed, therefore, that cross or successive carrying operations can be initiated at the end of a return stroke and continue until near the end of the next forward stroke, thus permitting ample time for the completion of the operation when the machine is stroked at high speeds.

Normally, the carrying springs 680 connected to the carrying bars 610, 610ª, are under tension to advance the bars or carrying racks, the travel of which is prevented by the carrying detents 612. Hence, the tension of the springs is resisted by the detents, and such tension operates to frictionally hold the detents in effective position.

When a carry is to take place, the cam 411 of the counter 490 or 490ˣ of lower denomination, whose capacity is exceeded, strikes against and positively displaces the carrying detent 612 or 612ª appropriated to the counter of next higher order, to release the carrying bar 610 or 610ª of said counter of higher order to the action of its spring 680.

The released bar advances until arrested by the carry-restoring bar 613 which is in its intermediate position at that time, and prevents complete operation of the carrying bar, but the advance of the latter would reduce the tension stored in its carrying spring 680, so that when the counters finally mesh with the carrying racks 610ᵖ, and the carrying bar 610, or 610ª is freed for complete operation, the weakened spring must still be strong enough to drive the said counter of higher denomination, one step.

This would be readily effected where the counter of higher denomination registers some other digit than its capacity, as 9 in the decimal system.

But assuming that it does register its capacity, the weakened carrying spring 680, working through its carrying bar 610, or 610ª, its counter 490, or 490ˣ, and the corresponding cam 411, must displace the coacting detent 612 or 612ª of the counter of still higher order against the frictional pressure of the normally tensioned spring 680 exerted through the shoulder 612ᵖ of the carrying bar against such last named detent.

Obviously, the tension stored in the active spring of lower order would be gradually reduced as it takes up the slight play in the train of mechanism above set forth to turn its counter, and in the actual rotation of the counter as well, so that by the time it commences to force its corresponding cam 411 against the detent 612 or 612ª of the higher order, its tension would be considerably reduced, as compared to the tension of the carrying spring of next higher order, and its action might be sluggish.

Therefore, to render the carrying action, snappy and quick, especially in cross-carrying operations, as well as to avoid grading the springs 680, we arrange the anchor plate 923 at an incline across the machine, as shown in Fig. 10, to thereby increase the tension of the springs by equal increments successively from left to right, whereby the strongest springs 680 are those adapted to effect the carrying operations from the units to the tens counters, the next stronger springs effect carries from the tens to the hundreds and so on.

*Overthrow preventer.*

The positioning bars 310 and their drive members 410 arrive at their home positions during the return stroke of the main drive shaft 200, prior to the disengagement of the counters 490, or 490ˣ from the drive members. Such disengagement is effected through a slight farther travel of the main drive shaft, and to prevent the latter, during such additional travel, from effecting a change in the positions of the bars 310 and drive members 410, we form the inner or rear ends of the cam slots 220ᵐ on an arc corresponding to the arc traversed by the suspension bar rolls 340ᵈ so that the latter may complete their return stroke and the trip rod 303 carried by the suspension arms 323 may disengage the counters from their drive members 410 and engage them with the counter control racks 610ᵖ, by raising the props 319, without raising the levers 220 past the point necessary to retire the positioning bars 310 and drive members 410 to their positions of rest.

Furthermore, to prevent the momentum of the parts, from carrying the positioning bars and drive members past their home positions on their return, especially during rapid operations of the machine, we provide a stationary flanged abutment 310ᶠ (Figs. 2, 15 and 17) against which the rear ends of the positioning bars 310 or their rear supporting arms 311 strike, to positively arrest the drive members 410 against overthrow.

Screws 962ᵈ pass through the flange on the abutment to secure the latter to a fixed part of the machine frame, as the ribbon brackets 1867, the abutment extending across the machine directly behind the rear ends of the positioning bars.

*Printing mechanism.*

Referring to Figs. 2, 15 and 16, the rear supporting arms 311 for the positioning bars 310, have rearward extensions 311$^m$ connected by links 515 with the stems of a series of denominational typecarriers 514 carrying the types 561. As the positioning bars 310 advance against the projected stops 115 during the forward stroke, the corresponding extensions 311$^m$ will rock on the cross rod 301 to lift the typebars 514 and locate the types 561 which correspond with the amount set up on the keyboard, opposite the printing line on a platen 2094, mounted on axle 2004 journaled in the end plates 2010 (Fig. 33) of a paper carriage slidable in ways 2067 connecting the rear ends of the side frames 969$^d$. Those positioning bars 310 corresponding to the denominational rows wherein no keys have been depressed, advance until arrested by the rack detents 221, to raise their coacting typebars 514 until the cipher types are located at the printing line.

A series of denominational hammers 510 (Figs. 2, 15 and 16) journaled on a shaft 500, having its bearings in the printer side frames 565, strike the adjacent ends of suitably supported firing pins or plungers 562$^b$ to drive the latter against the types positioned at the printing line.

Normally, a resetting or cocking bail 509$^d$ mounted in arms 519 fast on the shaft 500, lies across the paths of and in contact with the hammers, to hold them fully retracted against the tension of their drive springs 580. A cross shaft 500$^b$ journaled in the printer side frames 565, carries bell cranks 529$^c$ (Figs. 2, 10, 15 and 16) in which is mounted a bail 505$^d$ to which the upper ends of the drive springs 580 are attached. The opposite ends of the drive springs connect with the hammers 510.

Furthermore, individual hammer latches 511 journaled on a cross rod 504 mounted in the printer side frames 565, lie in position to lock the respective hammers 510 against operation. Springs 581 hold the latches effective. There is a slight clearance between the latches 511 and the hammers 510 when the resetting bail 509$^d$ is in normal position, as shown in Fig. 15.

Denominationally-arranged trip bars 513 operate to release the hammer latches 511. Springs 583 connected to a swinging bail 506$^c$ mounted in ears projecting from a bracket 513$^c$ secured to a rock shaft 506$^d$ journaled in the printer side frames, support the trip bars 513.

The extensions 311$^m$ of the positioning bars 310, when in normal position (Figs. 2 and 15), lie in the paths of lugs 513$^m$ projecting from the trip bars 513 to retain the latter in idle position, withdrawn from the hammer latches 511, and thereby slightly tension the springs 583.

The trip rod 303 (Figs. 1 and 19) which, it will be remembered, advances on the forward stroke of the main drive shaft, draws with it a link 526 connected at its rear end to one arm of a bell crank 524 journaled on the cross shaft 508$^d$. A link 527 (Fig. 14) connects the opposite arm of bell crank 524 with one arm of another bell crank 525 fast on the shaft 500 to rock the resetting bail 509$^d$ away from the hammers 510, prior to the operation of the latter.

A crank 527$^b$ (Fig. 14) fixed to the rock shaft 506$^d$ bears a stud 354 lying in the path of a cam 527$^m$ (Figs. 1 and 14) formed on the link 527.

As the link 527 is drawn downwardly through the advance of the trip rod 303 on the forward stroke of the main drive shaft 200, the cam 527$^m$ wipes past the stud 354 to rock the shaft 506$^d$ and tension springs 583. Such tensioning of the springs 583 occurs substantially coincidently with the upward swing of the extensions 311$^m$, when positioning the types 561 in those denominations corresponding with the depressed keys, and therefore, the springs 583 are free to raise the coacting trip bars 513, whose upper ends strike and displace the corresponding individual hammer latches 511.

Although the extensions 311$^m$ in those denominations wherein no keys have been depressed, rock upwardly until arrested by their positioning bars 310 when in contact with the rack detents 221, to position the cipher types at the printing line, such travel is not sufficient to enable the corresponding trip bars 513 to release their individual hammer latches, so that ciphers to the left of the digit of highest denomination in the amount, are not printed.

In order to print ciphers to the right, however, the tails 511$^a$ (Figs. 2, 15 and 16) carried by the respective latches 511, project toward the right to overlie shoulders 511$^m$ on the latches of next lower denomination to release such latches when the latches of higher denominations are tripped, in the usual manner.

The trip bar 303, through the hereinbefore described linkage, withdraws the hammer-resetting bail 509$^d$ from proximity to the hammers 510, early in the forward stroke, to free the hammers to the action of their partially tensioned drive springs 580. At the same time, a link 525$^d$, connecting one arm of the bell crank 524 with a crank 513$^b$, fast on the shaft 500$^b$, operates to rock the bell cranks 529$^c$ carried thereby, to further tension the hammer-driving springs 580 preparatory to the printing operation.

Obviously, the comparatively light springs 583 could not overcome the pressure of the hammer-driving springs 580 exerted through the hammers 510 on the individual hammer latches 511, and hence, such of the individual latches as are to be tripped, must be released prior to the engagement of the hammers and the latches, to which end, a universal pawl 518 takes over the hammers 510, such pawl being mounted on a rock shaft 502 journaled in the printer side frames 565. The universal pawl lies in the path of and restrains the hammers when the resetting bail 509$^d$ is withdrawn, to still leave a slight clearance between the individual latches 511 and the hammers, to enable the trip bars 513 released by the extensions 311$^m$, to displace their corresponding latches. A link 528 (Fig. 14) connected to one arm of bell crank lever 525, has a slot 528$^m$ embracing a pin 555$^b$ on an arm 517$^d$ fast on the rock shaft 502 carrying the universal pawl 518.

The pin 555$^b$ normally lies intermediate the ends of the slot 528$^m$ so as to afford time for the tensioning of the hammer drive springs 580, the release of the individual hammer latches 511, and the withdrawal of the resetting bail 509$^d$, after which and near the end of the forward stroke, the elevation of the link 528 due to the rotation of the bell crank 525, presses the lower end wall of the slot 528$^m$ against the pin 555$^b$ to raise the pawl 518 against the tension of its spring 584 (Figs. 15 and 16) and free the hammers, which drive against the firing pins 562$^b$ to impress the types positioned at the printing line, against the paper on the platen 2094.

Those hammers corresponding to the latches 511 which still remain active, drive rearwardly until the clearance between the latches and hammers is taken up, whereupon, the latches arrest the hammers against effective operation.

The main drive shaft on its return stroke, restores the trip rod 303, which, through the linkage above described, presses the resetting bail 509$^d$ against the discharged hammers 510 to re-cock them. The link 528 also releases the universal pawl 518 to the action of its restoring spring 584 to enable the pawl to snap down over the hammers when reset. Furthermore, the positioning bars 310, as they retire, lower extensions 311$^m$ and the typecarriers 514, the extensions contacting the lugs 513$^m$ to retract the trip bars 513 and thereby enable the springs 581 to render the individual hammer latches 511 effective. The cam 527$^m$ on link 527 also releases the crank 527$^b$ to relieve the trip bar-sustaining springs 583 of tension.

The above described printing mechanism with the exception of the means to control the tension of the sustaining springs 583, is found in the well known Wales machine and forms no part of the present invention.

*Typebar cushioning means.*

In some cases, it may be desirable to provide means to cushion the typecarriers 514 and their connected parts against the shock and jar incident to the sudden and abrupt arrest of the positioning bars 310 and their connected racks or drive members 410 by the abutment 310$^t$, especially during rapid operations of the machine, to which end, we provide a cushioning member (Figs. 2, 15, 16 and 17) which may conveniently comprise a fiber plate 592 secured to a horizontal shelf 512$^m$ extending between the printer side frames 565 and located slightly below the rearwardly projecting heads of the several typecarriers 514. The shelf 512$^m$ forms part of a sliding bracket 512$^e$, having a depending stem 512$^r$ arranged at an angle to the body portion of the bracket, to fit alongside one of the printer side frames 565.

A guide screw 550 (Fig. 17) passes through an elongated aperture in the bracket to secure the latter in place, the bracket being slotted at its lower end, at 512$^p$, (Fig. 15) to fit over a guide fixture 529$^t$ fastened to one of the printer side frames 565.

A tappet 551$^a$ preferably bearing an anti-friction roll 338, and mounted on the depending stem 512$^r$ of the bracket, normally rests upon the low point of an inclined cam surface 2026$^m$ formed on the thrust bar 2026 (Figs. 2, 15, 16 and 17). This thrust bar is commonly used in the Wales machine to drive the line space mechanism, (Figs. 33 and 34) hereinafter explained. A cross rod 302 (Fig. 2) mounted in the swinging suspension bars 323 which carry the trip rod 303, advances and restores the thrust bar 2026 whose inner or forward end is connected thereto.

Normally, there is a clearance between the cushioning member and the typecarriers, as shown in Fig. 15.

As the positioning bars 310 advance on the forward stroke of the main drive shaft 200, they position the type carriers 514 relatively to the platen 2094. The thrust bar 2026 advances substantially simultaneously with the positioning bars, to cause the cam 2026$^m$ to ride under the wiper 338 to raise the bracket 512$^e$ and the cushioning pad 592 which follows the typecarriers until it contacts with the lower ends of those typecarriers which have been arrested with their ciphers at the printing line (Fig. 16). The cushioning plate 592 serves at this time to aline the cipher types of such typebars at the printing line.

The cam 2026ᵐ merges into a dwell which maintains the cushioning plate 592 elevated during the remainder of the forward stroke and a part of the return stroke, on which latter stroke, the thrust bar is restored to normal position.

As the restraining and restoring bar 294 reaches that point on its return travel at which it contacts the restoring links 312ᵈ of those positioning bars 310 which have been arrested by their detents 221, with the corresponding typecarriers in cipher position, the wiper 338 of the cushioning members rides down the cam 2026ᵐ, which by such time, has been brought back to registry therewith, to enable the cushioning plate 592 to descend while the typecarriers are in contact therewith until the typecarriers are arrested by the contact of the positioning bars 310 with the abutment 310ᶠ heretofore referred to, after which the cushioning bracket 512ᵉ continues to descend for a short distance, until its wiper 338 reaches the low point of the cam, or until it rests on the guide fixture 529ᶠ.

Thus, it will be seen that at the moment when the abutment 310ᶠ arrests the positioning bars on their return, the cushioning plate 592 is in contact with the typecarriers to absorb any shock or jar which may be transmitted thereto through the sudden stoppage of the positioning bars.

*Line space feed mechanism.*

Step by step rotation of the platen to line space the paper is effected by the engagement of a pawl 2014 (Figs. 34 and 35) with a ratchet 2020 fast on the shaft 2004 at one end of the platen 2094.

The pawl 2014 is pivotally connected to an elbow crank 2016 secured to a stud shaft 2053ᵇ journaled in the adjacent end plate. A spring 2082ᵈ extending between the elbow crank 2016 and the feed pawl 2014 normally holds a pin 2058ᵗ on the pawl against a shoulder 2016ⁿ on the elbow crank. Depending arms 2016ᵈ secured to the stud shaft 2053ᵇ and to a similar stud shaft 2053 (Fig. 33) journaled in the opposite end plate 2010, respectively, support a universal line space bail 2002 in the path of the thrust bar 2026.

With the machine at rest, the thrust bar 2026 remains at its rearward limit of travel with the upturned foot 2026ᵖ thereof against the universal line space bail 2002 to hold the line space pawl 2014 advanced to the end of its effective throw relatively to the line space ratchet 2020.

As the thrust bar is drawn forwardly on the forward stroke of the main drive shaft 200, as previously explained in connection with the typebar cushioning device, it retreats from the line space bail 2002 which, owing to the tension stored in a spring 2486 (Fig. 35), follows the thrust bar, to retract the line space pawl and enable it to take a new bite on the ratchet 2020.

Printing occurs at or near the end of the forward stroke of the main drive shaft, which, upon its return, restores the thrust bar 2026 to its normal position. The thrust bar, on its return, rocks the universal line space bail 2002 rearwardly to advance the pawl 2014 and turn the ratchet 2020 and platen 2094 through a partial revolution. The line space bail 2002, as it is rocked backwardly, again tensions the spring 2486, preparatory to the next operation of the main drive shaft.

The foregoing forms a part of this invention only in so far as it is combined with the novel features herein set forth.

*Automatic line space disabling mechanism.*

A line space disabling lever or member 524ᵃ (Figs. 33–35) pivotally mounted at 564ᵃ, normally lies with its rear end in the path of the universal line space bail 2002 to prevent the latter from following the thrust bar 2026 as the latter is advanced during the forward stroke of the main drive shaft. Consequently, the line space pawl 2014 can not retract for a new bite on the ratchet 2020 and the platen is not turned.

The line space disabling member 524ᵃ is held in effective position against the tension of a spring 680ᵐ, by means of a transmitting lever 329 pivoted at 950ᵐ to the left hand side frame 969ᵈ.

A spring 389ᵇ connected at its upper end to a link 329ᵈ pivoted to the longer forwardly extending arm of the transmitting lever 329, operates to hold the forward arm of the transmitting lever 329 depressed, and its shorter rearwardly extending arm elevated against a short forwardly projecting finger 329ᵐ (Figs. 33–36) of a reversing bail 329ᵇ journaled on a cross rod 903ᶜ, and having a longer rearwardly projecting arm 329ᵖ adapted to contact and depress an extension 524ᵐ of the disabling lever 524ᵃ, to hold the disabling lever effective against the tension of its restoring spring 680ᵐ.

Obviously, since the paper must be line spaced in listing amounts in vertical columns, means must be provided to free the disabling lever 524ᵃ to the action of its spring 680ᵐ which shifts the lever to ineffective position, to which end, the upper end of the link 329ᵈ is slotted, as at 329ʳ, to embrace a pin 1857ᵖ on an arm 1814ᵐ fast on a cross shaft 304 (Figs. 33–35 and 39) journaled in the respective side frames 969ᵈ and extending parallel with and adjacent the rack detent supporting shaft 202. A bail 370 carried by the shaft 304 rests upon the offset spring terminal lips 221ᵐ on the positioning bar detents 221 (see Fig. 2) which, it will be remembered, are raised out of the paths of their corresponding positioning bars 310 by the projection of the key-set denominational stops 115, over which the detents extend.

A spring 685$^m$ superior to spring 389$^b$ connects the pin 1857$^p$ on the crank 1814$^m$ with the link 329$^d$ to yieldingly hold the bail 370 in contact with the detents 221 or their lips 221$^m$, and the lower end of the slot 329$^r$ in the link 329$^d$ adjacent the pin 1857$^p$, whereby to permit the latter to shift in the slot independently of the link 329$^d$.

Depressing a numeral key 117 projects its stop 115 against the lower edge of the detent 221 and forces the latter upwardly against the overlying bail 370 to rock the shaft 304 and the crank 1814$^m$ thereon. The tension of spring 685$^m$ is such that the upward throw of the crank 1814$^m$ is transmitted through the spring without materially changing the position of the pin 1857$^p$ in the slot 329$^r$ in the link 329$^d$, to raise the link against the tension of the inferior spring 389$^b$ and swing the forwardly projecting arm of the transmitting lever 329 upwardly, thereby lowering the shorter rear arm thereof from the forwardly projecting finger 329$^m$ of the reversing bail 329$^b$ to relieve the pressure thereagainst. This frees the reversing bail 329$^b$ and the line space disabling lever 524$^a$ to the action of the spring 680$^m$, which immediately rocks the disabling lever to ineffective position and permits the universal line space bail to advance on the forward stroke of the main drive shaft.

Upon the restoration of the positioning bar stop 115 to idle position, after the universal bail has returned to normal, the detent 221 returns into the path of its positioning bar 310 and the inferior spring 389$^b$ causes the overlying bail 370 to resume its normal position. The spring 389$^b$ also lowers the link 329$^d$ and depresses the forwardly extending arm of the transmitting lever 329, to rock the reversing bail 329$^b$ and restore the disabling lever 524$^a$ to effective position.

The automatic line space disabling mechanism is set forth in a separate application filed Oct. 7, 1918, in the name of Charles Birth, Serial No. 257,102, and no claim is made thereto in the present application.

*Clearing mechanism.*

To clear the machine of the total amount accumulated on the counters, in readiness to commence a new accumulation, the time of engagement of the counters 490 or 490$^x$ with their common drive members 410, is reversed. In this operation, the counters are caused to engage their drive members at the beginning of the forward stroke of the main drive shaft prior to the advance of the drive members. The latter then advance in the usual manner, under control of the counters, however, to reversely rotate the counters until the abrupt faces of the cams 411 (Figs. 6-10) carried by the counters strike the forward faces of the offset lips 612$^r$ to arrest the counters in their zero positions. At this time, the total amount accumulated on the counters, has been transferred to the drive members 410, and the farther forward travel of the main drive shaft, merely tensions the drive springs 383 (Fig. 2) of the drive members 410 and positioning bars 310, which tension is resisted by the offset lips 612$^r$.

The counters disengage from their drive members at the beginning of the return stroke of the main drive shaft 200, leaving the counters in their zero positions preparatory to a new accumulation, but in a totaling operation, in accordance with the present invention, the counters remain in engagement with the drive members during the return stroke, to enable the drive members to retransfer the total amount loaded thereinto on the forward stroke, back onto the counters during the return stroke, so that at the conclusion of the totaling operation, the counters will exhibit the same amount as was registered just prior to such operation, whereas at the conclusion of a clearing operation the counters all exhibit ciphers.

Clearing operations are initiated by depressing a special clearing key 327 (Figs. 1, 33-35) slotted to accommodate the guide studs 950$^f$ projecting from the left hand side frame 969$^d$. An angular coupler 326$^f$ connects the clearing key 327 with the forwardly projecting arm of a set lever 317$^b$ fastened to one end of the cross shaft 300. One arm of the coupler 326$^f$ lies parallel with and is slidably secured to the forwardly projecting arm of the lever 317$^b$ by pin and slot connections 264$^b$ and 352$^f$. The remaining vertically disposed arm of the coupler overlies the clearing key stem 327, and is recessed, as at 326$^r$, to accommodate a pin 355$^d$ on the key stem 327, and a spring 582 attached to the coupler yieldingly retains this connection between the coupler and the key.

Depression of the key 327, therefore, rocks the lever 317$^b$ and the cross shaft 300 to which it is connected.

A similar set lever 318$^d$ (Figs. 4 and 5) is fixed to the opposite or right hand end of the shaft 300, and the connections coacting with set lever 317$^b$ and shown in Fig. 1, are duplicated on the opposite side of the machine, unless otherwise noted.

Thus, links 315 connected to the respective upwardly projecting arms of the set levers 317$^b$ and 318$^d$ have pin and slot connections 362 (Figs. 1 and 33) with the legs 316, which, in adding operations, serve to delay the engagement of the counters and their drive members.

Depression of clearing key 327 and consequent rocking of the set levers 317$^b$ and 318$^d$, draws forwardly the links 315 and displaces the legs 316 relatively to their seats 958$^d$.

Furthermore, the upper arm of the left hand set lever 317$^b$ engages a pin 359 (Figs. 1, 29 and 33) on a slide 320, slotted as at 320$^m$, to embrace and be supported by studs 358 projecting from the adjacent side frame 969$^d$, and drives the slide forwardly. A roll 238 mounted on an arm 222$^d$ fast on the outer end of the detent-supporting shaft 202 is thus caused to traverse a cam slot 320$^p$ formed in the slide 320, thereby rocking the shaft 202 journaled in the side frames. Arms 222$^m$ (Figs. 2, 29 and 30) fast on the shaft 202 adjacent the inner faces of the side frames, carry a bail 204 extending beneath the detents 221, so that when the shaft 202 is rotated, as above explained, the bail lifts the detents 221 out of the paths of the positioning bars 310, prior to the advance of the latter.

Depressing the set lever 317$^b$ (Figs. 1 and 33) forces a projection 354$^m$ thereon against the cam nose 216$^m$ of a dog 216$^d$ pivoted to a segmental plate 211 fast on the main drive shaft 200, to displace the dog against the tension of its restoring spring 682$^m$. The spring returns the dog 216$^d$ to effective position after the projection passes beneath the nose, to lock both the set levers 317$^b$ and 318$^d$ depressed. The cam nose 216$^m$ of the dog 216 lies against the forward end and forms a continuation of an arcuate rib 217 (Fig. 1) secured to the inner face of the segmental plate 211. As the main drive shaft turns on its forward stroke, it rocks the segmental plate 211 to interpose the arcuate rib 217 over the projection 354$^m$ on the set lever 317$^b$ to maintain the latter and its companion lever 318$^d$ and connected parts where adjusted.

The main drive shaft 200 at the beginning of its forward stroke, swings the trip rod 303 in a descending arc, and because of the displacement of the legs 316, the counters drop into mesh with their racks or drive members 410 at the outset of the forward stroke, rather than near the end thereof, as in adding operations. The restraining and restoring bar 294 rocks downwardly, followed by the actuating links 312$^d$, to advance the positioning bars 310. The latter travel forwardly together with the racks 410, owing to the displacement of the detents 221, and as a result, the racks 410 turn the counters 490 or 490$^x$ reversely until the flat sides of the trip cams 411 strike and are arrested by the forward faces of the lips 612$^r$ of the carrying detents 612, (see Fig. 7) at which time, the counters are in their zero positions and the amount accumulated on the respective counters, has been loaded onto the racks in the usual manner to locate the corresponding printing types 561 at the printing line. Advance of the positioning bars 310 enables the trip bars 513 to disable the corresponding individual hammer latches 511, as heretofore explained, after which the universal hammer latch 518 releases the printing hammers 510, but the amount is not printed, as hereinafter explained. The arrest of the counters 490 by the contact of the cams 411 with the lips 612$^r$ of the carrying latches 612, arrests the racks 410 and their positioning bars 310 against the tension of their drive springs 383.

Obviously, the cams 411 of those counters 490 or 490$^x$ which register ciphers at the beginning of the clearing operation, contact the lips 612$^r$ of the carrying detents to prevent rotation of the counters. Hence, the corresponding racks 410 cannot advance, and as a result, their drive springs 383 are tensioned to the maximum.

The disengagement of the counters and drive members 410, in a clearing operation, while the former register ciphers and prior to the time when the drive members start to retire, is effected as follows:

The lower forwardly projecting arms of lifting bell cranks 313 (Figs. 1 and 33) journaled on the opposite ends of the cross rod 301, extend beneath studs 357$^d$ on the inner faces of the legs 316, and normally rest idly on the abutments 960 on the side frames 969$^d$. Links 314 pivoted to the upwardly projecting arms of the bell cranks 313, extend forwardly on opposite sides of the machine, to points adjacent headed studs 355 on the upper arms of the set levers 317$^b$ and 318$^d$, the links 314 normally seating upon rests 361 on the outer faces of the props 319, which rests maintain the forward ends of the links above and out of the paths of the studs 355. Springs 385 tend to hold the links 314 in contact with the rests, against accidental displacement.

The set levers 317$^b$ and 318$^d$, when rocked by depression of the clearing key 327, swing the studs 355 from beneath the shouldered free ends of the links 314. At the beginning of the forward stroke of the main drive shaft 200, as the trip rod 303 lowers the props 319 to mesh the counters with the racks, the links 314 also descend with the rests 361 on the props until the shouldered free ends of the links lie in the return paths of the studs 355.

At the end of the forward stroke of the main drive shaft 200, the travel of the segmental plate 211 and its arcuate locking rib 217 has been sufficient to carry the beveled rear end 217$^m$ of the rib past the projection 354$^m$ on the set lever 317$^b$ to release the latter with the clearing key 327, and the coacting set lever 318$^d$, to the action of the restoring springs 382 and 284, which partially restore the set levers 317$^b$ and 318$^d$ and clearing key to normal. Complete restoration cannot, for the moment, be effected because of the resistance encountered by the shorter arms of the set levers, whose studs 355 contact the links 314, the partial release of the set levers permitting them to take up the play between the studs 355 thereon and the links 314.

Nevertheless, such partial restoration of the set levers positions the projection 354$^m$ on set lever 317$^b$ in the path of the beveled end 217$^m$ of the locking rib 217 which, at the outset of the return stroke, forces the set levers 317$^b$ and 318$^d$ back to normal. To assist the left hand set lever and prevent torsion in the shaft 300 with a consequent lag in the operation of the counter-disengaging train of mechanism, the right hand set lever 318$^d$ carries a projection 354$^t$ (Figs. 40 and 41) similar to projection 354$^m$ on the set lever 317$^b$. Depression of the set levers positions projection 354$^t$ below the path of a short rib 217$^t$ mounted on a segmental plate 212$^b$ pivotally supported on a stud 260$^c$.

A link 214$^b$ connects the plate 212$^b$ and the trip rod 303.

The link 214$^b$ rocks the segmental plate 212$^b$ forwardly as the main drive shaft turning on its forward stroke, advances the trip rod 303, and the short rib 217$^t$ passes over and past the projection 354$^t$. The rear end of the short rib 217$^t$ terminates in a cam face 217$^p$, and the partial restoration of the set lever 318$^d$ at the end of the forward stroke, positions the projection 354$^t$ in the return path of the cam rib 217$^t$, which latter, when the link 214$^b$ rocks the segmental plate 212$^b$ back to normal position, forces the set lever 318$^d$ back toward its normal position at the same time at which the cam rib 217 actuates the set lever 317$^b$.

For a more complete understanding of this mechanism, attention is directed to U. S. patent to Bickford, No. 1,086,580, February 10, 1914.

The set levers, during such return, press the studs 355 (Figs. 1 and 33) against the links 314 which in turn, transmit the pressure to the lifting bell cranks 313 to cause the forwardly extending arms thereof to first contact the studs 357$^d$ on the legs 316 and then raise the counters 490 or 490$^x$ out of mesh with the drive members 410 prior to the retirement of the positioning bars 310 and drive members.

The counters are thus disengaged from their racks while in zero or cleared positions, and while the props 319 are in their advanced positions. The links 314, through which motion is transmitted to the lifting bell cranks 313, are recessed, as at 314$^m$, to accommodate the studs 361 when the props 319 rise with the counters, to prevent the disengagement of the links 314 and set levers 317$^b$ and 318$^d$ at that time. At the end of the return stroke, the trip rod 303 swings the props 319 back to normal position, and the studs 361 wipe along the walls of the recesses 314$^m$ to finally disengage the links from the studs 355 on the set levers 317$^b$ and 318$^d$, and permit the lifting bell cranks 313 to restore to normal idle position, under the influence of their springs 385.

The springs 382 and 284 restore the set levers 317$^b$ and 318$^d$ and the clearing key 327 to normal, as the counters 490 or 490$^x$ disengage from their drive members, after which the machine is in readiness for a new accumulation.

Much of the foregoing total mechanism is disclosed in U. S. patent to McFarland, No. 842,232, January 29, 1907, to which reference is made for a more complete explanation thereof.

Obviously, the bell crank latches 322$^d$ must be displaced relatively to the counter-supporting arms 322 at the beginning of the return stroke before the counters 490 or 490$^x$ can be disengaged from their drive members, rather than at the end of the return stroke, as in adding operations.

To this end, the upper arms of the lifting bell cranks 313 are extended to points adjacent the depending arms of the bell crank latches 322$^d$ and preferably carry studs or projections 354$^b$. As the lifting bell cranks 313 operate under pressure of the links 314, the extended upper arms of the bell cranks 313 rock rearwardly against the depending arms of the locking bell cranks 322$^d$ to swing the ears 322$^p$ thereon out of the paths of the lugs 322$^r$ on the counter-supporting arms 322, to enable the latter to operate. There is sufficient lost motion permitted between the forwardly projecting arms of the lifting bell cranks 313 and the studs 357$^d$ to afford time in which to disable the counter-locking bell cranks 322$^d$ before the legs 316 start to rise.

For further explanation of the above feature, reference is made to U. S. patent to White, No. 940,766, issued November 23, 1909.

*Non-print mechanism.*

It will be remembered that the types 561 corresponding to the amount registered on the counters 490, are positioned at the printing line during the forward stroke in a clearing operation, the appropriate individual hammer latches 511 tripped and the universal hammer pawl 518 lifted to release the hammers for printing, but it is desired that no printing action take place during such clearing operation.

In view of the fact that the hammers 510 are released for printing, we provide special means to lock such released hammers against operation.

Depression of the clear key 327 (Fig. 1)

forces a stud 352ᵇ carried thereby, against a cam 326ᵐ, formed on a bar 326ᵈ extending from front to rear of the machine and slidingly supported at its front end on a pin 360ᵈ, to shift the bar rearwardly against the tension of a restoring spring 682ᵈ. The rear end of the shifting bar is connected to a crank 1814 on a utility cross shaft 1801, journaled in the lower rear ends of the side frames 969ᵈ. The shaft 1801 carries a second crank 1814ᵇ (Figs. 1, 18 and 19) having a rest 963 projecting therefrom, to support a special, vertically extending trip bar 513ᵃ, similar to the regular trip bars 513. The special trip bar 513ᵃ is adapted to shift independently of the crank 1814ᵇ, and carries abutments 513ᵖ and 513ʳ spaced apart vertically from each other, as shown in Figs. 1, 15, 16, 18 and 19, the upper of which abutments 513ᵖ, is normally located in the path of a finger 529ᵃ (Figs. 15, 16, 18 and 19) pivoted at 557 to one of a pair of ears 529ᵐ journaled on a cross rod 504ᵐ extending between the printer side frames 565. The ears 529ᵐ support a hammer-locking bail 529 extending across the entire series of hammers 510.

The abutment 513ᵖ ordinarily prevents effective operation of the hammer-locking member 529 (Fig. 16), but depression of the clearing key elevates the trip bar 513ᵃ to locate the abutments 513ᵖ and 513ʳ above and below the path of the finger 529ᵃ to enable the latter to travel rearwardly a sufficient distance to permit the locking member 529 to assume its active position over shoulders 510ᵐ formed on the regular printing hammers 510, and hold the latter idle, as shown in Fig. 19, wherein, however, the special trip bar is differently adjusted to permit the same result.

A pin 557ᵈ on one of the printer side frames 565 passes through a slot in the finger 529ᵃ to support the latter and enable it to shift back and forth.

An arm 529ᵖ (Figs. 14, 18 and 19) on one of the ears 529ᵐ, carries a stud 458ᵐ entered in a slot 529ʳ formed intermediate the ends of a link 529ᵇ, which link, at its upper end, has a second slot 529ˢ to embrace a pin 1857 mounted on one of the cranks 529ᶜ fast on the hammer spring-tensioning shaft 500ᵇ. A spring 583ᶠ connecting the stud 458ᵐ and the link 529ᵇ, normally supports the link at one end of its travel, with the stud 458ᵐ at the lower end of the slot 529ʳ and the pin 1857 adjacent the upper end of its slot 529ˢ (Fig. 14).

As the trip rod 303 advances during the forward stroke, it operates, through the hereinbefore described linkage, including the link 525ᵈ and arm 513ᵇ, to turn the tensioning shaft 500ᵇ, which rocks the crank 529ᶜ downwardly. The pin 1857 carried by the crank, at first idly traverses its slot 529ˢ until it strikes the lower end thereof, whereupon it forces the link 529ᵇ downwardly and tensions the spring link 583ᶠ to swing the rear edge of the locking member 529 over the shoulders 510ᵐ (Fig. 19) on the hammers 510 to lock the latter against operation when released by the universal pawl 518, and thus prevent the printing of an amount during a clearing operation. In this active position, the bottom of the slot 529ʳ lies below the pin 458ᵐ.

The trip rod 303 on its return stroke, rocks the hammer-resetting bail 509ᵈ toward the hammers. It also restores link 525ᵈ to relieve the tension on the hammer drive springs 580, and in so doing, rocks shaft 500ᵇ, and with it, the crank 529ᶜ to withdraw the pin 1857 from the bottom of the slot 529ˢ, thereby freeing the link 529ᵇ to the action of its restoring spring 583ᵇ, one end of which is fast to a stud 564ᵈ mounted in the printer side frames 565. The spring 583ᵇ, aided by spring 583ᶠ, restores the link 529ᵇ, and as the bottom of the slot 529ʳ strikes the pin 458ᵐ, the link retracts the locking member 529 and its finger 529ᵃ. The locking member is not withdrawn from its active position until the hammer-resetting bail 509ᵈ contacts and begins to reset the hammers 510, which previously advanced upon the release of the universal pawl 518 until their shoulders 510ᵐ struck the locking member 529, the idle travel of the link 529ᵇ and its slot 529ʳ relatively to the pin 458ᵐ affording time for the hammer-resetting bail to return and relieve the locking member 529 of the pressure of the hammers 510.

It has already been explained that the depression of the clearing key 327 positions the special trip bar 513ᵃ which controls the operation of the non-print mechanism, through its camming action on the sliding bar 326ᵈ, which in turn, rocks the utility cross shaft 1801 and crank 1814ᵇ to lift the special trip bar 513ᵃ to one of its adjusted positions wherein, upon the operation of the machine, it opposes no obstacle to the operation of the non-print or hammer-locking mechanism.

The release of the clearing key 327 at the end of the forward stroke and the beginning of the return stroke, enables spring 682ᵈ to return the sliding bar 326ᵈ and crank 1814ᵇ to normal position, as shown in Fig. 1, whereupon, the special trip bar 513ᵃ and connected parts are free to drop to their normal positions, wherein the special trip bar 513ᵃ prevents the operation of the hammer-locking member 529.

In practice, it may be that the weight of these parts supported on the arresting finger 529ᵃ, as now formed, would prevent the springs 583ᶠ and 583ᵇ from restoring the non-print lock 529 at first, but as the tension of the spring 583ᶠ decreases, owing to the elevation of the link 529ᵇ on the return stroke, the restoring spring 583ᵇ effects the disconnection of the arresting finger 529ª from below the abutment 513ᵖ.

Clearing key control of line space disabling mechanism.

As heretofore explained, depression of the clearing key 327 advances the slide 320 (Fig. 1) to rock the detent-supporting shaft 202 and the bail 204 extending beneath the several denominational detents 221, to displace the latter out of the paths of their positioning bars 310.

But it will be remembered that such action would also lift the overlying bail 370 and effect the displacement of the line space disabling lever 524ª, as set forth in the explanation of the automatic line space disabling mechanism.

In clearing operations, it is desired that no line spacing take place, and hence, to maintain the line space disabling mechanism effective despite the displacement of the detents 221, the longer forwardly projecting arm of the transmitting lever 329 (Figs. 33-35) extends to a point beneath and in the path of the lower end of the clearing key 327. The extreme end of the transmitting lever may terminate in an upstanding guide 329ᵉ extending alongside the front edge of the clearing key stem 327.

Upon the complete depression of the clear key, the effect of the positioning bar detents 221 which rock the bail 370 upwardly and turn the shaft 304 and crank 1814ᵐ to raise the link 329ᵈ through the spring 685ᵐ, and render the line space disabling mechanism ineffective, is counteracted by the positive contact of the lower end of the clearing key with the forwardly projecting arm of the transmitting lever 329, which returns the lever to its normal position, and through the reversing bail 329ᵇ, restores the line space disabling arm 524ª to effective position. Such restoration of the lever 329 draws the link 329ᵈ downwardly against the tension of the spring link 685ᵐ, the slot 329ʳ in the link 329ᵈ permitting relative movement between the link and the pin 1857ᵖ, as shown in Fig. 35.

The clearing key restores to normal during the return stroke of the main drive shaft 200 (as previously explained), prior to the restoration of the positioning bar detents 221, thereby releasing the transmitting lever 329 to the action of the tensioned springs 685ᵐ which then attempts to render the line space disabling mechanism ineffective, as in adding operations of the machine.

But the displacement of the line space disabling lever 524ª during the return stroke of the main drive shaft, prior to the restoration of the thrust bar 2026 to normal position, would permit the line space bail 2002 to advance until arrested by the thrust bar on its return stroke, and effect at least a partial line space operation.

To prevent such disadvantage, we preferably bevel or undercut the rear end of the line space disabling lever 524ª, as indicated in Fig. 35, so that the pressure exerted by the spring 2486 in forcing the line space bail 2002 against the undercut end of the disabling lever, when the thrust bar 2026 is withdrawn, will hold the lever 524ª against displacement under the influence of its spring 680ᵐ until the thrust bar 2026 completes its return travel and releases the disabling lever 524ª by slightly shifting the line space bail rearwardly.

The slide 320 returns to its normal position at substantially the same time with the clearing key, but owing to the advanced positioning bars 310, the detents 221 do not restore until the positioning bars have retired, whereupon, the crank 1814ᵐ rocks downwardly and the spring 389ᵇ through the link 329ᵈ, depresses the forward arm of the transmitting lever 329 to hold the line space disabling lever 524ª effective.

Totaling mechanism.

When it is desired to print the total accumulated on the counters, a special key 327ᵇ (Figs. 1 and 33-35) is depressed.

In this particular machine, a totaling operation does not leave the counters clear. Instead, the total amount remains on the counters for further treatment.

Much of the mechanism through which the machine is cleared, as previously explained, is also employed in the operation of printing the total without clearing the counters. The two operations are similar except that the counters do not disengage from the drive members 410 during the return stroke of the main drive shaft, when printing the total without clearing.

Guide pins 950ᶜ projecting from the left hand side frame 969ᵈ, enter slots 327ᵐ in the total key 327ᵇ.

Depression of the key 327ᵇ against the tension of its restoring spring 384ᵐ, forces a laterally extending foot 327ᵖ on the stem against the longer forward arm of the set lever 317ᵇ to trip the legs 316 relatively to their seats 958ᵈ, and to displace the positioning bar detents 221 through the slide 320, all as heretofore explained in connection with the clearing operation.

Also the set lever 317ᵇ and its companion lever 318ᵇ are locked where adjusted, first, by the engagement of the latch 216ᵈ with the projection 354ᵐ on the set lever 317ᵇ, and later, during the forward stroke of the main drive shaft 200, by the arcuate ribs 217 and 217ⁱ.

The engagement of the counters 490 or

490ˣ with the segmental racks 410 occurs at the outset of the forward stroke of the main drive shaft 200, after which the positioning bars 310 and racks 410 advance under control of the counters, until arrested by contact of the cams 411 on the counters with the lips 612ʳ of the carrying detents, to lift the typecarriers 514 and locate at the printing line the types 561 corresponding to the amount registered on the counters.

Normally, the angular coupler 326ᵗ connects the set lever 317ᵇ with the clearing key 327, so that the depression of the set lever 317ᵇ by the total key 327ᵇ would draw with it the total key and set the non-print mechanism and line space disabling mechanism for operation.

It is desired in totaling operations to both print the amount, and to line space the paper, wherefore, the clearing key 327 must be disconnected from the set lever 317ᵇ, to which end, a trip lever 327ᵗ, (Figs. 33-35) is pivoted, preferably on the upper guide stud 950ᵗ, one arm of which lever extends rearwardly and carries a projection 354ᵛ normally lying directly behind the upwardly extending arm of the angular coupler 326ᵗ, (as shown in Fig. 33). A wiper 352ʳ projecting from the stem of the totaling key 327ᵇ, enters a cam slot 327ʳ formed in the remaining arm of the trip lever 327ᵗ. As the totaling key 327ᵇ starts to descend, the wiper 352ʳ traverses the cam slot 327ʳ to rock the trip lever 327ᵗ and press the projection 354ᵛ thereon against the adjacent arm of the coupler 326ᵗ to slide the latter forwardly against the tension of its restoring spring 582 until the recess 326ʳ of the coupler clears the pin 355ᵈ on the clearing key 327, whereupon the set lever 317ᵇ, under pressure from the foot 327ᵖ of the total key 327ᵇ continues its stroke unaccompanied by the clearing key.

Hence, there is no interference with the printing hammers 510 which operate to print the amount. Likewise, the effect of displacing the rack detents 221, under the influence of the slide 320, to render the line space disabling lever 524ᵃ ineffective, is not counteracted, and the paper is line spaced in the usual manner during the return stroke of the main drive shaft 200.

Furthermore, to prevent the manual depression of the clear key 327 when the total key 327ᵇ is in depressed position, there is a stop lug 327ˢ on the depending arm of the trip lever 327ᵗ, which lug, when the lever is rocked by the depression of the total key, swings under a stop stud 455, projecting from the clearing key stem 327, as in Fig. 34. Depression of the clear key 327 prior to the depression of the total key 327ᵇ, locates the stop stud 455 in the path of the stop lug 327ˢ to prevent depression of the total key while the clear key is depressed, as in Fig. 35.

A flange 327ᵗ on the total key 327ᵇ operates to guide the key in its travel.

Spring 384ᵐ restores the total key to normal elevated position, and the key during its return, causes the wiper 352ʳ to retrace the cam slot 327ʳ in the trip lever 327ᵗ to rock the latter and free the latch 326ᵗ, which, under the influence of its spring 582, fits its recess 326ʳ over the pin 355ᵈ on the clear key stem 327, when the set lever 317ᵇ restores under the influence of its spring 382.

As heretofore explained, depression of the total key 327ᵇ rocks the set lever 317ᵇ and introduces the projection 354ᵐ of the set lever beneath the latch 216ᵈ to hold the lever depressed.

It will be noted however, that there is no positive connection between the total key 327ᵇ and the set lever 317ᵇ, and if none was provided, the key would at least partially restore, when relieved of pressure.

As it is desirable to maintain the total key in its depressed position, a locking member 325ᵐ (Figs. 33-35) of irregular contour is pivoted to the stem of the total key 327ᵇ, at 264ᵐ. The forward edge of the locking member 325ᵐ, near its pivot point 264ᵐ, is formed into a cam 325ᵖ which normally lies just above the end of a rod 100 protruding from the adjacent side frame. In the present instance, this rod may conveniently be one of the removable rods which holds the keyboard in place, as illustrated, for example, in U. S. patent to Schleicher and Wilgus, No. 1,203,655, November 7, 1916. Also, a shoulder 325ʳ is formed on the inner edge of the locking member, which shoulder normally lies just below an angular stud 963ᵖ projecting laterally from the set lever 317ᵇ. The depending locking member terminates in a horn 325ˢ curved to extend rearwardly beneath a spacing pillar 957ᵈ projecting outwardly from the adjacent side frame 969ᵈ. Depression of the total key 327ᵇ (Fig. 33) carries with it the locking member 325ᵐ, the cam edge 325ᵖ of which wipes along the protruding end of the rod 100 to force the locking member rearwardly so that its shoulder 325ʳ lies directly beneath the angular stud 963ᵖ on the set lever 317ᵇ, and the latter, descending with the total key owing to the contact of the foot 327ᵖ therewith, and being locked where adjusted by the engagement of the latch 216ᵈ with the projection 354ᵐ on the lever, in turn, holds the total key depressed. The relation of the curve of the horn 325ˢ to the pillar 957ᵈ is such that the upper concave edge of the horn always lies closely adjacent the pillar.

The main drive shaft 200 on its forward stroke turns the plate 211 and with it the latch 216ᵈ and the arcuate rib 217, to substitute the latter as a retaining member for the projection 354ᵐ on lever 317ᵇ in place of the latch. As the main drive shaft approaches the end of its forward stroke, the rear end of the rib 217 escapes past the stud 354$^m$ which would allow the set lever 317$^b$ and total key 327$^b$ to rise under the influence of their restoring springs 382 and 384$^m$ as in the clearing operation, to prevent which the following lock is provided.

A link 321$^b$ (Fig. 1) connects the crank 212 on the main shaft, with a camming latch 325$^d$ journaled at 360$^d$, the link having a slot 321$^p$ to embrace a pin 562$^f$ on the latch. Normally, the link 321$^b$ lies at the rear end of its travel with the outer end of the slot 321$^p$ adjacent the pin 562$^f$. At the beginning of the forward stroke, the link 321$^b$ advances idly the length of its slot 321$^p$ until the inner end of the slot strikes the pin 562$^f$ and rocks the camming latch 325$^d$ over a stud 352$^d$ on the depressed total key 327$^b$, in which position it remains to hold the total key against release at the end of the forward stroke and the beginning of the return stroke. At the beginning of the return stroke of the main drive shaft, the link 321$^b$ idly withdraws, leaving the camming latch 325$^d$ in active position until the locking rib 217 again passes over the projection 354$^m$ to lock the total mechanism in set position, at which time the outer end of the slot 321$^p$ in the link contacts the pin 562$^f$ on the camming latch to retract the latter to idle position relatively to the stud 352$^d$ on the depressed key 327$^b$. By reason of the locking catch 325$^m$, the stud 352$^d$ is held in position to be acted upon by the latch 325$^d$. As the segmental plate 211 approaches the end of its return stroke, it brings the rear face of a yielding rocker 218$^b$, pivoted at 258$^b$, against the projection 354$^m$, contact with which turns the rocker 218$^b$ forwardly to cause it to press the dog 216$^d$ outwardly away from the adjacent end of the locking rib 217, so as to enable the projection, when it rides off the rib, to escape past the dog, and free the set lever 317$^b$ to the action of its restoring spring 382, which returns the total mechanism to normal position.

Owing to the locking means which retains the total mechanism in set position during the forward and return strokes of the main drive shaft, the counters remain engaged with their racks on the return stroke of the machine, so that the racks, which have been loaded with the amount registered on the counters at the beginning of the operation to enable the total to be printed, re-accumulate such amount on the counters, and at the end of the operation, the counters are restored to their normal positions by the trip rod 303 and props 319, as heretofore described in connection with the adding operation.

It will be remembered that in clearing and totaling operations, the advance of the racks 410 during the forward stroke of the main drive shaft, is arrested by contact of the cams 411 on the counters with the lips 612$^r$ on the carrying detents 612, after which further forward rotation of the main drive shaft merely increases the tension on the drive springs 383 with a consequent increase in the pressure of the cams 411 against the lips 612$^r$. The relation of the counters 490 or 490$^x$ with their cams 411, to the arresting lips 612$^r$ at such a time, is substantially the same as that occupied by the rear counters 490$^x$ in Fig. 7.

The counters registering digits of smaller value or standing at zero, when a clearing or totaling operation is initiated, are the first to be arrested by the lips 612$^r$, and the corresponding drive springs 383 press the cams 411 with greater force against the lips 612$^r$ than where the counters register digits of higher value.

The stress thus brought to bear on the counter pinions 435 by the racks 410 in view of the inevitable slight play between the various connections, and the leverage exerted on the counter axle 400 by the pressure of the cams 411 against the lips 612$^r$, may tend to lift the pinions out of mesh with the racks ever so little, but the clearance between the pinions, when in mesh with the adding racks, and the carrying racks 610$^p$ is so slight that even a small lift at this time may enable the carrying racks to interfere with the rotation to zero of those counters which register digits of larger value.

Therefore, to prevent such action and to render the machine more accurate, we provide a reinforcing mechanism (Fig. 37) to increase the rigidity of the accumulating section and maintain the counter pinions in mesh with the adding racks 410.

And such reinforcing means must be arranged to release the counter pinions at different times during the return stroke of the main drive shaft, accordingly as a totaling or clearing operation is being performed, since the counters disengage the racks 410 at different times in the respective operations.

Certain of the front and rear counter axle supporting arms 414 (Figs. 6–10) are replaced by arms 418$^f$, 418$^g$ (Figs. 37 and 38) similar to the arms 414, except that they extend to the median longitudinal line between the respective sets of counters. The arms 418$^f$ and 418$^g$ are conveniently arranged in pairs, the members of each of which pairs are located in adjacent denominations in the respective sets of counters 490, 490$^x$. Thus, a forwardly projecting arm 418$^g$ and a rearwardly projecting arm 418$^f$ constitute a pair and, being located in adjacent denominations, do not directly oppose each other (see Figs. 10 and 39). Each of the arms 418ᶠ, 418ᵍ is provided with a lateral offset or arrester 418ˣ with which coöperates the foot 612ˢ of a bridge piece or keeper 612ᵇ, of which there is one for each arm 418ᶠ, 418ᵍ.

The keepers extend transversely over the series of counters and lie parallel with the carrying racks 610, 610ᵃ. The cross rods 600 pass through slots in the opposite ends of the keepers to support the latter and permit them to slide longitudinally of the machine.

A detaining bail 602 mounted in arms 640ᵇ fast on a cross shaft 603 journaled in the side frames 969ᵈ, normally contacts lugs 612ᵗ on the keepers to restore them to, and hold them in, retracted or idle position with their feet 612ˢ out of the paths of the arresters 418ˣ on the supporting arms 418ᶠ, 418ᵍ, against the tension of springs 680ᵖ attached to the respective keepers 612ᵇ and to the anchor plate 923. The springs tend to advance the keepers, when the latter are released, to locate the feet 612ˢ directly over the arresters 418ˣ.

One end of the shaft 603 projects through the left hand side frame 969ᵈ (Figs. 33 and 39) and carries a crank 1814ᵖ equipped with a stud or projection 354ˣ releasably engaged by an actuator 322ᵇ loosely mounted on the same cross rod 601ᵈ on which are mounted the bell crank latches 322ᵈ, which lock the counters against rebound. An adjustable stud 354ᵗ secures the actuator 322ᵇ to one arm of the adjacent bell crank latch 322ᵈ so that the actuator and latch move together.

Referring back to the description of the counter lock, it will be remembered that normally the disabling bars 321ᵈ connected by links 321ᶠ with the counter props 319, lie in contact with the depending arms of the bell crank latches 322ᵈ to maintain the latches disabled against the tension of the springs 384. A locking cam slot 322ᵃ formed in the actuator 322ᵇ, normally fits over the stud 354ˣ of the crank 1814ᵖ to hold the bail 602 effective against the lugs 612ᵗ and thus maintain the keepers 612ᵇ retracted in their idle positions.

Normally, also, when the machine is at rest, the counters are elevated above their drive racks 410, and the arresters 418ˣ on the rear arms 418ᵍ lie just in front of the feet 612ˢ of the keepers 612ᵇ which coact therewith, as shown in Fig. 37.

Likewise the arresters 418ˣ of the front arms 418ᶠ which are laterally disposed relatively to the rear arms 418ᵍ, lie in front of the feet 612ˢ of their coacting keepers 612ᵇ.

In adding operations, as the main drive shaft 200 starts on its forward stroke, it operates through the trip rod 303, and links 321ᶠ to withdraw the disabling bars 321ᵈ and thereby free the bell crank latches 322ᵈ to the action of their springs 384, which rock the latches upwardly until arrested by contact of the ears 322ᵖ with the lugs 322ʳ of the counter-supporting arms 322. When the main drive shaft approaches the end of its forward stroke, the counter-detaining legs 316 are tripped to enable the selected set of counters 490 or 490ˣ to engage their drive members 410, and simultaneously, the supporting levers 322 rock downwardly, displacing the lugs 322ʳ from the paths of the ears 322ᵖ which, under the tension of the springs 384, immediately snap behind the lugs.

The actuator 322ᵇ which swings with the latches 322ᵈ, partially releases the crank 1814ᵖ during the forward stroke of the main drive shaft, and upon the displacement of the lugs 322ʳ, the actuator rises to completely release the crank 1814ᵖ and free the keepers 612ᵇ to the action of their drive springs 680ᵖ. The springs 680ᵖ then snap the keepers forwardly to locate the feet 612ˢ of the keepers coacting with the active set of counters, directly over the arresters 418ˣ, as shown in Fig. 38, the supporting arms 418ᵍ with their arresters 418ˣ having dropped out of the paths of the feet 612ˢ with the selected set of counters, when the latter meshed with their drive members.

The idle set of counters 490 or 490ˣ being maintained in normal position out of mesh with the racks, as hereinafter set forth, maintains the arresters 418ˣ of the supporting arms 418ᶠ corresponding therewith, in the paths of the feet 612ˢ of the keepers 612ᵇ to retain the latter in idle position.

The keepers merely supplement the counter locks 322ᵈ in adding operations, as there is no continued tendency on the part of the counter pinions 435 to disengage themselves from the racks 410, in such operations.

But in totaling and clearing operations, the keepers 612ᵇ, by reason of their location intermediate the ends of the counter axles 400, prevent the latter from flexing, render them more rigid, and retain the pinions 435 in mesh with their racks 410.

When the keepers 612ᵇ are in effective position, the crank 1814ᵖ occupies a substantially horizontal position with the forward end of the actuator 322ᵇ resting on the stud 354ˣ. As the main drive shaft starts on its return stroke, it swings the props 319 rearwardly, and consequently forces the links 321 and the disabling bars 321ᵇ rearwardly. The disabling bars, in turn, strike the depending arms of the bell crank latches 322ᵈ to displace the ears 322ᵖ relatively to the counter-supporting levers 322, and by the same operation, cause the actuator 322ᵇ to press downwardly upon the crank 1814ᵖ to rock the latter and turn the shaft 603. The shaft forces the bail 602 against the lugs 612ᵗ of the advanced keepers 612ᵇ to restore the latter and their feet 612ª to idle position, out of the paths of the arresters 418ˣ, and against the tension of the springs 680ᵖ.

The downward throw of the actuator 322ᵇ finally registers its locking cam slot 322ᶜ with, and fits it over the stud 354ˣ to hold the keepers 612ᵇ, retracted.

Because of the engagement of the counter pinions 435 with their racks 410, prior to the advance of the latter during totaling and clearing strokes, the keepers 612ᵇ shift to effective position earlier in the forward stroke, than in adding operations, since their operation, during clearing and totaling operations, is controlled only by the disabling members 321ᵈ. Hence, they are in place before any great amount of tension has been stored in the springs 383.

And in totaling operations, the keepers remain effective until displaced by the restoration of the disabling members 321ᵈ, as explained in connection with the adding operation, since the counter pinions 435 remain engaged with their drive racks 410 on the return stroke, as in adding.

But in clearing operations, the counter pinions disengage their racks at the beginning of the return stroke of the main drive shaft, and the keepers 612ᵇ must be retired prior to such disengagement. This is readily effected through the operation of the disabling studs 354ᵇ on the extended upper arms of the counter disabling bell cranks 313, against the depending arms of the bell crank latches 322ᵈ, at the beginning of the return stroke of the main drive shaft, as previously explained in connection with the clearing mechanism.

The actuator 322ᵇ, being fast with the left hand bell crank latch 322ᵈ travels therewith, and when the latch is being displaced, the actuator presses against the crank 1814ᵖ to cause the bail 603 to withdraw the keepers 612ᵇ from the paths of the arresters 418ᶻ, prior to the disengagement of the counter pinions 435 from their racks 410.

*Idle stroke enforcing mechanism.*

At the completion of a carrying operation, the carrying detents 612 corresponding with the counters on which transfers have occurred, occupy the displaced positions shown at the left in Fig. 9, and they remain in such displaced positions until near the end of the next forward stroke of the main drive shaft, when the discharged carrying bars 610, 610ª are reset, as heretofore explained.

The lips 612ʳ which arrest the cams 411 when the counters are reversely rotated to their zero positions in clearing and totaling operations, form a part of the carrying detents, and naturally are displaced therewith, although even in such displaced positions, the lips remain in the paths of the cams 411 and will operate to arrest the counters at zero.

However, it is customary to reset the carrying mechanism before taking a total or clearing the machine in order to return the counter-arresting lips 612ʳ to normal position where they insure the positive arrest of the counters accurately in zero position.

Therefore, to prevent the depression of either the total key 327ᵇ or the clearing key 327 until an idle carry-resetting stroke is taken, we provide a lock 328ᵇ (Figs. 33–35), pivoted on a stud 951ᶜ projecting from the left hand side frame, 969ᵈ, and equipped with graduated shoulders 328ᵐ, 328ᵖ. A spring 389 tends to swing the lock forwardly to locate the upper arresting shoulder 328ᵐ beneath a stop 360ᵐ carried by the set lever 317ᵇ, to prevent depression of either the total or clearing keys.

A tail 328ʳ on the lock 328ᵇ extends rearwardly into the path of the trip rod 303, a cam face 328ˢ being formed on the tail, to be engaged by the trip rod 303. On each forward stroke of the main drive shaft, the trip rod 303 advances and contacts the cam face 328ˢ on the tail 328ʳ to rock the lock 328ᵇ to idle position.

Obviously, the spring 389 will restore the lock to effective position during the return stroke of the main drive shaft which withdraws the trip rod 303 from the tail 328ˢ, to prevent which, we provide a check link 328ᵈ slotted at its opposite ends to embrace and be guided by the stud 951ᶜ on the frame 969ᵈ, and the pin 1857ᵖ, respectively, the pin being mounted on the crank 1814ᵐ operated by the key-set stops 115, as explained in connection with the line space disabling mechanism. The spring 389, conveniently connected to the check link 328ᵈ, as well as to the lock 328ᵇ, shifts the link downwardly to interpose an ear 328ᵗ thereon, in the path of return of the lower shoulder 328ᵖ of the lock, when the latter is rocked by the trip rod 303, to hold the arresting shoulder 328ᵐ out of line with the stop 360ᵐ, providing that the operation of the link prior to the release of the lock by the trip rod, is not obstructed by projected key-set stops.

Assuming that the lock 328ᵇ is in the effective position shown in Fig. 33, an idle operation of the main drive shaft 200 will cause the retraction of the lock to idle position, through the trip rod 303, to thus free the link 328ᵈ, whose ear 328ᵗ has been resting on the shoulder 328ᵖ. The spring 389 snaps the link downwardly to interpose the ear in the path of the shoulder 328ᵖ to hold the lock ineffective.

Depression of the keys 117 and the consequent projection of the stops 115, operates through the rack detents 221, and the bail 370 (Fig. 39) to rock the shaft 304 and crank 1814ᵐ, lifting the check link 328ᵈ against the tension of spring 389, to remove the check ear 328ᵗ from the path of the shoulder 328ᵖ of the lock 328ᵇ which lock immediately snaps forwardly to interpose the shoulder 328ᵐ under the stop 360ᵐ and arrests the total and clearing keys against depression.

The trip rod 303, on the forward stroke of the main drive shaft, when the latter is turned to register the amount set up on the keyboard, will of course, withdraw the lock 328ᵇ from the path of the stop 360ᵐ, but the lock resumes its effective position when released by the trip rod 303 on the return stroke, which release occurs prior to the restoration of the detents 221, which, therefore, maintain the check ear 328ᵗ idle.

When the lock 328ᵇ is effective, the ear 328ᵗ rests on the shoulder 328ᵖ, see Fig. 33.
Hence, the operator cannot take a total or clear the machine unless he first takes an idle stroke to disable the lock, as previously explained.

Depression of the total key 327ᵇ after such idle stroke, shifts the set lever 317ᵇ to interpose the stop 360ᵐ in the path of the arresting shoulder 328ᵐ, before the slide 320 (also actuated by the set lever) can operate through the rack detent disabling bail 204, to lift the detents and the check link 328ᵈ to free the disabled lock for operation.

The stop 360ᵐ descends along the forward edge or face of the shoulder 328ᵐ a greater distance than the clearance existing between the lower corner of the ear 328ᵗ and the forward corner of the shoulder 328ᵖ, due in part to the fact that the stop 360ᵐ partakes of the full throw of the lever 317ᵇ, whereas, the lost motion unavoidable in the train of connections between the lever 317ᵇ and the check link 328ᵈ delays the actuation of the check link, which enables the stop 360ᵐ to take the lead.

At the end of the return stroke, therefore, (at which time the trip rod 303 has withdrawn from the lock 328ᵇ) although the stop 360ᵐ starts to release the lock 328ᵇ for operation before the rack detents 221 have restored to normal, yet the partial restoration of such detents which takes place prior to the disengagement of the stop 360ᵐ from in front of the shoulder 328ᵐ, permits the spring 389 acting directly upon the check link 328ᵈ to take up the lesser clearance between the ear 328ᵗ and the shoulder 328ᵖ and to interpose the ear in the path of the shoulder 328ᵖ before the stop 360ᵐ releases itself from the shoulder 328ᵐ.

Hence, at the end of a totaling operation, the lock 328ᵇ is again held ineffective by the ear 328ᵗ, in order that a succeeding clearing operation can be taken without necessitating an intermediate idle stroke.

Depressing the clear key 327, operates, as when the total key is depressed, to interpose the stop 360ᵐ in the path of the shoulder 328ᵐ prior to the displacement of the ear 328ᵗ from in front of the shoulder 328ᵖ.

At the end of the forward stroke in a clearing operation, the stop 360ᵐ starts to release itself from the lock 328ᵇ and completes its release at the beginning of the return stroke, ofttimes operating too quickly to afford the spring 389 time to restore the check lip 328ᵗ to effective position, in which event the lock 328ᵇ becomes effective to lock the total and clearing keys against operation.

As successive clearing operations are not particularly desired, this indeterminate operation is of no consequence.

The slot in the upper end of the check link 328ᵈ, which is entered by the pin 1857ᵖ, permits the return of the rack detent-controlled bail 370 to rest on the detents 221 when the checking ear 328ᵗ of the link is in contact with the upper face of the shoulder 328ᵖ, and also enables the check link to assume its effective position when the lock 328ᵇ is to be held idle thereby.

*Clear and total sign printing.*

In order to indicate on the work sheet that a clearing operation has been taken, and to thus prove that the machine has been cleared, we arrange to connect the special trip bar 513ᵃ operated by the total key (as heretofore explained in the description of the non-print mechanism), through a link 515ᵐ (Figs. 1, 18 and 19) with the stem of a special typecarrier 514ᵐ, in which are mounted special signs to designate non-added amounts; ◁; clearing operations "C," totals "T," and another indication ⊕, which will be hereinafter referred to. Obviously, other signs than those shown, might be used to designate the above or other operations.

The sign typecarrier 514ᵐ when in its normal position of rest, locates the non-add sign ◁ at the printing line (Figs. 11 and 18). The cam 326ᵐ (Fig. 1) on the shiftable positioning bar 326ᵈ is of such pitch that when the clearing key stud 352ᵇ wipes along it, upon depression of the clearing key to adjust the abutments 513ᵖ, 513ʳ relatively to the non-print finger 529ˢ (constituting a part of the non-print mechanism heretofore explained), the bar 326ᵈ will shift one step rearwardly and lift the sign typecarrier 514ᵐ to position the clear sign C at the printing line. Such one step throw displaces the upper abutment 513ᵖ relatively to the arresting finger 529ⁿ to enable the operation of the non-printing member 529, as previously explained.

A cam 326ᵖ (Fig. 1) of greater length than cam 326ᵐ, is formed on the sliding bar 326ᵈ in the path of a stud 352ᵐ on the total key 327ᵇ. Depression of the total key causes the stud 352^m, in riding along the cam 326^p, to shift the bar 326^d two steps rearwardly to position the total sign T at the printing line, and interpose the lower abutment 513^r in the path of the arresting finger 529^a of the non-print mechanism. The latch 325^m (Fig. 35) pivoted to the total key 327^b, holds the latter depressed as heretofore explained in connection with the totaling operation, and consequently preserves the proper relation between the stud 352^m on the total key, and the cam 326^p to retain the total sign T at the printing line.

The hammer 510^f (Fig. 11) for printing the sign characters is similar to the regular hammers 510, being journaled on the same shaft 500 immediately to the right of the denominational series of regular printing hammers. The hammer-resetting bail 509^d cocks the sign printing hammer 510^f against the tension of a drive spring 580 similar in all respects to the regular hammer drive springs 580. The universal pawl 518 controls the sign printing hammer in the same manner in which it controls the regular printing hammers, and an individual hammer latch 511^e normally engages the sign printing hammer 510^f to lock it against operation upon the release of the pawl 518, except when the counter-selecting lever 418^p, hereinafter described, is in such position that it retains all sets of counters 490. 490^x inactive. The individual hammer latch 511^e is independent of the regular hammer latches 511, however, and is displaced against the tension of its restoring spring 581 by the trip bar 513^a when operated by the clearing and total keys 327, and 327^b.

Furthermore, the toe of the sign printing hammer 510^f differs from the regular printing hammers 510 in that it has no shoulder 510^m (see Fig. 11), and hence, is not controlled by the special non-print hammer lock 529, but escapes the latter when the universal latch 518 is lifted, to impress the sign on the paper.

The clearing and total keys 327 and 327^b, as they return to normal position, withdraw their studs 352^b and 352^m from the cams 326^m and 326^p on the sign type positioning bar 326^d to free the latter to the action of its restoring spring 682^d, which advances the sliding bar 326^d to normal position and lowers crank 1814^b to enable the trip bar 513^a and the sign typecarrier 514^m to drop to their positions of rest. This enables spring 581 to return the individual latch 511^e to effective position when the special sign printing hammer 510^f is cocked by the resetting bail 509^d in the usual manner.

Counter-selecting mechanism.

So far as the description has been carried at present, the plurality of sets of accumulators 490 and 490^x would simultaneously engage and disengage the racks or drive members 410.

In order to prevent such simultaneous operation, a counter-selecting means is provided whereby the operator may select any set of accumulators for operation, independently of the other, or may adjust the controlling mechanism to retain all sets of counters inactive.

Referring to Figs. 4, 5, and 11, the rock shaft 402 journaled in the side frames 969^d, supports at each end a counter-selecting member 418, 418^a, respectively, fixed to the shaft and projecting upwardly between the counter axles 400. The heads 418^m of the respective selecting members 418, 418^a are of sufficient width to extend beneath the projecting ends of both counter axles 400 and studs 458, when the latter are in normal elevated position, and the members 418, 418^a are in their intermediate positions, shown in Figs. 4 and 11, to lock the counters out of engagement with their racks 410, even though the main drive shaft is operated to draw the sustaining plates 324 downwardly, as heretofore explained.

During an operation of the machine, when the counter-selecting members 418, 418^a are in their intermediate positions, the counter axles 400 and studs 458 rest upon the broad heads 418^m of the selecting members, which maintain the counters out of mesh with their drive racks 410.

A handle or lever 418^p projects upwardly from the head 418^m of one of the counter-selecting members and through a slot 1065^m (Fig. 3) in the casing 1065, to enable the operator to shift the members forwardly or backwardly at will, and thereby withdraw the members from beneath one or another of the axles 400 and studs 458 to release one or another of the sets of counters for operation. The axle 400 and stud 458 of the freed or active set of counters will then rest upon the oppositely located sustaining plates 324 to enable the counters to be engaged and disengaged relatively to the racks or drive members 410.

Opposed slots 418^r formed in the respective heads 418^m of the locking or selecting members, embrace the axle 400 and stud 458 at the opposite ends of the set of counters which is to be held inactive, (see Figs. 5 and 19) to prevent displacement thereof, such slots preferably being slightly arcuate to conform to the throw of the heads 418^m in either direction, so that those portions of the walls of the slots 418^r which contact the axle and stud will be substantially on a plane with the periphery of the axle and stud when the latter are in normal elevated position, throughout the travel of the head from its intermediate position. Therefore, the lever when shifted in either direction, merely interposes the locking members 418, 418ᵃ in the paths of one or another of the axles and studs without affecting the normal positions of the latter and their counters.

The counter-selecting members, when shifted in either direction from their intermediate position, project their heads 418ᵐ farther past the axle and stud of that set of counters which is to be held inactive, the heads passing completely out of the path of the axle and stud of that set of counters selected for operation.

The members forming each pair of hooks or latches 324ᵇ pivotally mounted on the oppositely projecting ears 324ᵖ of the respective sustaining plates 324, and heretofore referred to are connected by springs 388, and tend to lay hold of the ends of the axles 400 and studs 458 of the respective sets of accumulators, to lock one or another set of accumulators fast to the sustaining plates and thus positively effect the engagement and disengagement of the selected set of counters relatively to their drive members.

The heads 418ᵐ of the locking members 418, 418ᵃ lie between the latches 324ᵇ, which contact the opposite edges thereof. The heads 418ᵐ are sufficiently wide so that when the locking members are in their intermediate position, they maintain both sets of latches disabled, as shown in Figs. 4 and 11, but when the heads are shifted to either of their opposite limits of travel, (Fig. 5), they release one or another of the sets of latches 324ᵇ coöperating with the respective counter axles 400 and studs 458, and the springs 388 cause the released pair of latches to follow the retreating head until the latches engage their proper axle and stud to secure the selected set of counters to the sustaining plates 324.

*Control of carrying mechanism from the counter-selecting device.*

It will be remembered that the carrying members 610, 610ᵃ (Figs. 2 and 6-13), for the respective sets of counters 490, 490ˣ are tripped on the return stroke, and reset by the carry-restoring member 613, near the end of the succeeding forward stroke.

In the use of the machine, it may very likely happen that the operator will adjust the counter-selecting heads 418ᵐ from one to another of their extreme positions while one or more of the carrying members 610, 610ᵃ of the set of counters locked out of operation by such adjustment, are discharged. Such a contingency would occur when listing separate amounts alternately and successively on the respective sets of counters.

Obviously, an attempt to reset the discharged carrying members while the corresponding counters are in mesh therewith, as when a set of counters is restrained from operation by the selecting heads, would reversely rotate the corresponding counters, and render the accumulation thereon inaccurate.

To prevent this, we arrange to control the carry-resetting member 613 from the counter-selecting lever 418ᵖ as follows—

The carry-resetting member 613, (Figs. 10-13) is mounted to slide endwise on its supporting cross rail 690, and is notched, as at 613ᵐ, at points opposite the diverging forward ends of the denominational pairs of carrying members 610, 610ᵃ, the width of the notches being greater than the distance between the diverging ends of each pair of carrying members.

An arm 418ˣ projects forwardly from the counter-selecting lever 418ᵖ, into proximity to a double cam surface preferably formed on a bracket 611 secured to one end of the carry-resetting member 613 and overhanging the rail 690. The cams 611ʷ and 611ˣ occupy a stepped relation to each other, and merge into dwell portions 611ʸ and 611ᶻ. The dwell 611ʸ is located between the cams 611ʷ and 611ˣ. The carry-resetting bar is slotted, as at 613ᵖ (Fig. 10) to accommodate the guide pins 651 mounted in the supporting rail 690, the bar-retracting springs 685ᵈ heretofore referred to in describing the carry, being conveniently secured to such pins. A spring 685ᵇ connects a pin 563ᵈ on the carry-resetting member 613 with a pin 654ᵐ mounted on the rail 690 and projecting through one of the slots 613ᵖ in the carry-resetting member 613, to return the carry-resetting bar to, and hold it yieldingly at one end of its endwise travel (Fig. 10).

The carry-resetting bar 613 occupies its extreme right hand position, or that shown in Fig. 13, when the counter-selecting head 418ᵐ is in its rearward adjustment, to release the forward set of counters 490 for operation and retain the rearward or credit set out of operation. In such adjustment, the arm 418ˣ is withdrawn from contact with the cams 611ʷ and 611ˣ, thereby freeing the carry-resetting member 613 to the action of the spring 685ᵇ which shifts the member to the right until arrested by the right hand supporting arm 611ᵈ, with the notches 613ᵐ so positioned relatively to the pairs of carrying members 610, 610ᵃ that the unnotched portions of the resetting bar will, in operation, strike the offset ends of the carrying members 610ᵃ coacting with the counters 490. On the other hand, the notches 613ᵐ will fit over and embrace the offset ends of the carrying members 610 coöperating with the set of counters 490ˣ held out of operation by the counter-selecting heads 418ᵐ, so that no motion is transmitted thereto.

Shifting the counter-selecting heads 418ᵐ from their rearward to their intermediate position (Figs. 10 and 11), advances the controlling arm 418ˣ against the rear cam 611ʷ on the bracket 611 to force the carry-resetting member 613 partway to the left against the tension of its spring 685$^b$, to locate the notches 613$^m$ in position to embrace the forward ends of both sets of carrying members 610, 610$^a$, so that no resetting action can take place when the counter-selecting heads lock the sets of counters out of operation.

This position of the carry-resetting member 613 is determined by the dwell portion 611$^y$ onto which the end of the arm 418 rides, as shown in Fig. 10.

Adjustment of the counter-controlling heads 418$^m$ to their forward positions, (Figs. 5 and 12) advances the arm 418$^x$ against the cam edge 611$^x$ and onto the dwell 611$^z$ to shift the carry-resetting member 613 still farther to the left, to locate the notches 613$^m$ in such position that they will accommodate the carrying members 610$^a$ only, and permit the resetting bar to return the members 610 coacting with the counters 490$^x$ released for operation by this adjustment of the heads 418$^m$.

The arm 418$^x$ is preferably slotted, as at 418$^y$ (Fig. 11) to embrace and be guided by the front cross rod 600.

The particular arrangement and location of the cams 611$^x$ and 611$^z$ is merely illustrative, and we do not wish to be limited to the exact construction shown.

Non-add sign printing.

In order to designate on the work sheet, that operations of the machine have taken place, when the counter-selecting heads 418$^m$ are in their normal or intermediate position, we have contrived means, controlled by the heads 418$^m$, to trip the special sign printing hammer 510$^f$, as shown in Fig. 11, and effect the printing of the non-normal or non-add sign.

As shown in Figs. 1, 11 and 18, the non-add sign is normally at the printing line when the sign typecarrier 514$^m$ is in its position of rest, but during accumulating operations the sign is not printed because of the provision of the special latch 511$^e$, which locks the special hammer 510$^f$ when the universal pawl 518 is released and the resetting bail 509$^d$ is withdrawn.

It will be remembered that normally, the resetting bail 509$^d$ retains the hammers 510, 510$^f$ in their fully cocked positions, and that there is a clearance between the latches 511, 511$^e$ and the heels of the hammers, as shown, for instance, in dotted lines, in Fig. 11.

An arm 418$^d$ (best shown in Figs. 10 and 11), projects rearwardly from the counter-selecting lever 418$^p$, the free end of the arm having an open slot 418$^v$ adapted to embrace an outwardly projecting pin 1152$^d$ mounted on a crank 512$^b$ journaled on the shaft 500$^b$. A wiper 1152$^m$ projecting inwardly from the crank 512$^b$, contacts a cam 511$^p$ formed on a forward extension 511$^r$ projecting from one end of a bail 511$^b$ journaled on the cross brace 601$^d$. A rearward extension 511$^s$ projects from the opposite end of the bail, a spring link 682 connecting the rearward extension and the tail of the special sign printing hammer latch 511$^e$.

When the counter-selecting lever 418$^p$ lies in its intermediate position, it locates the wiper 1152$^m$, through the above linkage, on the high or nodal point of the cam 511$^p$ to rock the bail 511$^b$ and tension the spring link 682 until it is superior to the restoring spring 581 of the latch 511$^e$, to disable the latch and free the hammer 510$^f$, as shown in full lines in Fig. 11.

Operation of the machine under such adjustment will effect the printing of the non-add sign in the usual manner, adjacent the imprint of an amount set up on the keyboard.

Shifting the counter-selecting lever 418$^p$ to any of its extreme positions, from its intermediate position, displaces the wiper 1152$^m$ relatively to the cam 511$^p$ and enables the restoring spring 581 to return the latch 511$^e$ and connected parts to effective position (dotted lines in Fig. 11).

Counter-selecting control of ribbon shift.

It is desirable that the counter-selecting means shall also control a ribbon shift mechanism, whereby to print indicia pertaining to one set of counters, such as amounts registered on the counters, and signs indicating operations affecting such set of counters, in a color contrasting to that in which similar indicia affecting another set of counters is printed.

As the ribbon mechanism itself forms no part of the present invention, brief reference only will be made thereto sufficiently complete to afford an understanding of the control thereof from the counter-selecting member 418$^p$.

Spindles 1800 (Figs. 4, 5 and 17) journaled in the opposite ends of a removable housing 1810, carry the ribbon spools 1815, on which is wound a polychrome ribbon 890 passing between the types 561 and the platen 2094. The ribbon feed and reverse mechanism may be of the usual type and is not shown. The spindles 1800 seat in sockets 1856$^f$ passing through and supported for vertical travel in the apertured ribbon brackets 1867 fixed between the inner faces of the side frames 969$^d$ near their rear ends, and the printer frames 565.

Springs 1881$^b$ on the sockets 1856$^f$, contact the lower ends of the castings 1867 and press against cross pins 1854$^d$ in the sockets 1856$^f$ to hold the ribbon 890 in its lowered position (Fig. 4) with one of its color fields at the printing line of the platen 2094.

The cross pins 1854$^d$ also serve as pivots to connect the upper ends of depending adjustable legs 1812$^f$ to the sockets 1856$^f$.

Rearwardly extending lifting arms 626 mounted on sleeves 639 (Fig. 17) journaled on the fulcrum shaft 508$^d$, carry studs 654 adapted to contact shoulders 1812$^m$ formed on the adjustable legs 1812$^f$ near their lower free ends.

The trip rod 303 traverses slots 615$^m$ in links 615$^f$ connected to bell crank levers 615$^d$, also secured to the sleeves 639, to rock the bell cranks and the lifting arms 626. Normally, the lifting arms 626 with their studs 654, occupy the positions shown in Fig. 4, and the shoulders 1812$^m$ are held out of the paths of the lifting studs 654 by slotted shoes 1813$^m$ extending at an angle to their supporting arms 1813$^b$, which latter are journaled on the utility shaft 1801 operated by the total and clearing keys. The shoes embrace the legs 1812$^f$ above the shoulders 1812$^m$, to guide and control the positions of the legs and shoulders relatively to the coacting lifting studs 654. Springs 281 connecting the legs with their respective slotted shoes, normally hold the legs against the inner ends of the slots, as shown in Fig. 4.

The trip rod 303, during its advance, idly traverses the slots 615$^m$ in links 615$^f$ until it strikes the outer end walls of the slots, whereupon it draws the links 615$^f$ forwardly to rock the arms 615$^d$ and 626 and raise the lifting studs 654.

With the counter-selecting lever 418$^p$ in the intermediate position shown in Figs. 4 and 11, such operation of the lifting studs is idle. Shifting the control lever 418$^p$ forwardly (or to the right in Figs. 4 and 11) further interposes the locking heads 418$^m$ beneath the axle 400 and stud 458 of the forward set of counters 490, to free the rear set of counters 490$^x$ for operation, and rocks the shaft 402 to which are fastened a pair of cranks 418$^b$, one adjacent each side frame 969$^d$.

The forward ends of a pair of links 418$^c$ are pivoted to the respective cranks, the rear ends of the links being slotted, as at 418$^s$, to embrace pins 1857$^m$ on the respective shifting arms 1813$^b$ on the utility shaft 1801. Springs 485$^t$ connect the respective pins 1857$^m$ and links 418$^c$ to hold the pins at the forward ends of the slots 418$^s$. The control lever 418$^p$, when shifted forwardly, rocks the cranks 418$^b$ rearwardly to thrust the forward ends of the slots 418$^s$ in the links 418$^c$ against the pins 1857$^m$ and rock the shifting arms 1813$^b$ backwardly to tension the light connecting springs 281. The springs 281 cause the legs 1812$^f$ to swing with the shifting arms 1813$^b$ to position the shoulders 1812$^m$ above the lifting studs 654.

Now when the trip rod 303 rocks the bell cranks 615$^d$ and the lifting arms 626 near the end of the forward stroke, the arms 626 will quickly raise the legs 1812$^f$ and sockets 1856$^f$ against the tension of the restoring springs 1881$^b$ to shift the ribbon 890 until another portion of the ribbon, which is preferably of a different and contrasting color, lies opposite the printing line, so that all indicia relating to the active rear set of counters 490$^x$ will be printed in a color contrasting with that in which indicia is printed relating to the forward set of counters 490.

The trip rod 303, on its return stroke, retreats from the outer ends of the slots 615$^m$, thereby freeing the links 615$^f$, and arms 615$^d$ and 626 to the action of their restoring springs 382$^m$ which retire the bell cranks 615$^d$ and enable the springs 1881$^b$ to restore the ribbon sockets 1856$^f$ and the ribbon to normal position.

Shifting the counter-selecting lever 418$^p$ rearwardly from its intermediate position shown in Fig. 4, renders the forward set of counters 490 active and locks the rear set of counters 490$^x$ out of operation. In such adjustment, the lever 418$^p$ rocks the cranks 418$^b$ forwardly to draw the links 418$^c$ in the same direction, the links operating through the springs 485$^t$ to rock the shifting arms 1813$^b$ forwardly and still further displace the shoulders 1812$^m$ on the legs 1812$^f$ relatively to the lifting studs 654.

However, assuming that the control lever 418$^p$ is shifted from its extreme forward position (shown in Fig. 5) to its extreme rearward position, the cranks 418$^b$, during such operation, rock from their extreme rearward to their extreme forward positions, and in so doing, advance the links 418$^c$, which, through springs 485$^t$ draw with them the arms 1813$^b$ to displace the shoulders 1812$^m$ relatively to the lifting studs 654.

Obviously, the counter-control lever 418$^p$, when swung from its extreme rearward position to its extreme forward position, will operate through the cranks 418$^b$ and links 418$^c$ to rock the shifting arms 1813$^b$ and legs 1812$^f$ rearwardly to the effective position shown in Fig. 5.

Springs 281 permit vertical travel of the legs 1812$^f$ relatively to the shifting arms 1813$^b$.

*Position indicator for counter-selecting lever.*

As the counter-selecting lever 418$^p$ in the present embodiment of the invention, has three positions, and as the machine is equipped with means hereinafter set forth, to prevent the operation of the machine when the counter-selecting lever its out of any one of such defined positions, it is desirable to provide a device whereby the operator can tell when he has moved the lever to the desired one of the three positions.

To this end, we journal a position-indicating arm 418$^e$ (dotted and full lines in Figs. 4 and 5) on the cross shaft 903$^c$, and provide its lower edge with a series of indentations or seats 418ᵗ adapted to fit over and rest upon a positioning stud 354ᵖ mounted on the crank 418ᵇ. There is a seat for each position which the counter-selecting heads 418ᵐ may assume, and a spring 485ᵉ operates to press the arm 418ᵉ yieldingly against the positioning stud 354ᵖ.

The lever 418ᵖ is shown in its intermediate position in Fig. 4, in which, the positioning stud is located in the intermediate seat 418ᵗ, whereas in Fig. 5, the lever is in one of its extreme positions, with the positioning stud entered in one of the extreme seats in the arm.

Operation of the lever causes the positioning stud to ride into and out of the seats, the engagement and disengagement of the stud relatively to the seats affording a means whereby the operator can feel when the counter-selecting head has been shifted to the desired adjustment.

*Interlock between the total and clearing keys and the counter-selecting lever.*

The counter-selecting heads 418ᵐ, when in one of their adjusted positions, as heretofore explained, lie in the paths of the counter axles 400 and studs 458 to withhold all the counters 490, 490ˣ from engagement with their racks 410. Amounts may then be set up on the keyboard and printed without being accumulated on the sets of counters.

As the engagement of the counters and racks is necessary when taking a total, or in clearing the counters, depression of the clearing key 327 or the total key 327ᵇ when the counter-selecting heads are in the above-mentioned position would be futile, and we provide a locking mechanism (Figs. 4, 5 and 39–41) to prevent the depression of these keys under such conditions.

To this end, a link 421ᵇ secured by a long pivot 456ᵍ, preferably to the right hand counter-selecting head 418ᵐ, connects the latter with the locking plate 421ᵈ having a laterally projecting hollow boss 442ᵇ journaled in the adjacent (right hand) side frame 969ᵈ. The boss is hollow to permit the insertion and removal of the usual rod 102 which holds the upper end of the well known Wales removable keyboard in place. A stud 360 mounted in the right hand set lever 318ᵈ, forming part of the totaling and clearing mechanisms above explained, and rocked by the depression of the total and clearing keys 327ᵇ and 327, projects into an arcuate slot 421ᵐ in the locking plate 421ᵈ. The slot terminates at either end in offset branches 421ᵖ.

When the counter-selecting head 418ᵐ is shifted to any of its extreme positions, (Fig. 5) to release one or another of the sets of counters for operation, it rocks the locking plate 421ᵈ, so that the stud 360 on the set lever 318ᵈ lies in line with one or the other of the offset branches 421ᵖ to enable the set lever to swing downwardly upon the depression of either the total key 327ᵇ or the clearing key 327. Obviously, the depression of the total or clearing keys 327ᵇ, 327, enters the stud 360 in one or the other of the offset branches 421ᵖ of the slots 421ᵐ to thus lock the counter-selecting head 418ᵐ against adjustment while the keys 327, 327ᵇ are depressed.

When the operator shifts the counter-selecting heads to their intermediate position to block the engagement of the sets of counters 490, 490ˣ with the drive racks 410, the locking plate 421ᵈ is rocked to the position shown in Fig. 4, so as to locate that portion of the plate between the offset branches of the slot beneath the stud 360 on the set lever 318ᵈ and thus lock the set lever 318ᵈ, and the total and clearing keys, against operation.

However, in order to lock the total and clearing mechanism more securely against strain caused by intentional or malicious pressure on the total and clearing keys 327ᵇ and 327, when the counter-selecting lever 418ᵖ is in position to retain both sets of counters 490, 490ˣ out of mesh with the racks, we contrive to utilize the total and clearing key lock 328ᵇ (Figs. 33–35) located on the left hand side of the machine and explained in connection with the idle stroke enforcing means, to coöperate with the locking plate 421ᵈ on the right hand side of the machine.

Ordinarily, as heretofore pointed out, the detent 328ᵇ is in effective position, after every adding operation, with its arresting shoulder 328ᵐ located beneath the stop 360ᵐ on the left hand set lever 317ᵇ.

But by taking an idle stroke when the counter-selecting heads 418ᵐ are in one of their extreme positions, and then adjusting the counter-selecting lever 418ᵖ to its intermediate, or to its other extreme position, a forcible depression of either the clearing key 327 or the total key 327ᵇ might be effected, were it not for the additional safeguard which we provide.

Thus, the link 421ᵇ connecting the counter-selecting lever 418ᵖ and the locking plate 421ᵈ, supports an actuating stud 354ʸ (Figs. 4, 5, 40, and 41) which shifts back and forth as the lever is shifted to one or another of its positions. A pawl 328ᶠ fast on the cross shaft 304 has a cam nose 328ᵛ to coact with the actuating stud 354ʸ. When the counter-selecting lever 418ᵖ is in one or the other of its extreme positions, the actuating stud 354ʸ is positioned on one side or the other of the cam nose 328ᵛ of the pawl 328ᶠ, and the pawl lies in lowered position, but when the counter-selecting lever is shifted to its intermediate position, or from one extreme position to the other, stud 354ᶻ wipes along the cam nose until it reaches the highest point of the cam (Fig. 40), raising the pawl 328ᶠ, and rocking shaft 304 and crank 1814ᵐ on the left side of the machine (Figs. 33–35) to lift the check link 328ᵈ (providing it is not already in elevated position). Lifting the check link displaces the ear 328ᵗ from in front of the advanced shoulder 328ᵖ, and enables the lock 328ᵇ to interpose its arresting shoulder 328ᵐ in the path of the stop 360ᵐ on the left hand set lever 317ᵇ to thus prevent forcible depression of the total and clearing keys and consequent strain on or injury to the mechanism.

This safety device also requires that the operator take an idle stroke before depressing the total or clearing keys, after having shifted the counter-selecting lever to render another set of counters active.

*Interlock between the counter-selecting lever, the handle and the starting key.*

A safety device is provided in the form of an interlocking mechanism, which on the one hand, prevents the actuation of the main drive shaft 200 in case the counter-selecting lever is not properly located in one of its positions, and on the other hand, prevents the operation of the counter-selecting lever 418ᵖ after the main drive shaft has started on its forward stroke.

In the particular embodiment herein shown, (Figs. 40 and 41), we provide the locking plate 421ᵈ with a control stud 354ᶻ adapted to coact with a series of abrupt cams 422ᵐ, 422ᵖ formed on the rearwardly extending arm of a lever 422 fast on the inner end of a stub shaft 457ᵈ journaled in the right hand side frame.

A spring 388ᵖ connected to the rearwardly extending arm of the lever 422 tends to press the latter against the control stud 354ᶻ.

The forwardly extending arm of the lever 422 carries a pin 350ᵐ entered in the lower slotted end of a link 423ᵇ, whose upper end is secured to the forward end of a latch 423 pivoted on the inner end of a stationary pin 954ᵇ mounted in and projecting through the side frame. The rear end of the latch 423 carries an offset lip 423ᵐ adapted to coact with the serrated convex edge of a full stroke segment 210ᶠ detachably connected to the main drive shaft 200 in the manner shown in U. S. Patent to Kuentzler, 1,074,054, September 23, 1913, for example. A full stroke pawl 215 controlled by a spring 284ᵇ, coöperates with the full stroke segment in the usual manner. A spring 486ᵇ inferior to the spring 388ᵖ, tends to engage the latch 423 with the serrated edge of the full stroke segment 210ᶠ.

When the counter-selecting lever 418ᵖ lies in any of its properly adjusted positions (as in Fig. 40), the control stud 354ᶻ on the locking plate 421ᵈ, occupies one or another of the seats on either side of the two cams 422ᵐ, 422ᵖ, and the pin 350ᵐ on the forward end of the lever 422 contacts the bottom of the slot in the link 423ᵇ, under the influence of the spring 388ᵖ, to hold the detent 423 in idle position. Shifting the lever 418ᵖ to one or the other of its extreme positions, causes the control stud 354ᶻ to ride over one or the other of the cams 422ᵐ, 422ᵖ, to depress the rearwardly extending arm of the lever 422, and raise the forwardly extending arm thereof, whereby to further tension the restoring spring 388ᵖ and relieve the spring 486ᵇ for action. The spring 486ᵇ immediately snaps the detent 423 into engagement with the serrated full stroke segment 210ᶠ, to lock the latter and the main drive shaft against operation, when the machine is being stroked by hand.

The pin and slot connection 350ᵐ between the lever 422 and link 423ᵇ permits the operation of the detent 423 at the outset of the travel of the counter-selecting lever 418ᵖ, continued travel of which merely raises the pin 350ᵐ farther along the slot in link 423ᵇ (as shown in Fig. 41) until after the control stud 354ᶻ passes the apex or high point of the cam 422ᵐ or 422ᵖ. As the selecting lever 418ᵖ reaches its proper location, the control stud 354ᶻ rides off the cam 422ᵐ or 422ᵖ, to free lever 422 to the action of the restoring spring 388ᵖ, which rocks the lever and presses the pin 350ᵐ against the lower end wall of the slot in the link 423ᵇ to lift the detent 423 to idle position against the tension of the spring 486ᵇ.

If the counter-selecting lever is improperly located, the control stud 354ᶻ does not ride off the cam 422ᵐ or 422ᵖ (as shown in Fig. 41), and detent 423 remains effective to prevent forward rotation of the main drive shaft by the handle.

In many cases, a motor is utilized to drive the main shaft, the motor becoming effective to accomplish this result by the depression of a starting key 915ᵈ (Figs. 40 and 41) against the tension of a restoring spring 984, as shown in U. S. patent to Wilgus, 1,150,916, August 24, 1915, to which reference is made for a more complete explanation.

It is customary to remove the usual handle (not shown) from the main drive shaft, when the latter is to be motor-driven, as set forth in the patent to Kuentzler, 1,074,054, above referred to, and in such event the full stroke segment 210ᶠ automatically disconnects from the main drive shaft, as the handle is removed. Hence, the full stroke detent 423 becomes ineffective. We therefore, provide a locking means controlled by the counter-selecting lever 418$^p$, for the starting key 915$^d$, which means in the present instance, comprises locking arm 422$^b$ fast on the outer end of the stub shaft 457$^d$, to which it will be remembered the cam lever 422 is secured. The lower end of the locking arm 422$^b$ is preferably hook-shaped to coact with a lug 915$^m$ which, for the purposes of the present disclosure, may be mounted on the starting key stem 915$^d$, but is shown as projecting from a lever 915$^a$ pivoted at 350$^p$ to the starting key 915$^d$ and lying substantially parallel therewith. A spring 281$^m$ connected to the upper headed end of the lever 915$^a$, holds it normally against the outwardly projecting pin 954$^b$.

With the counter-selecting lever in any of its properly located positions, (as in Fig. 40), the spring 388$^p$ maintains the rear arm of the lever 422 in elevated position with the oscillatory stub shaft 457$^d$ at one end of its path of rotation, and the hooked end of the locking arm 422$^b$ retracted out of the path of the lug 915$^m$, to enable depression of the starting key 915$^d$ against the tension of its restoring spring 984.

As the counter-selecting lever 418$^p$ starts to shift from one to another of its predetermined positions, the stud 354$^z$ rides up the abrupt cam 422$^m$, or 422$^p$, to rock the lever 422 and the stub shaft 457$^d$ against the tension of the spring 388$^p$, as heretofore explained, and swing the locking arm 422$^b$ to effective position beneath the lug 915$^m$ (see Fig. 41). The locking arm remains effective until the control stud 354$^z$ is about to occupy the seat corresponding to the position to which the counter-selecting lever is shifted, whereupon the restoring spring 388$^p$ returns the lever 422, stub shaft 457$^d$ and locking arm 422$^b$ to their normal positions.

It is quite as desirable to prevent any attempt to shift the counter-selecting lever 418$^p$, during the operation of the main drive shaft 200, as it is to prevent the operation of the main drive shaft while the counter-selecting lever occupies an improper position, and to lock the counter-selecting lever during the operation of the machine, we provide a blocking means which, in the present illustrated form of the invention, comprises a check block 491 (Figs. 40 and 41) fixed to and projecting from the rearwardly extending arm of the lever 422 controlled from the counter-selecting lever 418$^p$. A stop 423$^p$ formed on the upper end of an arresting lever 423$^d$ pivoted on the stationary stud 260$^f$ mounted in the right hand side frame, lies closely adjacent and normally out of the path of the check block, as shown in Fig. 40.

A spring 289 secured to an offset 423$^r$ of the lever 423$^d$, tends to swing the lever to interpose the step 423$^p$ into the path of the check block 491, but is normally overcome by the contact of the pivot stud 259$^f$ projecting from the right hand total key locking segment 212$^b$, with an outturned ear 423$^s$ on the offset 423$^r$ of lever 423$^d$.

It will be remembered that the right hand total key locking segment 212$^b$, is connected by the link 214$^b$ with the trip rod 303, and rocks back and forth therewith. Consequently, when the main drive shaft 200 which controls the trip rod, is in its home position, it holds the trip rod at its rear limit of travel, and the trip rod, through the link 214, segment 212$^b$ and restraining stud 259$^f$, holds the arresting lever 423$^d$ in idle position, to permit the oscillatory lever 422 to rock down and back as the control stud 354$^z$ rides over the cams 422$^m$, 422$^p$ when the counter-selecting lever is shifted. But at the outset of the forward stroke of the main drive shaft, the trip rod 303 advances, forcing the link 214$^b$ and stud 259$^f$ forwardly, to thereby release the arresting lever 423$^d$ to the action of its spring 289, which at once rocks the lever to fit the step 423$^p$ against the check block 491. The arresting lever 423$^d$ thus effectually prevents the counter-selecting lever 418$^p$ from shifting until the stud 259$^f$, near the end of the return stroke of the main drive shaft, contacts the ear 423$^s$ to retract the arresting lever to idle position.

*Communicating and complementary subtraction mechanism.*

So far as at present explained, the machine is capable of accumulating different amounts on the separate sets of counters and printing the totals of such amounts.

Thus, debit amounts can be accumulated on the forward set of counters, and credit amounts on the rear set of counters, by the proper adjustment of the counter-selecting heads 418$^m$.

It is also desirable to obtain a balance between the debit and credit totals registered on the several sets of counters.

Both direct subtraction and forms of so-called complementary subtraction have been utilized to obtain this result.

In the present instance, we employ the pure complementary method to obtain the desired balance, as illustrated in U. S. patents to Peters, Nos. 1,255,568 and 1,255,821, February 5, 1918.

To briefly outline the method used, we will assume that in computing customers' accounts, for example, a credit subtrahend is accumulated on the rear set of counters 490$^x$ and a debit minuend on the front set of counters 490.

To obtain the balance, by the complementary method, it is necessary to add the complement of the subtrahend registered on the rear set of counters, to the minuend registered on the front set of counters, at the conclusion of which operation, the result is left on the front set of counters.

Accordingly, the complement of the subtrahend amount is automatically determined by the positions of the subtrahend counters, and its communication to the minuend counters demands that the subtrahend counters remain stationary throughout the operation.

The subtrahend counters are maintained in their idle position by the proper adjustment of the counter-selecting mechanism heretofore explained, and the minuend counters are released for operation.

Operating a subtraction key, positions arresting devices in the paths of the several denominational racks to check the latter when they have advanced (upon the forward stroke of the main drive shaft 200) sufficiently to represent the complement of the subtrahend. In other words, the complement is loaded on the racks.

The positions of the stop arms or arresting devices are controlled by complementary cams turning with the respective subtrahend counters, means connected with the arresting devices being adapted to coact with the complementary cams to properly locate the arresting devices in the paths of the racks.

The normal operation of the machine, as in adding, therefore, permits the racks 410 to advance until checked by the arresting devices, and the racks, on their retirement, turn the minuend counters to accumulate thereon the complement of the subtrahend. As in the ordinary complementary subtraction, wherein the complementary number is set up on the keyboard, such complement added to the minuend, exceeds the capacity of the machine, and the excess amount is cleared from the counters of higher denomination by the usual carrying action, to leave the true result registered on the minuend counters.

The complement of an amount registered on one set of counters, may be communicated to any other set of counters.

By the use of this mechanism, recapitulations or grand totaling operations can be performed, whereby the complements of totals separately accumulated on one set of counters may be communicated to another set of counters which serve as storage counters, after which the first-named counters are cleared preparatory to accumulating a second total.

The accumulated complements of the several totals may be communicated in turn, from the storage set of counters to the first-named set of counters, even when the latter set of counters bears the last separately accumulated total, as shown in Fig. 32, such accumulated total of the complements of individual totals being automatically transmuted or converted, with the last separately accumulated total, if any, into a grand total by such operation.

As the complement of any number is that number which, added to the original number, raises the latter to the next higher power of ten, it will be seen that in obtaining the above results at a single operation, without resorting to auxiliary aids, it is necessary to cause the units counter to turn farther than the tens and higher counters to obtain the correct result.

In many previous machines, a codigital amount has been added to the minuend and supplemented by the addition of an extra "1" to the units counter through the medium of supplementary means. Such extra "1" has been called the "fugitive one," but mathematically, in pure complementary subtraction, there is no such unit.

Instead, in the method employed in this machine, the proper amount of rotation is imparted to the minuend units counter by a single impulse to register thereon the complement in the units denomination.

This result is obtained by arranging that the units rack shall have a farther travel proportionate to the travel of the racks in the tens and higher orders.

Referring to Figs. 1, 2, 18, 19, 20 and 21, the subtraction or communication lever 412 fixed on the shaft 401, projects upwardly through a slot 1065$^p$ (Fig. 3) in the casing 1065 within easy reach of the operator. Oppositely extending presser feet 412$^c$ (Figs. 2, 20 and 21) fast on the shaft 401, rest upon their respective universal tension rods 405 and 405$^d$ extending across the machine in front of and in rear of the cross shaft 401, respectively, the tension rods being respectively mounted in the depending divergent arms of pairs of opposed bell cranks 412$^d$ journaled on the cross shaft 401. Springs 485$^a$ connect the upper arms of the respective pairs of bell crank levers 412$^d$, which arms extend on opposite sides of and contact the cross shaft 402. The cross shaft 402 thus arrests the bell cranks to hold the tension rods in their elevated positions, and the subtraction lever in its idle position. A series of springs 485$^b$ connect the rear tension rod 405$^d$ with a series of upwardly and rearwardly extending links 413$^e$, forked at their lower ends to embrace the rod 405$^d$ for guidance, and pivotally attached at their upper ends to the tails of a series of forwardly extending denominational feeler fingers 413 journaled on the rear cross rod 404, and adapted to contact with the stepped shoulders of snail cams 411$^s$ turning with the respective denominational counters 490$^x$.

A like series of springs 485$^b$ connect the front tension rod 405 with a series of upwardly and forwardly extending links 413$^d$ similar to the links 413ᵉ and pivotally attached at their upper ends to the tails of a denominational series of rearwardly extending denominational feeler fingers 413ᵃ journaled on the front cross rod 404, and adapted to contact with the stepped or graduated shoulders of snail cams 411ᵃ turning with the respective denominational counters 490.

The stepped snail cams 411ᵃ are so arranged on their respective counters 490, 490ˣ that when the counters display zeros through the sight apertures in the sight plate 415 (Figs. 2 and 3), the highest shoulders of the snail cams, that is, those farthest away from the axes 400, lie just above and in the paths of the abutments 413ᵐ on the respective series of feeler fingers 413ᵃ and 413 (see Fig. 20). As the counters rotate in the direction of the arrows, in accumulating amounts thereon, the snail cams 411ᵃ present successively lower shoulders to the feeler fingers as the digits registered by the corresponding counters increase in value.

Hence, a feeler finger 413ᵃ or 413 is afforded a farther travel, the lower the shoulder presented to it, and correspondingly, the higher the value of the digit registered at that time on the individual counter.

The free ends of the respective sets of feeler fingers 413ᵃ and 413 extend to points adjacent each other, and separate series of slotted links 413ᵇ pivotally connect the fingers with headed studs 456ᵃ on a denominational series of stop arms 413ˢ, journaled on the cross rod 403. The studs 456ᵃ on the respective denominational stop arms are common to the connecting links 413ᵇ of the corresponding front and rear feelers 413ᵃ and 413 of like denomination, so that the front feeler 413ᵃ and the rear feeler 413 in the tens denomination (for example) will actuate the single stop arm 413ˢ of that denomination.

The subtraction lever 412ⁱ normally lies in its intermediate position (Figs. 1, 18 and 20), owing to the tension of the restoring springs 485ᵃ on the bell crank brackets 412ᵈ, assisted by the springs 485ᵇ.

Rocking the subtraction lever 412 forwardly (Figs. 19 and 21) from its intermediate position, rotates the shaft 401 and turns the forwardly extending presser feet 412ᶜ against the tension of springs 485ᵃ, to bear down upon the forward tension rod 405 and rock the forward brackets 412ᵈ to extend the forward series of springs 485ᵇ. The cross rod 402 prevents the opposite brackets 412ᵈ from yielding to the springs 485ᵃ and thus retains the rear feelers idle. The springs 485ᵇ draw the forward series of links 413ᵈ downwardly and rock the rearwardly extending series of adjusting members or feeler fingers 413ᵃ upwardly until their abutments 413ᵐ strike the particular shoulders of the corresponding front snail cams 411ᵃ, which shoulders have been positioned in the paths of the abutments by the accumulations on the front set of counters 490.

The feelers 413ᵃ draw with them the slotted links 413ᵇ to shift the stop arms 413ˢ, against the tensions of their restoring springs 485ᵈ, to various heights according to the distances traversed by the feelers, and thus position arresting studs 456ᶜ on the stop arms, in the paths of one or another of the pockets or graduated steps 410ᵖ formed on the front edges of the stocks 410ᵐ of the corresponding racks or drive members 410, to arrest the latter when they shall have advanced sufficiently to represent the complement of the amount registered on the front counters 490.

The shouldered snail cams 411ᵃ control the adjustment of the stop arms 413ˢ relatively to the steps 410ᵖ, and in the present instance, these steps are so disposed or graduated on the stocks of the rack members 410 that the travel of the latter is successively shortened in proportion to the height to which the stop arms are raised.

Referring to Fig. 20, wherein the highest shoulders of the front and rear snail cams 411ᵃ are located in the paths of their respective adjusting members or feelers 413ᵃ, 413, it will be noted that normally, the bottoms of the slots 413ᵖ in the links 413ᵇ lie below the studs 456ᵃ. The leverages are so arranged that the feelers 413ᵃ of the tens and higher denominations, in their travel from their normal idle positions until their arrest by the highest shoulders of the snail cams 411ᵃ, will first take up the clearance in the slots 413ᵖ of the links 413ᵇ and then shift the corresponding stop arms 413ˢ one step upwardly in position to seat in the proper pockets 410ᵖ and arrest the corresponding rack members 410 when the latter have advanced sufficiently to add "9" to the active set of counters on the retirement of the racks to normal. Obviously, then, if the subtrahend counters of the tens and higher orders register 1, 2, 3, 4, 5, 6, 7, 8 or 9, the feeler fingers 413ᵃ or 413 will travel progressively farther distances as the value of the digit registered increases, and will raise the stop arms 413ˢ accordingly, to progressively shorten the advance of the rack members 410 so that the latter will turn the minuend counters 8, 7, 6, 5, 4, 3, 2, 1 or no steps, in the example given.

The complement of a digit in the units place is that digit which when added to the original digit, will total 10. Where the units digit of the subtrahend is a cipher, it is necessary to add "10" on the minuend units counter (in the decimal system); if the units digit of the subtrahend is 6, for instance, it is necessary to add "4" on the minuend units counter, and so on; whereas, the complements of the individual digits in the tens and higher orders of the subtrahend are, as above shown, those digits which added to the subtrahend digits of the tens and higher orders, total "9."

Hence, it is necessary to arrange for the farther rotation of the units counter of the minuend register one step more than the degree of rotation necessary in case the same digit is registered on the tens or higher order counters.

For example, in subtracting by the complementary method;

```
    99
    66
    —
    33
``` the complement of the subtrahend 66 is 34, although the tens and units digits of the subtrahend are the same, and the units counter of the minuend turns one more step than the tens counter in performing the subtraction.

The arresting studs 456$^c$ of the stop arms 413$^s$ normally rest upon the arcuate surface 410$^r$ (Fig. 20) formed at the roots of the stocks 410$^m$ of the several rack members 410, in position to enter the lowermost pockets or shoulders 410$^p$ to arrest the racks when the latter have advanced ten steps. The racks of the tens and higher orders, however, never advance beyond a nine step travel, as illustrated in Figs. 20 and 21 wherein the elevation of the feelers 413$^a$ to contact the abutments 413$^m$ with the highest shoulders of the snail cams 411$^s$, (which highest shoulders are positioned in the paths of the feelers when their corresponding counters register zero) shifts the corresponding slotted links 413$^b$ to raise the stop arms 413$^s$ one step to the full line position shown in Fig. 21, to thus arrest the racks at the end of a nine step advance.

We attain this result by locating the studs 456$^a$ on the stop arms 413$^s$ of the tens and higher orders close to the median lines of the stop arms, as shown in the lower view in Fig. 22, and to enable the units rack to advance a farther step, we locate the studs 456$^a$ on the units stop arms 413$^s$, as shown in the upper view in Fig. 22, a distance from the median lines of such arms sufficient to enable the corresponding slotted links 413$^b$ to just contact the studs without shifting the arms, when the highest shoulders of the units' snail cams 411$^a$ are positioned in the paths of the feelers 413$^a$, as shown in dotted lines in Fig. 21.

Obviously, this permits a farther idle travel of the units links 413$^b$ than of the links 413$^b$ in the tens and higher orders, and hence the units stop arms lag one step behind the tens, etc. stop arms to permit the one step farther travel of the units racks and a one step farther travel of the units counters to register the complement of the units digit of the subtrahend amount.

*Subtraction lever control of counter-selecting and ribbon shift mechanisms.*

As heretofore stated, the communication of the complement of an amount registered on one set of counters to, and the registration of such complement on another set of counters according to the method herein employed, requires that the first mentioned or subtrahend set of counters remain disengaged from their racks 410 throughout the operation.

Formerly, this has been attained by requiring the operator to shift the counter-selecting heads 418$^m$ to hold the subtrahend counters in normal idle position and release the minuend bearing counters for operation, as heretofore explained, and then to separately shift the subtraction or communication lever 412 toward the counters bearing the subtrahend, to contact the feelers 413, or 413$^a$ with the shouldered snail cams 411$^s$ of the subtrahend counters, whereby to locate the stop arms 413$^s$ in position to arrest the racks 410 when the latter have advanced sufficiently so that on their retirement, they will register the complement of the amount shown by the idle subtrahend counters, on the active minuend counters.

We have improved this former construction by enabling the operator to control the counter-selecting mechanism from the subtraction or communication lever 412.

In the form herein shown, the counter-selecting lever 418$^p$ projects from that counter-selecting head 418$^m$ located at the right hand side of the machine, and the communication lever 412 projects upwardly on the opposite side of the machine adjacent the left hand counter-selecting member 418$^a$ (Figs. 18 and 19).

We provide the subtraction lever 412 with an enlargement 412$^m$ (Fig. 19) intermediate its ends, and having an arcuate slot 412$^p$ through which projects a stud 463 mounted in the adjacent counter-selecting member 418$^a$. A crank 412$^e$ (Fig. 11) fast on the opposite end of the subtraction shaft 401 lies adjacent the right hand counter-selecting member 418, and is formed with a similar slotted enlargement 412$^m$ to accommodate a similar stud 463 projecting from that counter-selecting member 418 in proximity thereto.

The slots 412$^p$ permit the counter-selecting lever 418$^p$ to be shifted to any of its extreme positions without operating the subtraction or communication mechanism, the travel of which is of greater extent than that of the counter-selecting lever, whereby to enable the subtraction lever 412 and its crank 412$^e$, when shifted to any of their extreme positions, from the normal intermediate position, to contact the studs 463 and adjust the counter-selecting mechanism to lock out of operation that set of counters bearing the registration whose complement is to be communicated, and free for operation that set of counters to which the complement is to be communicated.

This control of the counter-selecting mechanism by the subtraction lever 412 also enables the subtraction lever to adjust the ribbon shifting mechanism, depending upon the set of counters selected to receive the communication, in the manner heretofore set forth.

*Subtraction lever control of non-print mechanism and communication sign printing.*

Although the types 561 are positioned at the printing line, during a subtracting or communicating operation, it is desired that no printing action occur at that time, to prevent which, we contrive a means controlled by the subtraction lever 412 to render the special hammer lock or non-print member 529 (Figs. 15, 18 and 19) effective.

A depending arm 412$^b$ fast on the subtraction lever shaft 401 carries a stud 454 entered in slots 414$^m$, 414$^p$ located in the forward ends of a pair of equalizing links 414$^b$, 414$^c$, respectively.

Normally, (Fig. 18) the stud 454 lies at the outer end of the slot in link 414$^b$ and at the inner end of the slot in the link 414$^c$. The rear ends of the links are pivotally secured to the opposite arms of a rocker 516$^a$ journaled on the fulcrum shaft 508$^d$ and having a rearward extension 516$^m$ connected by a spring link 583$^m$ to the special trip bar 513$^a$ which controls the special non-print lock 529 and the sign printing hammer 510$^f$ (Fig. 11), as heretofore explained. A restoring spring 485 normally retains the rocker 516$^a$ and its extension 516$^m$ in lowered idle position.

Shifting the subtraction lever 412 forwardly, or to the right (in Fig. 19), to set the mechanism to communicate the complement of the amount registered on the forward set of counters, to the rear set of counters, presses the stud 545 against the rear end of the slot in the link 414$^c$ to force the latter backwardly and swing the lower arm of the rocker 516$^a$ rearwardly against the tension of returning spring 485, the upper arm of the rocker swinging forwardly to raise the extension 516$^m$. The extension, in turn, through the spring link 583$^m$, lifts the special trip bar 513$^a$ until the lower abutment 513$^r$ thereon passes above the path of travel of the arresting finger 529$^a$ of the non-print lock 529, after which, upon the operation of the machine, the lock will become effective, to hold the hammers 510 against operation. The upper equalizing link 414$^b$ travels forward idly relatively to the stud 454 during such forward throw of the subtraction lever.

The lever 412, when shifted rearwardly from its normal position, to set the mechanism to communicate the complement of the amount registered on the rear set of counters to the forward set of counters, presses the stud 454 against the forward end of the slot in the link 414$^b$ to draw the latter forwardly and swing the rocker 516$^a$ in the same direction, as when the lever is shifted forwardly, the stud 454 then traversing the slot in the link 414$^c$ which is idly retracted.

Thus, it will be seen that the links 414$^b$, 414$^c$ equalize and render uniform the effect of the lever 412 irrespective of its direction of travel.

A special sign called a communication sign (Figs. 1, 18 and 19) is printed incidentally to the subtracting or communicating operation, such sign, in the present instance, being the lowest of the sign types on the sign printing typecarrier 514$^m$ connected to travel with the trip bar 513$^a$ by the link 515$^m$, as heretofore set forth.

Hence, the trip bar when lifted by the tension of spring 583$^m$, carries with it the typecarrier 514$^m$. The upper abutment 513$^p$ on the special trip bar 513$^a$, contacts a check rod 507$^d$ mounted in the printer side frames 565 (Figs. 14 and 15) and arrests the trip bar 513$^a$ and the typecarrier 514$^m$, to locate the communication or subtraction sign type $\oplus$ at the printing line. The trip bar also disables the hammer detent 511$^e$ to prevent the detent from restraining the sign printing hammer 510$^f$ from operation, when the restoring bar 509$^d$ is withdrawn and the universal latch 518 raised.

The sign printing hammer 510$^f$ operates as hereinbefore explained to effect the imprint of the communication sign.

*Interlock between the subtraction lever and the clearing and total keys.*

To prevent the depression of the total and clearing keys 327$^b$ and 327, (Fig. 1), when the subtraction lever 412 is operated, and vice versa, we provide an interlock (Figs. 1, 18 and 19) including a locking plate 421$^f$ provided with a hollow boss 442$^d$ journaled in the left hand side frame 969$^d$, and having an arcuate slot 421$^r$ with a single depending branch 421$^s$ communicating with the arcuate slot 421$^r$ at a point intermediate its ends. The locking stud 359$^m$ on the adjacent set lever 317$^b$ enters the arcuate slot and is normally located at the juncture of the branch 421$^s$ with such slot, to permit the depression of the total and clearing keys 327$^b$ and 327 when the subtraction lever is in its idle position.

A connecting bar 421 is pivoted at its opposite ends to the locking plate 421$^f$ at 457, and to the subtraction lever 412, at 452. Shifting the subtraction lever to one of its effective positions, swings the locking plate 421$^f$ to displace the depending branch slot 421$^s$ relatively to the stud 359$^m$, to prevent depression of either the clearing or total keys while the subtraction lever remains in effective position.

The subtraction lever, on its return to idle position, relocates the branch slot in the path of travel of the locking stud 359$^m$. A tail 421$^t$ on the locking plate 421$^f$ lies behind the stem of a repeat key 219 (Fig. 18) (well known in the Wales machine) to maintain the locking plate in position and guide it in its travel.

Obviously, the entry of the locking stud 359$^m$ of the set lever into the branch slot 421$^s$ upon the depression of the total or clearing keys, locks the subtraction mechanism in its normal idle position.

Lock to hold subtraction key in effective position.

To render it unnecessary for the operator to manually hold the subtraction key 412 in its operated position against the tension of the restoring springs 485$^a$ and 485$^b$, when making a subtraction or communicating an amount from one set of counters to another, and also to assure the operator that he has completely shifted the lever to its proper position, we provide a mechanical means to hold the lever in any of its operative positions, when it has been shifted thereto. And in so doing we utilize the locking plate 421$^f$ and connected parts.

Thus, the pivot stud 457 connecting link 421 and locking plate 421$^f$ (Figs. 1, 18, 19 and 42–44) extends inwardly between the coacting members of a pair of rearwardly projecting locking jaws 422$^g$, 422$^e$, shown best in Fig. 44, pivoted on a stationary stud 457$^t$. The lower jaw 422$^e$ has a seat 422$^t$ formed therein, with inclined inner walls and abrupt outer walls, to accommodate the stud 457 on the subtraction lever-controlled locking plate 421$^f$, when the subtraction lever 412 is in normal idle position. The upper jaw 422$^g$ is provided with a locking recess 422$^v$ in register with the stud 457 when the latter is in the seat 422$^t$, and a spring 485$^c$ connecting the rear ends of the locking jaws 422$^g$, 422$^e$, closes the jaws to fit the recess 422$^v$ over the stud and lock the lever 412 against adjustment after the main drive shaft 200 starts on its forward stroke.

The crank 212 fast on the main drive shaft 200 carries a disabling stud 255 which, when the shaft is in its home position, contacts a depending projection 422$^w$ of the upper jaw 422$^g$ to raise the upper jaw and hold its locking recess 422$^v$ apart from the stud 457 (Fig. 42).

The lower jaw 422$^e$ is prevented from following the upper jaw because of the stud 457 in the seat 422$^t$. The spring 485$^c$ being tensioned by the upper jaw, holds the seat snugly against the stud to prevent accidental shifting of the subtraction lever 412 from normal position.

Positive shifting of the lever 412 from normal position, causes the stud to wipe along one or the other of the inclined walls of the seat 422$^t$ to force the lower jaw 422$^e$ downwardly against the tension of spring 485$^c$ until the stud slips over either side wall of the seat, whereupon the spring 485$^c$ restores the lower jaw to its normal position and interposes one of the abrupt outer walls of the seat in the path of return of the stud to lock the latter and its lever 412 where adjusted, even against an attempt to positively restore the lever to normal position.

As the operator may sometimes shift the subtraction lever to one of its effective positions, by mistake, it is well to provide a means to enable him to remedy his error. Therefore, we place the locking jaws 422$^g$, 422$^e$ under control of the usual Wales correction key 227$^d$ (Fig. 42), one form of which is shown in U. S. patent to McFarland 842,232, January 29, 1907.

Correction key 227$^d$ in the present instance, is vertically slidable on a guide stud 951$^a$. Depression of the key against the tension of a restoring spring (not shown) causes a pin 362$^b$ carried by the key, to traverse a slot 227$^m$ in one arm of a bell crank trip member 227$^t$ fast on a stub shaft 264$^t$, journaled in the left hand side frame 969$^d$, to rock the trip member and stub shaft. A crank 227$^b$ fast on the stub shaft 264$^t$ connects the latter with a link 226$^b$ which in turn, is secured by a slot and pin connection 254$^b$ with an arm 224 fast on the usual cross shaft 201 through which the key-set stops 115 are released, in the manner set forth in the McFarland patent above referred to, and which forms no part of the present invention.

The crank 227$^b$ carries a stud 257$^d$ (Figs. 42 and 44) adapted to contact a shoulder 422$^x$ projecting from the lower locking jaw 422$^e$, in front of its pivot 457$^t$, to rock the lower jaw downwardly against the tension of the spring 485$^c$, and free the stud 457 and its subtraction lever 412 to the action of their restoring springs 485$^a$ and 485$^b$, which thereupon return the lever and its stud 457 to normal idle position (Fig. 42).

When pressure on the correction key 227$^d$ is removed, the key restores, rocking the bell crank trip member 227$^t$ and the crank 227$^b$ to normal idle position and withdrawing the stud 257$^d$ from the shoulder 422$^x$ to enable the spring 485$^c$ to again fit the seat 422$^t$ against the stud 457.

The jaws 422$^g$ and 422$^e$ operate to lock the subtraction lever 412 in any of its positions during the operation of the main drive shaft 200, the stud 255 on the crank 212, by its contact with the depending leg 422ʷ, operating to withdraw the upper jaw 422ᵍ from the stud 457 at the end of the return stroke, as hereinbefore noted.

If, however, the lever 412 occupies one of its effective positions, in which instance it is locked in place by the lower jaw 422ᵉ, it is necessary to displace such lower jaw at the end of the return stroke. For this purpose, we provide the lower jaw with a forward extension 422ʸ on which is formed a cam 422ᶻ lying in the path of a wiper 256ᵗ carried on one end of a tappet 422ᵗ journaled on a frame stud 260ᵐ. The opposite end of the tappet lies in the path of the disabling stud 255 on the crank 212, and a spring 487ᵇ connecting the tappet 422ᵗ and the forward extension 422ʸ, holds the wiper 256ᵗ yieldingly against the cam 422ᶻ. The crank 212, on the forward stroke of the main drive shaft 200, merely swings the tappet idly in a clockwise direction, until the crank clears the tappet, whereupon the spring 487ᵇ returns the tappet to normal position with the wiper 256ᵗ in contact with the cam. On its return stroke, the main drive shaft brushes the crank against the tappet to rock the latter and force the wiper 256ᵗ against the cam 422ᶻ, along which it rides, thereby swinging the lower jaw 422ᵉ downwardly to release the stud 457 from the abrupt outer wall of its seat 422ᵗ, and thus free the locking stud 457 and the subtraction lever 412 to the action of the restoring springs 485ᵃ and 485ᵇ which return the lever to idle position.

*Subtraction lever locking mechanism.*

As an additional means to lock the subtraction lever 412 in any of its adjusted positions, upon starting to operate the machine, and also to prevent accidental or intentional mismanipulation which would result in an incorrect registration on the counters or in injury to the machine, we provide a keeper 412ᵃ (Figs. 18 and 19) fulcrumed on the cross rod 903ᶜ and having an opening to accommodate a locking stud 354ᵗ projecting thereinto from the depending arm 412ᵇ of the subtraction lever 412. One wall of the opening is provided with successive recesses 412ʳ, 412ˢ and 412ᵗ, to form seats for the locking stud 354ʳ; the intervening walls between the recesses being tapered, as shown, to lead the stud to and insure that it will seat in one or another of the recesses upon beginning the operation of the main drive shaft 200, in case the operator fails to shift the subtraction lever 412 to its extreme limit of travel, but holds it in a partially operated position, while starting the main drive shaft.

The trip rod 303 which, when the machine is at rest, lies at one end of an undercut cam slot 412ᵛ formed at the forward end of the keeper (see Fig. 18), holds the keeper elevated against the tension of the spring 485, to enable the stud 354ʳ to shift back and forth in the opening as the subtraction lever 412 is rocked toward any of its effective positions.

The main drive shaft 200, when turned on its forward stroke, advances the trip rod 303 which wipes along the cam slot 412ᵛ to swing the keeper downwardly, and cause that particular seat 412ʳ, 412ˢ or 412ᵗ with which the locking stud 354ʳ is alined, or adjacent which the stud is located, to fit over the stud and prevent adjustment of the subtraction lever during the operation of the machine. During the continuation of the forward stroke of the machine, the trip rod 303 escapes from the cam slot and rides over a horn 412ˣ projecting from the keeper, to maintain it effective. On the return stroke, the trip rod retraces its path along the horn 412ˣ and finally, near the end of the return stroke, it contacts the overhanging wall of the cam slot 412ᵛ to lift the keeper 412ᵃ off of the locking stud 354ʳ and thereby free the subtraction lever 412, to the action of its restoring springs 485ᵃ and 485ᵇ.

The locking stud 354ʳ supports the keeper while the trip rod 303 is out of contact with the overhanging wall of the cam slot 412ᵛ during the operation of the main drive shaft.

The springs 485ᵃ and 485ᵇ which restore the subtraction lever 412 to its normal position, also restore the feelers 413ᵃ (Figs. 20 and 21). Springs 485ᵈ return the stop arms 413ᵍ to normal and spring 485 (Figs. 18 and 19) insures the return of the equalizing links, the special type bar 514ᵐ and connected parts to their idle positions.

*Interlocking mechanism between the subtraction or communication lever, and the main drive shaft.*

It is desirable to provide interlocking mechanism to prevent operation of the main drive shaft when the subtraction or communication lever is only partially shifted to one of its effective positions, and we have contrived to utilize the locking means employed in connection with the counter-selecting lever 418ᵖ, for this purpose. Thus, a link 421ᵃ (best shown in Figs. 40 and 41) connects the right hand subtraction crank 412ᵉ fast on the subtraction shaft 401, with a depending actuating rocker 422ᶜ journaled on the cross shaft 202, and carrying a stud 257ᵇ designed to coact with an arm 422ᵃ fast on the stub shaft 457ᵈ. It will be remembered that this shaft also carries the controlling lever 422 for the detent 423 of the full stroke segment 210ʳ, and the locking arm 422ᵇ for the starting key 915ᵈ. A seat 422ʳ in the arm 422ᵃ accommodates the stud 257ᵇ, when the subtraction lever 412 is in its idle position, the spring 388ᵖ holding the seat up to the stud.

Shifting the subtraction or communication lever 412 turns the rod 401 in one direction or the other, to swing the actuating rocker 422⁰ and cause the stud 257ᵇ to ride out of its seat 422ʳ and up one or the other of the abrupt side walls thereof, onto the dwell portions 422ˢ (Fig. 43) flanking the seat, to depress the arm 422ᵃ and rock the stud shaft 457ᵈ, intermediate lever 422 and locking arm 422ᵇ. The lever 422 operates the detent 423 to lock the full-stroke segment 210ᵗ and handle against operation, and the hook-shaped end of the locking arm 422ᵇ enters the path of the lug 915ᵐ on the starting key 915ᵈ to prevent depression of the latter.

As the subtraction lever 412 finally reaches one or the other of its extremes of travel, it shifts the stud 257ᵇ off the dwell portions 422ˢ to enable the restoring spring 388ᵖ to return the arm 422ᵃ, lever 422, and locking member 422ᵇ to normal idle position, thereby freeing the main drive shaft 200 for operation, either manually, or by the motor, as hereinbefore explained.

The checking block 491 on the rearwardly-extending arm of the lever 422 rocks into and out of the path of the arresting lever 423ᵈ to aid the keeper 412ᵉ in preventing attempts to shift the subtracting lever 412 during the operation of the main drive shaft, just as explained in connection with the counter-selecting lever 418ᵖ. The subtraction lever 412 is thus held in adjusted position until near the end of the return stroke of the main drive shaft, at which time the arresting lever 423ᵈ is withdrawn, by contact of the stud 259ᶠ with the ear 423ˢ of the arresting lever.

The removal of the seat 423ᵖ on the arresting lever, from the path of the check block 491 frees the subtraction lever 412 to the action of its restoring springs 485ᵃ and 485ᵇ, which return the lever 412 to normal idle position, and in so doing, cause the stud 257ᵇ to ride up on the adjacent dwell portion 422ˢ of the arm 422ᵃ and thence down into the seat 422ʳ.

As heretofore explained, the subtraction or communication lever 412 shifts the counter-selecting lever 418ᵖ and associated mechanism through the studs 463, and the counter-selecting lever, in turn, would operate the detent 423 and locking arm 422ᵇ, but owing to the lost motion permitted between the counter-selecting and subtraction levers, the latter would not operate the foregoing locking means in time to prevent injury to the mechanism in case the main drive shaft 200 is actuated prior to the complete shifting of the subtraction lever. Hence, we provide the direct connection above set forth between the locking means and the subtraction lever.

To prevent as far as practicable, any possibility of an unintentional mismanipulation of the machine, a further lock between the subtraction or communication lever and the main drive shaft becomes effective when the latter is to be motor-actuated.

Depression of the starting key 915ᵈ (Figs. 40 and 41) compresses its spring 984 to rock an intermediate arm 916ᵈ fast on a cross shaft 900ᵈ journaled in the side frames. The cross shaft 900ᵈ trips clutch mechanism (not shown), whereby the motive power is communicated to the main drive shaft 200, all as shown more particularly in U. S. patent to Wilgus 1,150,916, above referred to. The opposite end of the rock shaft 900ᵈ carries a check arm 2111ᵇ (Figs. 42-44) in which is mounted a stud 963ᵐ normally lying above and adjacent the path of the front end of the forward extension 422ʸ of the lower locking jaw 422ᵉ.

When the subtracting lever 412 is in its idle position, the front end of the extension 422ʸ lies out of the path of the stud 963ᵐ, (Fig. 42) to permit depression of the starting key 915ᵈ, but as the subtraction lever is shifted to one or another of its effective positions and causes the stud 457 to ride out of its seat 422ᵗ, (Fig. 43), the stud depresses the lower jaw 422ᵉ and lifts the forward extension 422ʸ thereof, to position the front end of the extension directly in the path of the arm 2111ᵇ or its stud 963ᵐ, to prevent the premature depression of the starting key until the subtraction lever has reached its adjusted position. At such time, the stud 457 clears the outer wall of the seat 422ᵗ of the lower jaw, and the spring 485ᵉ snaps the jaw 422ᵉ back to locking position, as heretofore explained, and thereby returns the forward extension 422ʸ to idle position.

*Lock between the subtraction or communication lever and the counter-selecting lever.*

To afford a safeguard to prevent an operator from straining and injuring the mechanism by attempting to shift the counter-selecting lever 418ᵖ, when the communication lever 412 is locked in one of its effective positions, we provide a bail 424 (Figs. 39–44) having forwardly extending arms 424ᵇ and 424ᵐ journaled on the cross shaft 603, and lying alongside the paths of the communicating or subtracting lever 412 and the counter-selecting lever 418ᵖ, respectively.

The lower edge of the arm 424ᵇ rests upon a stud 1156ᵇ (Figs. 42 and 44) projecting from the subtracting lever 412, such edge being provided with shallow recesses 424ᵖ located on opposite sides of the stud and terminating in abrupt walls to arrest the subtracting lever 412 at opposite ends of its travel.

The lower edge of the opposite arm 424ᵐ of the locking bail 424 is recessed, as at 130

424ʳ, to loosely embrace a stud 459 (Figs. 40 and 41) carried by the counter-selecting lever 418ᵖ; the recess 424ʳ being provided at its opposite ends with deeper seats 424ˢ to fit over the stud 459 when the latter is brought into registry therewith.

A spring 487 connected to a horn 424ⁱ depending from the bail 424, presses the arms 424ᵇ and 424ᵐ down upon the studs 1156ᵇ and 459.

Owing to the fact that the subtraction or communication lever 412 has a greater throw than the counter-selecting lever 418ᵖ, the recesses 424ᵖ are located farther apart than are the seats 424ˢ.

When the counter-selecting lever shifts from one extreme position to the other, its stud 459 merely travels between the end walls of the recess 424ʳ and does not enter the seats 424ˢ which are held out of the path of the stud through the contact of the arm 424ᵇ with the stud 1156ᵇ on the subtraction lever 412.

When the subtraction lever 412 shifts toward either of its extreme positions, it at first moves idly relatively to the counter-selecting mechanism, and thus gains a lead thereon, after which it picks up and carries with it the counter-selecting mechanism, as heretofore explained. As the supporting stud 1156ᵇ of the subtracting lever 412 commences to enter one or the other of the shallow recesses 424ᵖ, it permits the spring 487 to lower the locking bail 424, and when the subtraction lever finally attains the end of its travel in either direction and its stud 1156ᵇ has entered the deepest portion of the appropriate recess 424ᵖ, the opposite arm 424ᵐ of the bail has dropped down over the locking stud 459 to fit one of the seats 424ˢ over the latter and thus lock the counter-selecting lever 418ᵖ against operation while the subtraction lever remains in its effective position.

The subtraction lever 412 starts to restore to idle position, while the counter-selecting lever 418ᵖ is still locked in one of its extreme positions. During such independent travel of the lever 412, its supporting stud 1156ᵇ rides out of the shallow recess 424ᵖ, and cams the arm 424ᵇ upwardly to rock the bail 424 and release the arm 424ᵐ from the locking stud 459 to free the counter-selecting lever 418ᵖ for operation. The latter lever, however, remains where adjusted until manually shifted to some other desired position.

*Subtraction lever control of rack detents.*

It is necessary in a subtraction or communication operation, to shift the rack-arresting detents 221 (Fig. 2) out of the paths of the positioning bars 310 in order that the racks 410 may advance until the complement of the subtrahend amount is loaded thereon.

We therefore, provide a pair of equalizing links 320ᵗ (Figs. 1, 29 and 30) pivoted at their forward ends by stud 452 to the subtraction lever 412, and slotted at their rear ends to accommodate studs 354ˢ carried by the opposite arms of a rocker 320ᵈ fast on a stud shaft 353 journaled in and projecting inwardly from the adjacent side frame 969ᵈ.

The upper stud 354ˢ normally lies near the outer end of the slot in the upper equalizing link 320ᵗ, whereas, the lower stud 354ˢ normally lies near the inner end of its slot in the lower equalizing link 320ˢ (see Figs. 1 and 29).

An arm 320ᵇ fast on the outer end of the stud shaft 353 is adapted to contact a pin 352ᵖ projecting from the detent-controlling slide 320.

Shifting the subtraction lever 412 in either direction from its normal idle position, pulls the upper equalizing link 320ᵗ forwardly or pushes the lower link 320ᵗ rearwardly, to oscillate the rocker 320ᵈ uniformly in one direction and turn the stud shaft 353, which presses the arm 320ᵇ against the pin 352ᵖ. The slide 320 is thus driven forwardly to cause the roll 238 to ride up the cam slot 320ᵖ and turn the crank 222ᵈ which, through the connected mechanism hereinbefore described, including the universal bail 204, swings the rack detents 221 out of the paths of the position bars 310.

Lifting the rack detents operates the bail 370 to dislodge the check link 328ᵈ and free the lock 328ᵇ which thereupon snaps to effective position and locks the total key 327ᵃ and clearing key 327 against depression, in addition to the locking plate 421ᶠ, heretofore referred to.

The slide 320, on its forward stroke, releases any of the key-set numeral stops 115 which may be depressed, in the manner set forth in McFarland, No. 842,232, January 29, 1907.

Upon the return of the subtraction lever 412 to normal position, the spring 387 connected to the slide 320, restores the latter to permit the detents 221 to return to normal effective position, and also returns the rocker 320ᵈ and equalizing links 320ᵗ toward normal idle position.

The counter-selecting, adding, totaling and clearing functions of the machine have been fully explained and are readily understood.

In subtracting, the subtraction lever 412 is drawn in the direction of the subtrahend counters 490, or 490ˣ, to lock them out of operation and free the minuend counters for operation. The lever actuates the feelers 413ᵃ or 413 to contact the adjacent shoulders of the complementary snail cams 411ª of the subtrahend counters. The feelers, in turn, position the stop arms 413ᵉ in the paths of the racks or drive members 410. The main drive shaft 200 is turned on its forward stroke to advance the racks, and the stop arms arrest the racks when they have advanced sufficiently to represent the pure complement of the subtrahend.

The communication or subtraction sign is printed near the end of the forward stroke and the active minuend counters drop into mesh with the racks.

The main drive shaft on its return stroke retires the advanced racks 410 to accumulate on the minuend counters, the complement of the subtrahend. As the main drive shaft approaches the end of its return stroke, the minuend counters disengage from the racks and engage with the carrying members 610, or 610ª. Such complement added to the minuend, exceeds the capacity of the machine, and the surplus amount cancels out of the machine through the action of the tripped carrying members, leaving the result on the minuend counters.

In communicating the complements of the separate totals obtained on the active set of counters, to the storage set of counters, in grand totaling or recapitulation, the same process is followed, the subtraction lever being rocked toward the active set of counters, and the latter cleared after the communicating operation, in readiness to accumulate amounts to form another separate total. The complements of such separate totals accumulate on the storage set of counters until the grand total is to be obtained, whereupon, the subtraction lever is rocked toward the storage set of counters and the machine operated, to communicate to the active set of counters (formerly used to accumulate the separate totals) the complement of the accumulated complements of the separate totals. This communicated amount becomes, in transit, the grand total of the separate totals accumulated on the active set of counters. The grand total, which now appears on the active set of counters may be printed, and both the active and storage sets of counters cleared in preparation for new work.

Attention is particularly directed to the respective sets of counters (Figs. 3, 10, and 24-27) which not only show the principal numerals in large figures, but also the complements thereof in small figures associated with the large figures.

It is old in the prior art to arrange two sets of figures side by side on the respective counters, but so far as we are aware, each set of figures represents the codigits of the other parallel set.

By this arrangement, we enable the machine when communicating the complement of an amount on one set of counters, to another, to automatically prove the accuracy of the communication, except when the units figure of the subtrahend is a cipher.

Referring to Figs. 24, 25 and 26, the first figure is a fragmentary view of the sight plate 415 of the machine, showing the counters of the respective debit and credit sets as they appear to the operator when both sets are cleared. The principal (larger) numerals are all zeros, and the complementary (smaller) numerals are all nines except in the units denomination where complementary zeros appear.

Fig. 25 shows the amount 4896 accumulated on the debit or active counters, and this amount may be assumed to represent the total of a series of accumulations. The credit or storage counters remain clear, as before. The fifth and higher counters of the debit set of counters also remain as before, but it will be noted that the principal numerals 4896 registered on the first four counters have associated therewith, the complementary numerals 5104, which amount is the pure complement of the principal amount registered, and with the complementary "9s" of the fifth and higher counters, represent the capacity complement of the machine.

The complementary numerals 999,999,951.04 on the debit counters indicate the amount which will be communicated to the credit counters.

Fig. 26 shows the counters after such communication has been made, in the manner hereinbefore described. The debit counters remain unchanged, but the principal numerals of the credit counters register 999,999,951.04, which is the exact amount communicated from the debit counters, the complementary numerals of the credit counters registering 4896, which is the total registered by the principal numerals of the debit counters.

The operator at a glance, may thus see for himself that the communication has been properly performed by the machine, as at this time, the principal numerals of the debit counters still register the total whose complement was communicated to the credit or storage set of counters, and the complementary set of numerals on the debit or active set of counters register the actual amount communicated, which should correspond with the amount shown by the principal numerals of the credit or storage set of counters, the complementary numerals of which set indicate the total registered by the principal figures of the debit set of counters. The two sets of principal and complementary numerals may be readily compared to prove the accuracy of the machine.

The active or debit set of counters are now cleared in readiness to accumulate another separate total.

In making subtractions, we will assume that the minuend 4896 has been registered on the debit set of counters, as in Fig. 25, and that a subtrahend of 3928 has been accumulated on the credit set of counters, which would then appear as follows:

$0^9$ $0^9$ $0^9$ $0^9$ $0^9$ $0^9$ $0^9$ $3^6$ $9^0$ $2^7$ $8^2$ the exponent numerals representing the complementary figures.

It will be seen that the complementary figures 6072 associated with the digits of the subtrahend amount, represent the pure complement of such amount, and with the "9s" of the fifth and higher counters, represent the capacity complement of the machine.

The subtraction lever is now shifted toward the subtrahend or credit counters to hold them inactive and release the debit counters for operation, after which the machine is operated to communicate the complement (6072) of the subtrahend 3928 together with the excess "9s" to the capacity of the machine, onto the minuend (debit) counters.

At the conclusion of this operation, the counters appear as follows:

Credit—
$0^9$ $0^9$ $0^9$ $0^9$ $0^9$ $0^9$ $0^9$ $3^6$ $9^0$ $2^7$ $8^2$

Debit—
$0^9$ $0^9$ $0^9$ $0^9$ $0^9$ $0^9$ $0^9$ $0^9$ $9^0$ $6^8$ $8^2$ the debit counters registering in principal numerals, the correct result (968) of such subtraction, and the credit counters remaining as before, showing the original subtrahend in principal numerals with the communicated amount in complementary numerals.

To enable the operator to readily distinguish between debit and credit amounts, we prefer to use black debit counters and red credit counters, the ribbon shift being correspondingly arranged to print amounts and signs affecting the registrations on the respective counters, in inks of contrasting colors.

Similarly, the communication sign is printed in the color of ink appropriated to that counter to which the complementary amount is communicated.

The feature of printing all signs and amounts which relate to operations of the several sets of counters in distinguishing colors appropriated to the respective counters, is important, as it enables one at any time to readily determine, from an examination of the printed record alone, apart from the machine, exactly what operations were performed to obtain a given result.

An inspection of Fig. 32 of the drawings will explain this idea as applied to a two-counter machine, it being remembered that the color "blue" is appropriated to the front counters, and the color "red" to the rear counters.

Referring to such figure, the imprint of the two "C"s in contrasting colors indicates that the operator first cleared the respective counters, or in case they were already cleared, performed a clearing operation to afford proof thereof on the paper slip. It will also be noted that the signs "C" print over one another to economize the paper, and that they also appear to the right of the first amount printed, which gives the effect embodied in the Wales clear signal set forth in U. S. patent to Wales 940,758, Nov. 23, 1909, although in the present instance, the clear signals are printed prior to the first amount.

The items forming the first example, printed in blue, show that the operator registered such amounts on the debit or front counters, after the same had been cleared.

If the amounts had been printed in red, it would show that they had been accumulated on the rear or credit counters.

The color in which the imprints are made thus immediately enables one to determine whether they were debits or credits.

The amount printed in blue below and to the right of the first list, and followed by the sign "T," indicates that the operator took a total of the first list of items (without clearing the machine, as a total operation does not leave the counters at zero).

Consequently, at the end of this operation, the counters of both sets registered the same amounts as they did prior to the totaling operation.

The operator, of course, shifted the paper carriage to the next column to print the total.

The communicating sign $\oplus$ printed in red beneath the first total, indicates that the operator, while the carriage was in such shifted position, communicated the complement of the total printed in blue, to the rear or credit counters, thereby altering the registration thereon. The front counters now register the debit total of $0^9$ $0^9$ $0^9$ $0^9$ $0^9$ $1^8$, $5^4$ $4^5$ $2^7.4^5$ $8^2$, and the rear counters register the complement thereof, or $9^0$ $9^0$ $9^0$, $9^0$ $9^0$ $8^1$, $4^5$ $5^4$ $7^2$ $.5^4$ $2^8$, there being as many nines as there are counters in excess of the first six counters at the right.

Obviously, the operator could have returned the carriage to the first column before making the communication, or he could have printed the lists of items, totals and signs, all in a single column.

The "C" printed in blue in the first or left hand column beneath the first list of items, indicates that after making the communication to the red or credit counters, the operator returned the carriage to the first column, and performed a clearing operation on the debit counters.

The list printed in blue, adjacent the blue "C," shows that the operator next accumulated another total in the debit counters, which, as shown by the amount in blue in the second or right hand column, was printed by a totaling operation in the same column with, and in the same manner as, the former total. Then, as is evidenced by the communication sign printed in blue beneath the second total, the complement of the first total was communicated back from the red counters to the forward or debit counters, which now register an amount equal to both totals.

The final amount in blue with the blue "T" indicates that the operator has printed the amount registered on the front or debit counters by the previous communicating operation, which amount is the total of the foregoing lists of items, or of the two previously printed totals.

In the particular machine herein set forth, it will be noted that the subtraction lever 412, by reason of its pin and slot connection with the counter-selecting lever 418ᵖ, controls such lever, and consequently, the various functions effected by the operation of such lever, only when the counter-selecting lever lies in the opposite position to that in which the subtraction or communication lever is shifted, or in its intermediate position.

Thus, if the counter-selecting lever, by the last operation previous to making a communication, is adjusted to its forward position, to free the rear or credit set of counters for action, and the subtraction lever is pulled forwardly, when it is desired to communicate the complement of the amount on the forward set of counters to the rear counters, no operation of the counter-selecting lever by the subtraction lever, will take place.

On the other hand, if the counter-selecting lever occupies its rearmost position, to thereby free the forward or debit set of counters for operation, at the time when the subtraction lever is pulled forwardly, then the latter, during its forward stroke, will operate to shift the counter-selecting lever forwardly to free the rear set of counters for operation and to render the front set of counters inactive, such adjustment of the counter-selecting lever by the subtraction lever, also operating to adjust the ribbon shift mechanism so that the communication or subtraction sign will be printed in the color corresponding to that appropriated to the particular set of counters rendered active at that time.

Attention is also called to the fact that the hammer latch 511ᵉ which normally restrains the sign printing hammer 510ᶠ during the operation of the machine, is displaceable by two separate and independently operable mechanisms. Of these, one is the manually-operable counter-selecting lever 418ᵖ (Fig. 11) and the other is the special trip bar 513ᵃ (Fig. 19) controlled by the total key 327ᵇ and the clearing key 327. The subtraction lever 412, when shifted to any of its effective positions, operates the special trip bar 513ᵃ to trip the latch 511ᵉ.

The foregoing illustrates one embodiment of our invention, it being understood that changes may be made in the form, arrangement and construction of the various novel features; that their mode or time of operation may be varied, and that features may be omitted without departing from the spirit and scope of our invention.

What we claim as new, is:—

1. In a calculating machine, the combination with several sets of counters; and drive members engaged and disengaged by the counters; of a plurality of shiftable means to hold the counters disengaged from their drive members; locks controlled by one of said shiftable means to connect the counters with the other of said shiftable means; and latching means operable in connection with said last-named shiftable means to hold the counters in mesh with their drive members.

2. In a calculating machine, the combination with several sets of counters; and drive members engaged and disengaged by the counters; of a shiftable support to normally retain the counters disengaged from their drive members; a counter-selecting means to control the engagement and disengagement of the sets of counters with their drive members; locks controlled by the counter-selecting means, to connect the selected set of counters and the shiftable support; and latching means operable upon the support, to hold the counters in mesh with their drive members.

3. In a calculating machine, the combination with several sets of counters; and drive members engaged and disengaged by the counters; of counter-selecting means to free any set of counters for engagement with the drive members, including a shiftable support normally retaining the counters disengaged from their drive members; locks controlled by the counter-selecting means, to secure the selected set of counters to the support; and latching means operable on the support to lock the counters against rebound when engaged with their drive members.

4. In a calculating machine, the combination with a set of counters; and drive members therefor; of shiftable means to control the engagement and disengagement of the counters and drive members; means to lock the set of counters to the shiftable means; means to hold the counters in engagement with the drive members upon the operation of the shiftable means; and means adapted to retain the counters disengaged from their drive members, and to control the means which locks the counters to the shiftable means.

5. In a calculating machine, the combination with a set of counters; and drive members therefor; of shiftable means to control the engagement and disengagement of the counters and their drive members; means to releasably connect the counters and the shiftable means; and means to control the releasable connecting means.

6. In a calculating machine, the combination with a set of counters; and drive members therefor; of shiftable means to control the engagement and disengagement of the counters and their drive members; means to releasably connect the counters and the shiftable means; and means adapted to retain the counters disengaged from the drive members, and to control the releasable connecting means between the counters and the shiftable means.

7. In a calculating machine, the combination with a set of denominational counters; and an indexing mechanism; of a set of drive members for the counters; positioning bars connected with the drive members and coöperating with the indexing mechanism to variously arrest the drive members; means to advance the drive members; a restraining and restoring bar for the drive members; and spring-impelled actuating members pivotally connected to the respective drive members, and operated by the restraining and restoring bar to retire the drive members to normal positions.

8. In a calculating machine, the combination with a series of denominational counters extending across the machine; drive members therefor; counter-lifting and supporting means at opposite ends of the series of counters to engage and disengage the counters and drive members; means to vary the times of engagement and disengagement of the counters and drive members; and means to arrest the counters at zero, when rotated in one direction; of normally idle means located intermediate the ends of the series of counters to retain the counters in mesh with their drive members; means to shift the mesh-retaining means to effective position; and means to retire the mesh retaining means to and hold it in idle position just prior to the disengagement of the counters and their drive members.

9. In a calculating machine, the combination with a series of counters; drive members therefor; and means to engage and disengage the counters relatively to their drive members; of an element traveling with the counters toward and from their drive members; a retaining member to coact with said last named element when the counters are engaged with their drive members to prevent accidental disengagement thereof; a shoulder on the retaining member; means to shift the retaining member to effective position; a restoring bail; a crank connected therewith; an actuating arm having a cam slot, to return the crank and restoring bail to, and lock them in effective positions; and means to rock the arm to release the crank and bail and enable the retaining member to assume its operative position, and to return the arm to its normal active position.

10. In a calculating machine, the combination with a main drive shaft; a series of counters; drive members therefor; means to engage and disengage the counters relatively to their drive members; and means to vary the time of engagement and disengagement of the counters and drive members; of an element traveling with the counters toward and from their drive members; a retaining device to coact with the element to hold the counters in mesh with their drive members against accidental disengagement; a spring to shift the retaining member into the return path of the element, when the counters engage their drive members; a restoring bail to retract the retaining member to idle position just prior to the time of disengagement of the counters from their drive members; an actuating arm to control the restoring bail; and a plurality of means to operate the actuating arm, one or another of which becomes effective depending upon the time of disengagement of the counters and drive members, in the cycle of operation of the main drive shaft.

11. In a calculating machine, the combination with a set of counters; a set of drive members therefor; means to engage and disengage the counters relatively to their drive members; and means to vary the time of engagement and disengagement of the counters relatively to the drive members, in the cycle of operation of the machine; of a retaining member automatically effective to hold the counters in mesh with their drive members against accidental disengagement; a restoring means to return the retaining member to, and maintain it in idle position, including a crank; an actuating arm having a cam slot to coöperate with the crank to hold the restoring means effective; and separate means operable upon the crank at different times in the cycle of operation of the machine to effect the retirement of the retaining member to idle position.

12. In a calculating machine, the combination with a set of counters; drive members therefor; and means to engage and disengage the counters relatively to their drive members; of a retaining member automatically effective to hold the counters in mesh with their drive members against accidental disengagement; a restoring means to return the retaining member to, and maintain it in idle position, including a crank; an actuating arm having a cam slot to coact with the crank to maintain the retaining member idle; and means to shift the arm to enable the retaining member to assume its effective position.

13. In a calculating machine, the combination with a plurality of series of denominational counters; drive members therefor; means to engage and disengage the counters relatively to their drive members; and selective means to determine which set of counters shall operate; of retaining members for the respective sets of counters and automatically effective to hold the counters engaged with their drive members; combined restraining and locking means associated with the respective sets of counters, to coact with retaining members, to prevent the operation of the retaining members of the inactive sets of counters, the retaining member of the active set of counters adapted to enter the path of return of its combined restraining and locking means; and restoring means to retire the retaining means prior to the time of disengagement of the counters and their drive members.

14. In a calculating machine, the combination with a series of counters; drive members therefor with which the counters engage and disengage; an axle on which the counters are individually rotatable; and means connected with the opposite ends of the axle to effect engagement and disengagement of the counters and drive members; of retaining means extending over the counters intermediate the ends of the axle to prevent accidental disengagement of the counters and drive members, said means including supports for the retaining means, located on opposite sides of the counters; means to advance the retaining means to effective positions, and means to restore the retaining means to, and hold it in, idle position.

15. In a calculating machine, the combination with several sets of denominational counters adapted to accumulate amounts; and a counter-selecting means to determine which of said sets of counters, if any, shall become active; of non-add sign printing mechanism controlled by the counter-selecting lever and rendered inoperative by the counter-selecting means when the latter is adjusted to render any set of counters active.

16. In a calculating machine, the combination with several sets of denominational counters adapted to separately accumulate items; and a counter-selecting means to determine which, if any, of said sets shall become active; of non-add sign printing mechanism including a non-add sign normally located at the printing line; a hammer; a latch to maintain the hammer cocked; and means controlled by the counter-selecting lever to trip the latch when the counter-selecting lever is adjusted to retain the sets of counters inactive.

17. In a calculating machine, the combination with several sets of denominational counters adapted to separately accumulate items; and a counter-selecting means to determine which, if any, of said sets shall become active; said counter-selecting means adapted for adjustment to retain one or another, or all of said sets of counters inactive; of non-add sign printing means rendered ineffective by the counter-selecting lever when the latter is adjusted to permit any of said sets of counters to become active.

18. In a calculating machine, the combination with a main drive shaft; several sets of counters; and mechanism to print the amounts registered on the counters; of a shiftable ribbon mechanism, including ribbon supports; lifter arms operable from the main drive shaft; and adjustable means connected to the ribbon supports; a counter-selecting device to determine which of the sets of counters shall become active; and means controlled by the counter-selecting device to shift the adjustable means into and out of effective position relatively to the lifting arms, to print amounts registered on the respective sets of counters, in contrasting colors.

19. In a calculating machine, the combination with a main drive shaft; several accumulating mechanisms; and printing mechanism, including typecarriers adapted to position the types at the printing line; of a shiftable ribbon mechanism, including ribbon supports; adjustable means connected thereto; lifting arms rocked from the main shaft; a counter-selecting device to determine which of the accumulating mechanisms shall become active; means controlled by the counter-selecting device to shift the adjustable means into and out of effective relation to the lifting arms; and means to restore the ribbon mechanism to home position prior to the restoration of the typecarriers.

20. In a calculating machine, the combination with several sets of counters; and drive members therefor; means to arrest the drive members in position to communicate the complement of an amount registered on any set of counters, to another set, including a single controlling member shiftable in opposite directions from a normally idle position.

21. In a calculating machine, the combination with several sets of counters; drive members therefor; and means to select the set of counters to be driven thereby; of means to determine the difference between amounts registered on the respective sets of counters, including a series of graduated shoulders for each set of counters, the graduations of which correspond to the complements of the amounts registered by the respective counters; a series of feelers for each set of counters, the feelers adapted to coact with the graduated shoulders of the respective sets of counters; a single series of stop arms common to and controlled by the several sets of feelers, to arrest the drive members in position to accumulate on one set of counters, an amount complementary to that registered on another set of counters; and a single means common to the respective sets of feelers, to actuate one or another set at will.

22. In a calculating machine, the combination with several sets of counters; of selective heads to determine which of the sets of counters shall be active and which shall be inactive; mechanism to communicate the complement of an amount registered on one set of counters to another set of counters; and a plurality of means to shift the selective heads, one of which means also controls the communicating mechanism.

23. In a calculating machine, the combination with several sets of counters; and drive members therefor; of means to communicate the complement of an amount registered on any set of counters to another set, including a series of graduated shoulders for each set of counters; a series of feelers for each set of counters, to coact with the graduated shoulders of the respective sets of counters; a single series of stop arms common to and controlled by the respective sets of feelers, the graduated shoulders being so arranged as to control the positions of the feelers and consequently the stop arms to cause the latter to arrest the drive members in position to accumulate on one set of counters the complement of the amount registered on another set of counters; and a single means common to the respective sets of feelers, and operable in one direction or the other, to actuate one or another set of feelers.

24. In a calculating machine, the combination with several sets of counters; and drive members therefor; of a counter-selecting means shiftable in opposite directions from a neutral position, to determine which set of counters shall accumulate amounts; and means, including a communication lever shiftable in opposite directions from a normal intermediate position, to communicate the complement of an amount registered on one set of counters, to another set of counters; the communicating lever having a longer throw than the counter-selecting means and adapted to control the counter-selecting means.

25. In a calculating machine, the combination with several sets of counters; and drive members therefor; of a counter-selecting means shiftable in opposite directions from a neutral position, to determine which set of counters shall accumulate amounts; and means, including a communication lever shiftable in opposite directions from a normal intermediate position, to communicate the complement of an amount registered on one set of counters, to another set of counters; the communicating lever adapted to control the counter-selecting means.

26. In a calculating machine, the combination with several sets of denominational counters; drive members therefor; and means to select the set of counters to be driven thereby; of means to determine the difference between amounts registered on the respective sets of counters, including a series of graduated shoulders for each set of counters; the graduations of which correspond to the complements of the amounts registered by the respective counters; a series of normally idle denominational feelers for each series of shoulders; a single series of denominational stop arms common to the respective sets of feelers, to arrest the drive members in position to accumulate on one set of counters, an amount complementary to that registered on another set of counters; links to connect the respective sets of feelers with the single set of stop arms, the units stop arms that are raised by the links connected to the units feelers, adapted to be operated one step later than the corresponding arms connected through the links to the other denominational feelers.

27. In a calculating machine, the combination with several sets of counters; drive members therefor; and means to select the set of counters to be driven thereby; of means to determine the difference between amounts registered on the respective sets of counters, including a series of graduated shoulders for one set of counters, the graduations of which correspond to the complements of the amounts registered by the counters; a series of feelers for such set of counters; the feelers adapted to coact with the graduated shoulders of the counters; a set of arresting members to check the drive members in position to accumulate on one set of counters an amount complementary to that registered on another set of counters; means to connect the series of feelers with the set of arresting members; the means which connects the units feeler with the units arresting member so arranged as to permit the units arresting member to lag behind the remaining arresting members.

28. In a calculating machine, the combination with several sets of counters; and drive members therefor; of means to communicate to one set of counters, the complement of a registration appearing on another set of counters, including arresting members to check the drive members; a set of members having graduated shoulders; adjusting members to coact therewith; connections between the adjusting members and the arresting members; the units adjusting member adapted to operate the units arresting member one step later than the operation of the arresting members of remaining denominations; and means to operate the adjusting members.

29. In a calculating machine, the combination with several sets of counters; and drive members therefor; of means to communicate to one set of counters, the complement of a registration appearing on another set of counters, including arresting members to check the drive members; a set of members having graduated shoulders; adjusting members to coact therewith; pin and slot connections between the adjusting members and the arresting members; the units connection having a longer travel before contacting the pin in the units arresting member, than the connections in the remaining denominations; and means to operate the adjusting members.

30. In a calculating machine, the combination with several sets of counters; and drive members therefor; of means to communicate to one set of counters, the complement of a registration appearing on another set of counters, including arresting members to check the drive members; a set of members having graduated shoulders; pivoted adjusting fingers to coact with the shoulders, and connected to the arresting members; selective means to control the respective sets of adjusting fingers, including rockers, tension rods actuated by the rockers; and flexible connections between the rods and adjusting fingers.

31. In a calculating machine, the combination with several sets of counters; and drive members therefor; of means to communicate to one set of counters, the complement of a registration appearing on another set of counters, including arresting members to check the drive members; a set of members having graduated shoulders; pivoted adjusting fingers to coact with the shoulders, and connected to the arresting members; a single selective means to control the respective sets of adjusting fingers, including a shaft rotatable in opposite directions; rockers projecting from opposite sides of the shaft; opposed brackets journaled on the shaft; tension rods mounted in the brackets and actuated by the rockers; and yielding connections between the respective tension rods and the corresponding sets of adjusting fingers.

32. In a calculating machine, the combination with several sets of denominational counters; and drive members therefor; of means to communicate the complement of the amount registered on one set of counters, to another set of counters, including denominational arresting members to check the drive members; graduated shoulders associated with at least one set of counters, the shoulders being complementary to the amount registered by the counters; denominational adjusting members to coact with the shoulders; loose connections between the adjusting members and the arresting members, a greater idle travel being permitted the units connection than the remaining connections; and means to actuate the adjusting members.

33. In a calculating machine, the combination with several sets of counters; and drive members therefor; of means to communicate the complement of the amount registered on one set of counters, to another set of counters, including arresting members to check the drive members; graduated shoulders associated with at least one set of counters, the shoulders being complementary to the amount registered by the counters; adjusting members to coact with the shoulders; connections between the adjusting members and the arresting members; means to actuate the adjusting members; including a lever, a shaft on which the lever is fixed; rockers projecting from the shaft; brackets journaled on the shaft; springs to hold the brackets in normal position; tension rods mounted in the brackets and contacted by the rockers; and elastic connections between the tension rods and adjusting members.

34. In a calculating machine, the combination with several sets of counters; drive members therefor; shiftable ribbon mechanism; and means to shift the same; of means to arrest the drive members in position to communicate the complement of an amount registered on any set of counters, to another set of counters; including a single controlling member shiftable in opposite directions from a normally idle position; and means also actuated by the controlling member, when shifted in one direction to set the ribbon shifting means for effective operation.

35. In a calculating machine, the combination with several sets of counters; drive members therefor; shiftable ribbon mechanism; and means to shift the same; of means to arrest the drive members in position to communicate the complement of an amount registered on any set of counters, to another set of counters; including a single controlling member shiftable in opposite directions from a normally idle position; and means also actuated from the controlling member, to select the set of counters, to which the complement of the amount registered in the other set of counters is to be communicated.

36. In a calculating machine, the combination with several sets of counters; shiftable ribbon mechanism; and means to shift the same; of a counter-selecting means adapted to enable one set of counters to become active and to disable another set; means, controlled by the counter-selecting means to adjust the ribbon-shifting means to print amounts registered on one set of counters in a contrasting color to those registered on another set of counters; and a single means to control the communication of the complement of an amount registered on one set of counters, to another set of counters, and to actuate the counter-selecting means to determine the set of counters from which such communication shall be made, and to determine the position of the ribbon-adjusting mechanism.

37. In a calculating machine, the combination with a main drive shaft; several sets of counters; a shiftable ribbon mechanism, including adjustable members; and means actuated by the main drive shaft, to coact with the adjustable members and shift the ribbon mechanism; of a counter-selecting means adapted to enable one set of counters to become active, and to disable another set; means controlled by the counter-selecting means to position the adjustable members relatively to the ribbon shifting means to shift the ribbon mechanism to such position relatively to the printing line, that amounts registered on one set of counters will be printed in a contrasting color to those amounts registered on another set of counters and printed; and a single means to control the communication of the complement of an amount registered on one set of counters, to another set of counters, and to actuate the counter-selecting means to determine the set of counters from which such communication shall be made, and to determine the position of the adjustable members.

38. In a calculating machine, the combination with several sets of counters; and counter-selecting means adapted to retain one set of counters idle, and release another set of counters for operation; of a single means to communicate the complement of an amount from any set of counters to another set of counters, and to control the counter-selecting means.

39. In a calculating machine, the combination with several sets of counters; shiftable ribbon mechanism; means to shift the same to enable amounts registered on one set of counters to be printed in a color contrasting to that in which amounts registered on another set of counters, are printed; and counter-selecting means adapted to retain one set of counters idle and release another set for operation; of means to communicate the complement of an amount registered on one set of counters, to another set of counters, such last named means adapted to control the counter-selecting and the ribbon-shifting means.

40. In a calculating machine, the combination with several sets of counters; of a single means to effect the subtraction of an amount on one set of counters from an amount on another set of counters; and to selectively determine which set of counters shall constitute the subtrahend accumulators, and which shall constitute the minuend accumulators.

41. In a calculating machine, the combination with several sets of counters adapted to register amounts; a ribbon mechanism; means to shift the same to print amounts registered on one set of counters in a color contrasting with that in which amounts registered on another set of counters are printed; and counter-selecting means to determine which set of counters shall accumulate amounts, including counter-disabling means; and means controlled by the counter-selecting means, to determine the effectiveness of the ribbon-shifting mechanism; of means to communicate the complement of an amount registered on one set of counters, to another set of counters; and having a slot and pin connection with the counter-selecting means to control the latter.

42. In a calculating machine, the combination with several sets of counters adapted to register amounts; a ribbon mechanism and means to shift the same automatically to print amounts registered on one set of counters, in a color contracting with that in which amounts registered on another set of counters are printed; of means to communicate the complement of an amount registered on one set of counters, to another set of counters; and mechanism under control of said means, to select the set of counters to which such complement shall be communicated, and to control the effectiveness of the ribbon-shifting mechanism.

43. The combination with a plurality of sets of counters; an adjustable counter-selecting means adapted to enable one or another of said sets of counters to become effective; and a polychrome means controlled by the counter-selecting means to enable amounts or signs affecting the respective sets of counters to be printed in colors appropriated to the individual sets of counters; of a subtraction or communication means operable to enable the communication to one set of counters, of the complement of an amount registered on another set of counters; said subtraction or communication means adapted to control the counter-selecting means when the latter occupies a position to render inactive that set of counters to which is to be communicated the complement of the amount registered on another set of counters.

44. In a calculating machine, the combination with several sets of counters; and printing mechanism, including printing hammers, to print amounts registered on the counters; of means to communicate the complement of an amount registered on any set of counters, to another set of counters, including a device shiftable in opposite directions from a normal idle position; means controlled by said communicating means to disable the regular printing hammers; sign printing means, including a special sign printing hammer independent of the regular printing hammers; and elastic means tensioned by the communicating means, when shifted in either direction from normal, to position a special sign at the printing line.

45. In a calculating machine, the combination with several sets of counters; and printing mechanism, including printing hammers, to print amounts registered on the counters; of means to communicate the complement of an amount registered on any set of counters, to another set of counters, including a device shiftable in opposite directions from a normal intermediate position; and sign printing mechanism, including a crank, controlled by the shiftable device; a rocker pivoted intermediate its ends; slotted equalizing links to connect the opposite arms of the rocker with the crank in such manner that the travel of the crank in either direction turns the rocker in but one direction; a type carrier; means to connect the type carrier and rocker to position the type; a sign printing hammer; and trip means therefor operated by the rocker.

46. In a calculating machine, the combination with a plurality of sets of counters; and drive members engaged and disengaged by the counters; of means to control the engagement of any set of counters with their drive members, and to effect the communication of the complement of an amount registered on one set of counters, to another set of counters, said means shiftable in opposite directions from a normal neutral position; a crank controlled thereby; a rocker pivoted intermediate its ends; a sign typecarrier connected with the rocker; and slotted equalizing links to connect opposite arms of the rocker with the crank, to enable the control means to position the same sign at the printing line irrespective of the direction in which said control means is shifted.

47. In a calculating machine, the combination with a plurality of sets of counters; and drive members engaged and disengaged by the counters; of means to control the engagement of any set of counters with their drive members, and to effect the communication of the complement of an amount registered on one set of counters, to another set of counters, said means shiftable in opposite directions from a normal neutral position; a crank controlled thereby; a rocker pivoted intermediate its ends; a sign typecarrier; an elastic connection between the typecarrier and the rocker; and slotted equalizing links to connect opposite arms of the rocker with the crank, to enable the control means to position the same sign at the printing line irrespective of the direction in which said control means is shifted.

48. In a calculating machine, the combination with a plurality of sets of counters; and drive members engaged and disengaged by the counters; of means to control which set of counters shall engage their drive members, said control means shiftable in opposite directions from a normal neutral position; a typecarrier having a sign type mounted therein; and connections between the control means and the typecarrier to position the same sign at the printing line irrespective of the direction in which the control means is shifted from its neutral position.

49. In a calculating machine, the combination with several sets of counters; regular printing mechanism, including printing hammers, to print amounts registered on the sets of counters; means to communicate the complement of an amount registered on one set of counters, to another set of counters; and non-print means controlled by the communicating means to disable the regular printing mechanism; of sign printing means, including a sign typecarrier, and a printing hammer independent of the regular printing hammers; elastic means tensioned by the communicating means when operated, to shift the sign typecarrier to bring a special sign to the printing line; and an abutment to arrest the special sign typecarrier when it has positioned the special sign at the printing line.

50. In a calculating machine, the combination with several sets of counters; regular printing mechanism, including printing hammers, to print amounts registered on any of the sets of counters, counter-selecting means to lock one or another or all of the sets of counters against operation; means to communicate the complement of an amount registered on one set of counters, to another set of counters; and non-print means controlled by the communicating means to disable the regular printing mechanism; of sign printing means, including a sign typecarrier, and a special sign printing hammer independent of the regular printing mechanism; means operated by the communicating means to shift the sign typecarrier to position a special sign at the printing line and release the special sign printing hammer for operation; means to arrest the sign typecarrier with the special sign at the printing line; and means controlled by the counter-selecting means and separate from that controlled by the communicating means, to release the sign printing hammer for operation when the counter-selecting means is in one of its adjusted positions.

51. In a calculating machine, the combination with a keyboard; several sets of counters, and means to drive the counters; mechanism to print amounts set up on the keyboard and registered on any of the sets of counters; counter-selecting means to lock one or another or all sets of counters out of operation; means to communicate the complement of an amount registered on one set of counters, to another set of counters; non-print mechanism controlled by the communicating means, to disable the printing mechanism; and clearing and totaling mechanism controlled by separate keys; of sign printing means including a sign typecarrier, a printing hammer and an individual hammer latch, independent of the regular printing mechanism; means operated by the communicating means to shift the sign typecarrier to position a special sign at the printing line and to release the individual hammer latch; separate means controlled by the counterselecting means, and independent of the means controlled by the communicating means, to trip the individual hammer latch when the counter-selecting means is in one of its adjusted positions; and further means separate from the foregoing and controlled by the clearing and total keys to variously position the sign typecarrier to bring their appropriate signs to the printing line.

52. In a calculating machine, the combination with a keyboard; several sets of counters, and means to drive the counters; mechanism to print amounts set up on the keyboard and registered on any of the sets of counters; counter-selecting means to lock one or another or all sets of counters out of operation; means to communicate the complement of an amount registered on one set of counters, to another set of counters; non-print mechanism controlled by the communicating means, to disable the printing mechanism; and clearing and totaling mechanism controlled by separate keys; of sign printing means including a sign typecarrier, a printing hammer and an individual hammer latch, independent of the regular printing mechanism; means operated by the communicating means to shift the sign typecarrier to position a special sign at the printing line and to release the individual hammer latch; separate means controlled by the counter-selecting means, and independent of the means controlled by the communicating means to trip the individual hammer latch when the counter-selecting means is in one of its adjusted positions; and further means separate from the foregoing and controlled by the clearing and total keys to variously position the sign typecarrier to bring their appropriate signs to the printing line; a connection to enable the communicating means to control the counter-selecting means; and locking mechanism operated by the communicating means to prevent actuation of the clearing and totaling mechanisms.

53. In a calculating machine, the combination with a printing section, including hammers; hammer drive mechanism actuated at each operation of the machine; and a releasable pawl to retain the hammers inactive; of means to render the hammers ineffective notwithstanding the release of the pawl, including a restraining member actuated by the drive mechanism prior to the release of the pawl.

54. In a calculating machine, the combination with a set of counters; printing mechanism, including hammers, hammer-driving means, and hammer-restraining and resetting means; of a member to lock the hammers against operation, notwithstanding the release of the hammer-restraining and resetting means; a flexible drive connection with the hammer-locking means to shift the latter to effective position; disabling means for the locking member including an abutment; and optionally operable means to shift the abutment to idle position.

55. In a calculating machine, the combination with counters, and printing mechanism, the latter including printing hammers; hammer-driving means; and a universal hammer-restraining member releasable by the hammer-driving means; of means also operated by the hammer-driving means to render the hammers ineffective, notwithstanding the release of the restraining member; a disabling device to prevent the operation of the last-named means; and means to displace the disabling device.

56. In a calculating machine, the combination with counters, and printing mechanism, the latter including impression means, and drive mechanism for the impression means; of means flexibly connected with the drive means, to render the impression means ineffective; a disabling device to prevent the operation of the last-named means; and means to displace the disabling device.

57. In a calculating machine, the combination with a set of counters; and mechanism to print amounts registered on the counters, such printing mechanism including hammers, and hammer drive mechanism; of a locking member to hold the hammers against operation; a flexible drive connection between the hammer drive mechanism and the locking member; an arresting finger connected with the locking member; an abutment normally in the path of the finger, to hold the locking member ineffective; and means to shift the abutment out of the path of the arresting finger.

58. In a calculating machine, the combination with a printing section, including hammers; and hammer drive mechanism therefor, actuated at each operation of the machine; of means to hold the printing mechanism inactive, including a locking member actuated from the drive mechanism; an elastic connection between the drive mechanism and locking member; an arresting finger connected with the locking member; an abutment normally in the path of the finger, to hold the locking member ineffective; and means to shift the abutment out of the path of the finger.

59. In a calculating machine, the combination with a series of counters; mechanism to print amounts registered on the counters; and drive mechanism; of means to disable the printing mechanism, including a locking member; an extensible connection between the drive mechanism and locking member; an arresting finger connected with the locking member; a sign printing typecarrier; an abutment connected thereto and normally in the path of the finger, to retain the locking member idle; a hammer independent of the locking member to print the sign; and means to shift the typecarrier to position to print another sign, and to displace the abutment to free the locking member for operation.

60. In a calculating machine, the combination with regular printing mechanism, and drive mechanism therefor; of a special typecarrier having sign printing types; a locking member for the regular printing mechanism; means to operate the locking member from the drive mechanism, including an elastic connection; an abutment connected with the special typecarrier and normally in the path of the locking member to prevent its effective operation; special keys to control the typecarrier and abutment, to render the locking plate operative or inoperative; and means independent of the locking member, to print the signs.

61. In a calculating machine, the combination with regular printing mechanism; and drive mechanism therefor; of a special typecarrier having sign printing types; a locking member for the regular printing mechanism; means to operate the locking member from the drive mechanism; an abutment connected with the special typecarrier and normally in the path of the locking member to prevent its effective operation; special keys to control the typecarrier and abutment, to render the locking member operative or inoperative; and means independent of the locking member, to print the signs.

62. In a calculating machine, the combination with regular printing mechanism, including printing hammers; and drive mechanism therefor; of means to disable the regular printing mechanism, including a locking member for the regular printing hammers; an elastic connection between the drive mechanism and locking member; an arresting finger on the locking member; a sign printing typecarrier; a special hammer therefor independent of the locking member; a latch to hold the special printing hammer cocked; a trip member for the latch, having an abutment normally in the path of the arresting finger to hold the locking member idle; and means to operate the trip member.

63. In a calculating machine, the combination with regular printing mechanism, including printing hammers; and drive mechanism therefor; of means to disable the regular printing mechanism, including a locking member for the regular printing hammers; an elastic connection between the drive mechanism and locking member; an arresting finger for the locking member; a typecarrier having a plurality of signs; a special printing mechanism therefor independent of the locking member; means to position the typecarrier to locate one or another of the signs at the printing line; and a plurality of spaced abutments adjustable with the typecarrier, one of which abutments normally lies in the path of the arresting finger to hold the locking member idle, and another of which is adjustable into the path of the arresting finger when it is desired to print amounts designated by one of the signs.

64. In a calculating machine, the combination with a set of counters; means to print amounts registered on the counters; and a drive mechanism; of a locking member for the printing mechanism, operated by the drive mechanism; an abutment normally in the path of the locking member to hold the latter ineffective; and clearing mechanism for the counters, including a clearing key to displace the abutment.

65. In a calculating machine, the combination with a set of counters; means to print amounts registered on the counters; and a drive mechanism; of a locking member for the printing mechanism, operated by the drive mechanism; a special typecarrier equipped with sign types; an abutment connected with the typecarrier, and normally in the path of the locking member to hold the latter inoperative; and clearing mechanism for the counters, including a clearing key to position the proper sign type at the printing line, and coincidentally displace the abutment.

66. In a calculating machine, the combination with several sets of counters; drive members therefor; and counter-selecting means adjustable to determine which set of counters shall be active; of means to enable the operator to tell when the counter-selecting means has been properly positioned relatively to one or another set of counters, including a yielding arm, having recesses corresponding to the various effective positions of the counter-selecting means; and a feeler stud controlled by the counter-selecting means, and shiftable successively into and out of the recesses.

67. In a calculating machine, the combination with a main drive shaft; means to operate the shaft, and several sets of counters; means to communicate the complement of an amount registered on one of the sets of counters, to another set, including a communicating lever; and locking means to prevent adjustment of the lever during the operation of the main drive shaft, including a keeper having an opening therein provided with laterally extending recesses corresponding to the positions to which the lever may be set; a locking stud controlled by the communicating lever and normally freely shiftable along the opening into alinement with one or another of the recesses; the keeper having an undercut cam slot; a trip member controlled by the drive shaft, and normally seated in one end of the slot to maintain the locking stud in the opening; the trip member adapted to shift the keeper at the beginning of the forward stroke of the main drive shaft, to fit the alined recess over the locking stud to prevent adjustment of the communicating lever; and an extension on the keeper, one edge of the extension forming an angular continuation of one wall of the cam slot, and traversed by the trip rod, to retain the keeper effective.

68. In a calculating machine, the combination with a main drive shaft; means to operate the shaft, and several sets of counters; of means to communicate the complement of an amount registered on one of the sets of counters, to another set, including a communicating lever; and locking means to prevent adjustment of the lever during the operation of the main drive shaft, including a keeper having an opening therein provided with laterally extending recesses corresponding to the positions to which the lever may be set; a locking stud controlled by the communicating lever, and normally freely shiftable along the opening into alinement with one or another of the recesses; the keeper having an undercut cam slot; a trip member controlled by the drive shaft, and normally seated in one end of the slot to maintain the locking stud in the opening; the trip member adapted to shift the keeper at the beginning of the forward stroke of the main drive shaft, to fit the alined recess over the locking stud to prevent adjustment of the communicating lever; the intermediate walls between the recesses being beveled to guide the locking stud into one or another of the recesses to compel the communicating lever to assume one or another of its properly adjusted positions; and an extension on the keeper, one edge of the extension forming an angular continuation of one wall of the cam slot, and traversed by the trip rod, to retain the keeper effective.

69. In a calculating machine, a plurality of sets of counters; drive members therefor; a main drive shaft; and adjustable selective means; of means to lock the adjustable selective means against adjustment, during the operation of the main drive shaft, including a normally-idle keeper, having seats formed therein corresponding to the various positions which the adjustable selective means is capable of assuming; a locking stud positioned by the adjustable selective means, relatively to the seats; the keeper having a cam slot; an extension projecting from the keeper, and having a radial edge which merges into one wall of the cam slot; and a trip member actuated by the main drive shaft, and normally occupying the cam slot, to shift the keeper to and hold it in effective position relatively to the locking stud.

70. In a calculating machine, the combination with a set of counters; means to zeroize the counters, including a key; and an adjustable member to determine whether or not the counters shall become operative; of an interlock between the zeroizing means and the adjustable member, including a locking plate operable by the adjustable member, and having a slot therein with offset recesses; and means controlled by the key and locked or released for operation by the locking plate according to the position of the adjustable member, the key-controlled means, when in operated position, effective to prevent shifting of the adjustable member.

71. In a calculating machine, the combination with a set of counters; and means to zeroize the counters, including a key; of an adjustable member to determine whether or not the counters shall become operative; an interlock between the zeroizing means and the adjustable member, including a locking plate operable by the adjustable member, and having a substantially inverted U-shaped slot therein; a stud entered in the slot and controlled by the key, the stud adapted to be arrested by the connecting portion of the slot when the adjustable member is in one of its positions, to prevent operation of the key, and to prevent shifting the adjustable member, when entered in either arm of the slot by the depression of the key.

72. In a calculating machine, the combination with several sets of counters; adjustable means to effect the subtraction of an amount registered on any set of counters from an amount registered on another set of counters; and means, including a key, to return the counters to zero; of an interlocking device operable by the adjustable means to prevent operation of the key, when the adjustable means is in any of its effective positions; and means operated by the key and effective to lock the adjustable means against shifting.

73. In a calculating machine, the combination with several sets of counters; of a single shiftable selective member to control the sets of counters, and normally occupying a neutral position; means to hold the selective member when adjusted to any of its effective positions, including a locking member connected to shift with the selective member; a latching member to hold the locking member and the selective member when so adjusted; means to release the latching member; and means to restore the locking and selective members to neutral position.

74. In a calculating machine, the combination with several sets of counters; of a shiftable selective member to control the sets of counters; means to restore the shiftable member to, and retain it in idle position; means to hold the selective member when adjusted to any of its effective positions, including a locking member connected to shift with the selective member; a latching member which coacts with the locking member, to hold the selective member where adjusted; a second latching member to coact with the locking member when the selective member is in idle position; means having a forward and a backward throw, to release the second latching member for operation on one stroke, to hold the selective lever in idle position; said means also effective to release the first-named latching member on the return stroke, to free the selective member and its locking member to the action of its restoring means.

75. In a calculating machine, the combination with several sets of counters; of a shiftable selective member in control of the sets of counters; means to restore the selective member to, and hold it yieldingly in, idle position; a locking member connected with the selective member; a latching member having a seat with inclined inner walls and abrupt outer walls, in which seat the locking member rests when the selective member is in idle position; a second latching member having a recess adapted to fit over the locking member when the selective member is in idle position; means tending to draw the two latching members together; and means to hold the second latching member disabled when the machine is at rest.

76. In a calculating machine, the combination with several sets of counters; of a shiftable selective member in control of the sets of counters; means to restore the selective member to, and hold it yieldingly in, idle position; a locking member connected with the selective member; a spring-actuated jaw having a seat, with inclined inner walls and abrupt outer walls, to accommodate the locking member when the selective member is in idle position; the selective member, when adjusted to an effective position, adapted to unseat the locking member and locate it against one or the other of the abrupt walls, to prevent restoration of the selective member to idle position; and means to displace the jaw to free the selective member to the action of its restoring means.

77. In a calculating machine, the combination with several sets of counters; a main drive shaft; and a crank thereon; of a selective member in control of the counters; means to restore the selective member to, and yieldingly retain it in, idle position; a locking stud connected to shift with the selective member; a spring-actuated jaw relatively to which the stud shifts; the jaw provided with a seat having abrupt outer walls, to accommodate the stud when the selective member is in idle position; the selective member, when adjusted to effective position, adapted to unseat the stud and locate it behind one or the other of the abrupt walls, to lock the selective member where adjusted; a cam on the jaw; and a rocking tappet actuated by the main drive shaft crank on its return stroke, to displace the jaw relatively to the stud and free the selective member to the action of its restoring means.

78. In a calculating machine, the combination with several sets of counters; a main drive shaft; and a crank thereon; of a selective member in control of the counters; means to restore the selective member to, and yieldingly retain it in, idle position; a locking stud connected to shift with the selective member; a pair of spring-actuated jaws between which the stud shifts; one of the jaws having a seat with abrupt outer walls, to accommodate the stud when the selective member is in idle position; the selective member when adjusted to effective position, adapted to unseat the stud and locate it behind one or the other of the abrupt walls, which lock the selective member where adjusted; a cam on the jaw; means actuated by the main drive shaft crank to displace the jaw relatively to the stud, and free the selective member to the action of its restoring means; the coacting jaw having a recess adapted to fit over the stud when the selective member is in idle position; and an extension of said coacting jaw normally contacted by the crank to hold said jaw ineffective when the machine is at rest.

79. In a calculating machine, the combination with several sets of counters; a drive shaft; and a selective member in control of the counters; of means to lock the selective member against adjustment during the operation of the main drive shaft, including a spring-actuated latching member having an extension; means on the drive shaft adapted to contact the extension to hold the latching member ineffective when the shaft is in its home position; and a locking device shiftable with the selective member and located in position to be held by the latching member upon its release by the main drive shaft.

80. In a calculating machine, the combination with several sets of counters; of a selective member therefor; means to restore the selective member to, and yieldingly retain it in, its idle position; a locking device connected to shift with the selective member; a spring-actuated latching member having abrupt walls thereon, the selective member when adjusted to effective position, adapted to locate the locking device against one or another of the abrupt walls to hold the selective member where set; means to automatically release the locking device; and additional releasing means, including a special key; a rocker actuated thereby; an arm driven by the rocker; and a cam on the latching member wiped by the arm to release the locking device.

81. In a calculating machine, the combination with several sets of counters; a selective member therefor; a main drive shaft; and a starting key depressible preliminary to the rotation of the main drive shaft; of an interlock between the selective member and the starting key, including a rocking arm actuated by the depression of the starting key; a locking device connected to shift with the selective member; and a lever, one end of which carries walls over which the locking device wipes as the selective member is adjusted from one to another of its positions, to rock the lever; the opposite end of the lever normally lying out of the path of the rocking arm except when the locking device is wiping over any of the walls.

82. In a calculating machine, the combination with several sets of counters; and means to communicate the complement of an amount registered on one of the sets of counters, to another set of counters; of a counter-selecting member to determine which set of counters shall be active; a selective member to control the communicating means, said last named selective member also adapted to control the counter-selecting member; and locking means controlled by the selective member for the communicating means, to hold the counter-selecting member where adjusted by the selective member.

83. In a calculating machine, the combination with several sets of counters; drive members therefor; and a drive shaft; of a counter-selecting means to determine which set of counters shall be active; mechanism to communicate the complement of an amount registered on one set of counters, onto another set of counters; a selective member to control the communicating mechanism; means to restore the communicating mechanism to, and to yieldingly hold it in, idle position; locking means to hold the communicating mechanism where adjusted; the communicating mechanism adapted to control the counter-selecting means; locking means controlled by the communicating mechanism to retain the counter-selecting means where adjusted by the communicating mechanism; and means to disable the locking means for the communicating mechanism, whereby to enable the restoring means to return the communicating means to its idle position and free the counter-selecting member.

84. In a calculating machine, the combination with a drive shaft; several sets of counters; drive members therefor; counter-selecting means to determine which set of counters shall be active; and means to communicate the complement of an amount registered on one set of counters, onto another set of counters; of a member shiftable in opposite directions from a neutral position, to control the communicating mechanism, and a locking means controlled by the shiftable member to hold the counter-selecting means against adjustment during the operation of the drive shaft.

85. In a calculating machine, the combination with a drive shaft; several sets of counters; drive members therefor; counter-selecting means to determine which set of counters shall be active; and means to communicate the complement of an amount registered on one set of counters, onto another set of counters; of a locking means controlled by the communicating means, to hold the counter-selecting means against adjustment during the operation of the drive shaft.

86. In a calculating machine, the combination with a drive shaft; several sets of counters; drive members therefor; counter-selecting means to determine which set of counters shall be active; and means to communicate the complement of an amount registered on one set of counters, onto another set of counters; of a locking means controlled by the communicating means, to hold the counter-selecting means against adjustment during the operation of the drive shaft, including a locking stud on the counter-selecting means; a locking arm having seats to fit over the stud, and located a distance apart corresponding to the positions assumed by the stud when the counter-selecting means is in one or another of its positions to free a set of counters for operation; and a device on the communicating means to control the position of the locking arm relatively to the stud.

87. In a calculating machine, the combination with a drive shaft; several sets of counters; drive members therefor; counter-selecting means to determine which set of counters shall be active; and means to communicate the complement of an amount registered on one set of counters, onto another set of counters; of a locking means controlled by the communicating means, to hold the counter-selecting means against adjustment during the operation of the drive shaft, including a stud carried by the counter-selecting means to shift therewith; a rocking bail having a locking arm extending alongside the path of the locking stud, and equipped with seats corresponding to the positions assumed by the stud when the counter-selecting means is in position to free one or another of the sets of counters for operation, the seats adapted to fit over the stud to lock the counter-selecting means where adjusted; a control stud mounted on the communicating means to shift therewith; and a control arm projecting from the rocking bail and normally resting on the control stud, to maintain the locking arm in idle position, the control arm having recesses entered by the control stud when the communicating means is shifted to effective position, to free the locking arm for operation.

88. In a calculating machine, the combination with a main drive shaft; a full stroke segment thereon; a starting key; several sets of counters; drive members therefor, actuated by the drive shaft; and counter-selecting means to determine which set of counters shall be active; of an interlock between the counter-selecting means and the drive shaft, to prevent operation of the drive shaft when the counter-selecting means is only partially adjusted, and to prevent adjustment of the counter-selecting means during the operation of the main drive shaft, including a controlling stud connected to shift with the counter-selecting means; an actuating arm having a series of cams, over which the control stud is adapted to wipe; a stub shaft to which the actuating arm is fixed; a detent to coöperate with the full stroke segment; means to connect the detent and stub shaft; a locking arm mounted on the stub shaft to arrest the starting key; means tending to render the detent effective; superior means to maintain the detent and locking arm idle while the counter-selecting means is in any of its properly adjusted positions; and a checking means operable by the main drive shaft to enter the path of the actuating arm to lock the counter-selecting means against adjustment during the operation of the main drive shaft.

89. In a calculating machine, the combination with several sets of counters; drive members therefor; a main drive shaft; means to turn therewith; counter-selecting means; and means to communicate the complement of an amount registered on one set of counters, onto another set; of an interlocking means common to both the counter-selecting and the communicating means, to prevent adjustment of either of the latter means during the operation of the main drive shaft, and to prevent rotation of the main drive shaft when either the counter-selecting or the communicating means are in a partially adjusted position.

90. In a calculating machine, the combination with several sets of counters; drive members therefor; a main drive shaft; means to turn therewith; counter-selecting means; and means to communicate the complement of an amount registered on one set of counters, onto another set; of an interlocking means common to both the counter-selecting and the communicating means, to prevent adjustment of either of the latter means during the operation of the main drive shaft, and to prevent rotation of the main drive shaft when either the counter-selecting or the communicating means are in a partially adjusted position; and separate actuating means individual to the counter-selecting and the communicating means, respectively, to render the interlocking means effective during the adjustment of the counter-selecting and communicating means.

91. In a calculating machine, the combination with a set of counters; drive members therefor; a main drive shaft; counter-supporting and disengaging means operated by the main drive shaft; and optionally operable means in control of the counter-supporting and disengaging means, to vary the time of engagement of the counters and their drive members; of mechanism to enforce an extra stroke of the main drive shaft prior to the actuation of the optionally operable means, including a stop to travel with the optionally operable means; an arresting member normally in the path of the stop; means to shift the arresting member to idle position; a check member shiftable into and out of the path of the arresting member, to hold the latter in idle position; and means to operate the check member.

92. In a calculating machine, the combination with a main drive shaft; a set of counters; drive members with which the counters are adapted to engage and disengage; counter-supporting and disengaging means actuated by the main drive shaft; carrying mechanism; and means adapted to control the counter-supporting and disengaging means to vary the time of engagement and disengagement of the counters and drive members, including a set mechanism; of means to enforce an extra stroke of the main drive shaft prior to the operation of the set mechanism, including a shiftable arresting member normally adapted to lock the set mechanism against operation; the arresting member lying in the path of a part of the counter-supporting and disengaging mechanism to be disabled thereby during the operation of the machine; and a normally idle check member tripped by the arresting member when disabled, to retain the arresting member inactive.

93. In a calculating machine, the combination with a main drive shaft; a set of counters; drive members with which the counters are adapted to engage and disengage; counter-supporting and disengaging means actuated by the main drive shaft; carrying mechanism; and means adapted to control the counter-supporting and disengaging means to vary the time of engagement and disengagement of the counters and drive members, including a set mechanism; of means to enforce an extra stroke of the main drive shaft prior to the operation of the set mechanism, including a shiftable arresting member normally adapted to lock the set mechanism against operation; the arresting member lying in the path of a part of the counter-supporting and disengaging mechanism to be disabled thereby during the operation of the machine; a normally idle check member tripped by the arresting member when disabled, to retain the arresting member inactive; and means to return the check member to idle position to enable the arresting member to become effective.

94. In a calculating machine, the combination with a main drive shaft; a set of counters; drive members, with which the counters engage and disengage; counter-supporting and disengaging means operable by the main drive shaft; indexing mechanism for the drive members, including restraining detents; and means to vary the times of engagement and disengagement of the counters and racks, including an optionally operable set mechanism; of means to enforce an extra stroke of the main drive shaft prior to the operation of the set mechanism, including a shiftable arresting member normally in the path of the set mechanism, to prevent its operation; and a check member controlled by the detents, to hold the arresting member in idle position.

95. In a calculating machine, the combination with a main drive shaft; a set of counters; drive members, with which the counters engage and disengage; counter-supporting and disengaging means operable by the main drive shaft; indexing mechanism for the drive members, including restraining detents; and means to vary the times of engagement and disengagement of the counters and racks, including an optionally operable set mechanism; of means to enforce an extra stroke of the main drive shaft prior to the operation of the set mechanism, including a shiftable arresting member normally in the path of the set mechanism, to prevent its operation; and a check member controlled by the detents, to hold the arresting member in idle position, the arresting member being displaced at every operation of the main drive shaft, to permit the check member to shift to effective position, when free to do so.

96. In a calculating machine, the combination with a main drive shaft; a set of counters; drive members, with which the counters engage and disengage; counter-supporting and disengaging means operable by the main drive shaft; indexing mechanism for the drive members, including restraining detents; and means to vary the times of engagement and disengagement of the counters and racks, including an optionally operable set mechanism; of means to enforce an extra stroke of the main drive shaft prior to the operation of the set mechanism, including a shiftable arresting member normally in the path of the set mechanism, to prevent its operation; a check member controlled by the detents, to hold the arresting member in idle position; and means to withdraw the arresting member to idle position at every operation of the main drive shaft, to afford an opportunity for the check member to operate.

97. In a calculating machine, the combination with a main drive shaft; a set of counters; drive members with which the counters engage and disengage; and means to vary the times of engagement and disengagement of the counters and drive members, including a set lever; of means to enforce an extra stroke of the main drive shaft prior to the operation of the set lever, including an arresting member to normally lock the set lever against operation; means actuated at every operation of the main drive shaft, to withdraw the arresting member to idle position; a check member adapted to enter the path of the arresting member, to hold the latter idle; and means resettable at each operation of the main drive shaft, and timed to operate subsequently to the withdrawal of the arresting member, to hold the check member disabled, until the arresting member restores to effective position.

98. In a calculating machine, the combination with a main drive shaft; a set of counters; drive members, engaged and disengaged by the counters; carrying mechanism; and means to vary the times of engagement and disengagement of the counters and drive members, including set mechanism, and independently-operable keys to actuate the set mechanism; of means to enforce an extra operation of the main drive shaft prior to the operation of the set mechanism, including an arresting member normally in the path of the set mechanism; means effective at each operation of the main drive shaft, to withdraw the arresting member to idle position and subsequently release it for operation; a check member to retain the arresting member ineffective, and displaceable means normally reset subsequently to the release of the arresting member, to retain the check member idle; one of the independently-operable keys adapted to maintain the set mechanism in its actuated position a sufficient length of time to enable the check member to assume its operative position prior to the return of the arresting member to effective position.

99. In a calculating machine, the combination with a main drive shaft; a set of counters; drive members, engaged and disengaged by the counters; carrying mechanism; and means to vary the times of engagement and disengagement of the counters and drive members, including set mechanism, and independently-operable keys to actuate the set mechanism; of means to enforce an extra operation of the main drive shaft prior to the operation of the set mechanism, including a stop on the set mechanism; an arresting member normally in the path of the stop to prevent operation of the set mechanism; means effective at each operation of the drive shaft to shift the arresting member to idle position; a check member to retain the arresting member idle; the stop adapted to prevent the restoration of the arresting member to effective position when the set mechanism is operated; and displaceable means normally reset subsequently to the withdrawal of the arresting member, to retain the check member ineffective; one of the independently-operable keys adapted to maintain the set mechanism in its actuated position a sufficient length of time to enable the check member to assume effective position prior to the release of the arresting member by the stop.

100. In a calculating machine, the combination with a main drive shaft; a set of counters; drive members. engaged and disengaged by the counters; carrying mechanism; and means to vary the times of engagement and disengagement of the counters and drive members, including set mechanism, and independently-operable keys to actuate the set mechanism; of means to enforce an extra operation of the main drive shaft prior to the actuation of the set mechanism, including a stop on the set mechanism; an arresting member which normally lies in the path of the stop to prevent operation of the set mechanism; means effective at each operation of the machine to withdraw the arresting member to idle position; a check member adapted to enter the path of the arresting member to retain it in idle position; and displaceable detaining means for the drive members, to retract the check member and thereby free the arresting member for operation.

101. In a calculating machine, the combination with a main drive shaft; several sets of counters; drive members with which the counters engage and disengage; carrying mechanism; counter-selecting means to determine which set of counters shall be active; and means to vary the times of engagement and disengagement of the active set of counters with the drive members, including set mechanism; of means to enforce an extra stroke of the main drive shaft prior to the actuation of the set mechanism, including an arresting member to prevent operation of the set mechanism; means to withdraw the arresting member to idle position at each operation of the main drive shaft; a check member to hold the arresting member in idle position after such extra stroke is taken; and trip means controlled by the counter-selecting means, to retract the check member and free the arresting means for operation.

102. In a calculating machine, the combination with a set of counters, and a set of drive members relatively engageable and disengageable; printing mechanism; totaling and clearing keys; a set mechanism common to both keys; and means to releasably connect one of the keys and the set mechanism; of non-print means; and a device common to the respective keys, to determine the effectiveness or ineffectiveness of the non-print means.

103. In a calculating machine, the combination with a printing mechanism, including printing hammers, individual latches to restrain the respective hammers, a universal pawl to restrain all the hammers and means to release and restore the pawl; positioning bars; means to advance and to retire the latter; means to control the advance of the positioning bars; typebars connected with the positioning bars to locate types at the printing line opposite the hammers, according to the distances through which the positioning bars advance; and trip bars controlled by the positioning bars, to release the individual latches; of springs connected to the respective trip bars; and means to increase and relieve the tension on the springs coincidently with the advance and restoration of the positioning bars.

104. In a calculating machine, the combination with a main drive shaft; positioning bars; means to advance the bars; restraining and restoring means connected with the main drive shaft to free the bars for advance and to retire them to normal position; typecarriers controlled by the positioning bars, and provided with types adapted to be located at the printing line; printing hammers to impress the types on the work sheet; individual hammer latches normally in position to lock the hammers in cocked position; and trip bars controlled by the positioning bars, to disable the latches; of springs to project the trip bars against the latches; a swinging bail to which the springs are connected; a crank to operate the bail; and means operable from the main drive shaft to turn the crank and alternately tension and relax the springs.

105. In a multiple counter machine, the combination with a plurality of sets of accumulators; and means to effect complementary subtraction thereon; of visible means associated with the respective members forming the sets of accumulators, to indicate both the minuend and the subtrahend, said visible means also adapted to indicate the complement of the minuend whenever a numeral other than zero occupies the units place therein, and the complement of the subtrahend whenever its units digit is a numeral other than zero.

106. In a multiple counter machine, the combination with a plurality of sets of accumulators; and means to effect complementary subtraction thereon; of visible means associated with the respective members forming the set of accumulators, said visible means adapted to indicate the minuend, and the subtrahend, the visible means also adapted to indicate the amount to be added to the minuend to effect subtraction whenever a digit other than zero occupies the units place in the subtrahend.

107. In a multiple counter machine, the combination with a plurality of sets of accumulators; and means to effect complementary subtraction thereon; of visible means associated with the respective sets of accumulators, to indicate the minuend in connection with one set of accumulators, and, when the units digit of the minuend is other than zero, to indicate its complement, and to indicate the subtrahend, in connection with another set of accumulators, and whenever the units digit of the subtrahend is other than zero, to also indicate the complement thereof.

108. In a multiple counter machine, the combination with a plurality of sets of accumulators; and means to effect complementary subtraction thereon; of visible means associated with the respective members forming the set of accumulators, to indicate the minuend and the subtrahend, prior to the subtracting operation, said visible means adapted to indicate the amount which has been added to the minuend, subsequently to the complementary subtraction operation, whenever the digit in the units denomination of the subtrahend is other than zero.

109. In a multiple counter machine, the combination with a plurality of sets of accumulators; and means to communicate amounts from one set of accumulators to another; of visible means associated with the respective sets of accumulators to indicate in connection with one set, the amount to be communicated, prior to such communication, and in connection with another set, the amount communicated after such communication has taken place, whenever the units digit of the amount to be communicated is other than zero and the receptive accumulator was clear.

110. In a multiple counter machine, the combination with a plurality of sets of accumulators; and means to communicate amounts from one set of accumulators to another; of visible means associated with the respective sets of accumulators, to indicate in connection with one set, the amount communicated, both before and after such communication has taken place, whenever the units digit of the amount to be communicated is other than zero.

111. In a multiple counter machine, the combination with a plurality of sets of accumulators; and means to communicate amounts from one set of accumulators to another; of visible means associated with the respective sets of accumulators, to indicate in connection with one set, the amount to be communicated, both before and after such communication has taken place, whenever the units digit of the amount to be communicated is other than zero, and in connection with the other set, to indicate the communicated amount after such communication has taken place, when the units digit of the amount communicated is other than zero, and when the receptive accumulator was clear prior to the communicating operation.

112. In a multiple counter machine, the combination with a plurality of sets of accumulators; means to accumulate amounts in any of the sets of accumulators independently of the other sets; and means to automatically effect the complementary subtraction of an amount in one set of accumulators from that in another set of accumulators; of visible means associated with the respective sets of accumulators to indicate the complement of any amount stored in any set or sets of accumulators, in connection with the indication of such amount, whenever the units digit of the amount is other than zero.

113. In a multiple counter machine, the combination with a plurality of sets of accumulators; means to accumulate amounts in any of the sets of accumulators independently of the other sets; and means to automatically communicate the complement of an amount in one set of accumulators, to another set of accumulators; of visible means associated with the respective sets of accumulators, to indicate the total of the amounts communicated, and in addition, the total of the communicated complementary amounts, whenever the units digit of the total of the amounts communicated is other than zero.

ARTHUR PENTECOST.
WILLIAM W. FISHER.

Witnesses:
JACOB F. FRITH,
RALPH S. WARFIELD.